US009208377B2

(12) United States Patent
Mizuno et al.

(10) Patent No.: US 9,208,377 B2
(45) Date of Patent: Dec. 8, 2015

(54) HUMAN DETECTION DEVICE

(71) Applicant: MegaChips Corporation, Osaka-shi (JP)

(72) Inventors: Yusuke Mizuno, Osaka (JP); Shohei Nomoto, Osaka (JP); Yujiro Tani, Osaka (JP); Yuki Haraguchi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 51 days.

(21) Appl. No.: 14/222,952

(22) Filed: Mar. 24, 2014

(65) Prior Publication Data
US 2014/0286532 A1 Sep. 25, 2014

(30) Foreign Application Priority Data

Mar. 22, 2013 (JP) ................................ 2013-060749
Mar. 22, 2013 (JP) ................................ 2013-060750
Mar. 22, 2013 (JP) ................................ 2013-060751

(51) Int. Cl.
*G06K 9/00* (2006.01)
*B60Q 1/00* (2006.01)

(52) U.S. Cl.
CPC ................................ *G06K 9/00369* (2013.01)

(58) Field of Classification Search
USPC ......... 382/100, 103, 106–107, 123, 155, 162, 382/168, 173, 181, 194, 199, 209, 219, 232, 382/254, 274, 276, 286–291, 228, 159, 305, 382/312; 340/435
See application file for complete search history.

(56) References Cited

U.S. PATENT DOCUMENTS

| 2003/0156737 | A1 | 8/2003 | Ohtsuka et al. | |
|---|---|---|---|---|
| 2005/0232491 | A1* | 10/2005 | Chang et al. | 382/199 |
| 2006/0098865 | A1* | 5/2006 | Yang et al. | 382/159 |

(Continued)

FOREIGN PATENT DOCUMENTS

| GB | 2 431 718 A | 5/2007 |
|---|---|---|
| JP | 2000-39306 | 2/2000 |

(Continued)

OTHER PUBLICATIONS

Ismail Haritaoglu, et al. "W⁴: Who? When? Where? What? A Real Time System for Detecting and Tracking People", Automatic Face and Gesture Recognition, 1998. Proceedings. Third IEEE International Conference on Nara, Japan Apr. 14-16, 1998, IEEE Comput, Soc, US, Apr. 14, 1998, pp. 222-227, XP010277655.

*Primary Examiner* — Seyed Azarian
(74) *Attorney, Agent, or Firm* — Oblon, McClelland, Maier & Neustadt, L.L.P.

(57) ABSTRACT

In a human detection device 1, an edge extractor 11 carries out edge extraction processing to an input image 21 and produces a horizontal edge image 22. A shoulder detector 12 detects a shoulder center and a shoulder width of a person included in the input image 21. A foot detector 13 detects a foot position of the person based on the detected shoulder center and shoulder width. A top detector 14 detects a top position of the person based on the detected shoulder center and shoulder width. A size determiner 15 determines a horizontal size of the person based on the detected shoulder width and determines a vertical size of the person based on the detected foot position and top position. The size determiner 15 produces human range data 28 including the determined sizes, the shoulder center position, the foot position, and the top position.

34 Claims, 37 Drawing Sheets

(56) References Cited

U.S. PATENT DOCUMENTS

| | | | |
|---|---|---|---|
| 2008/0123968 A1* | 5/2008 | Nevatia et al. | 382/228 |
| 2009/0066490 A1* | 3/2009 | Mitzutani et al. | 340/435 |
| 2013/0243259 A1* | 9/2013 | Kawaguchi et al. | 382/103 |

FOREIGN PATENT DOCUMENTS

| | | |
|---|---|---|
| JP | 2004-86417 | 3/2004 |
| JP | 2007-264778 | 10/2007 |
| WO | WO 2008/065729 A1 | 6/2008 |

* cited by examiner

HORIZONTAL EDGE IMAGE 22

VERTICAL EDGE IMAGE 23

SHOULDER LIKELIHOOD IMAGE 27

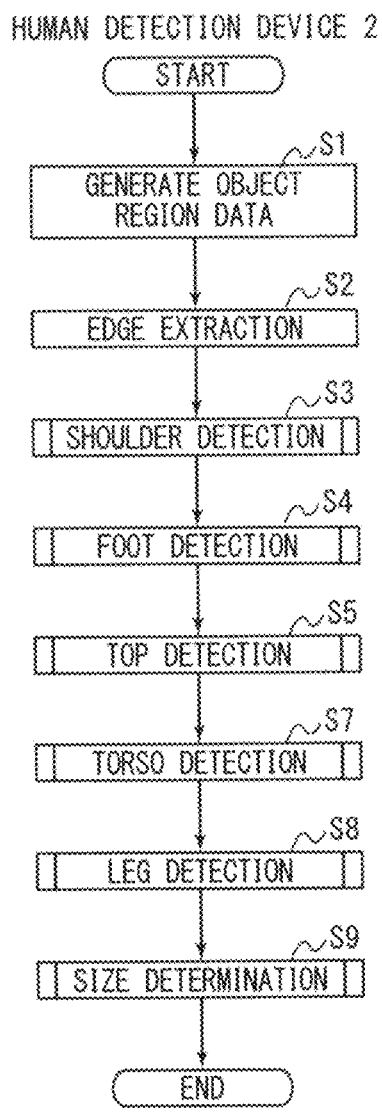

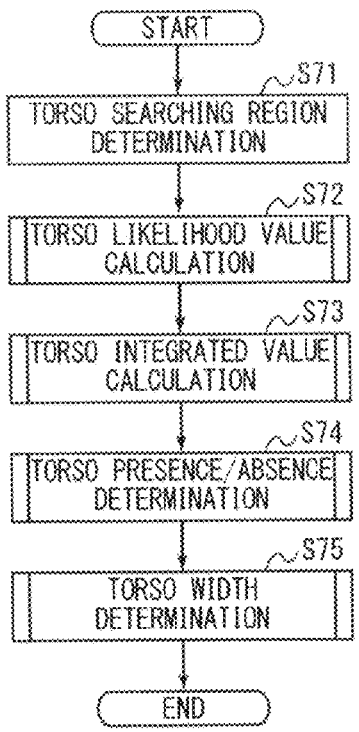
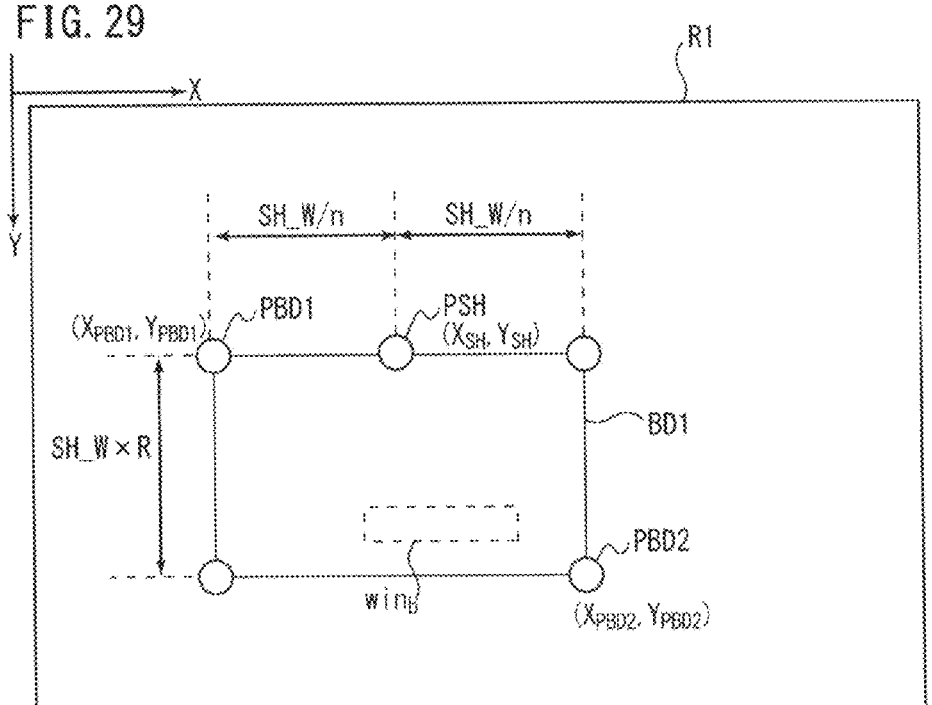

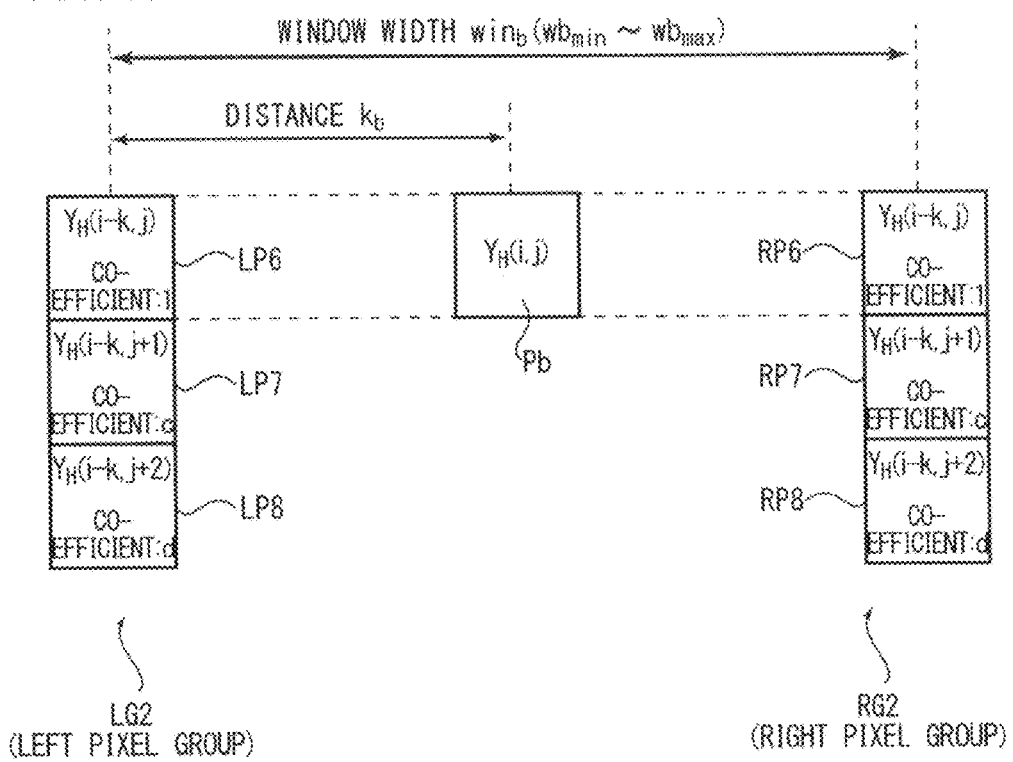

FIG. 35 TORSO PRESENCE/ABSENCE DETERMINATION(S74)

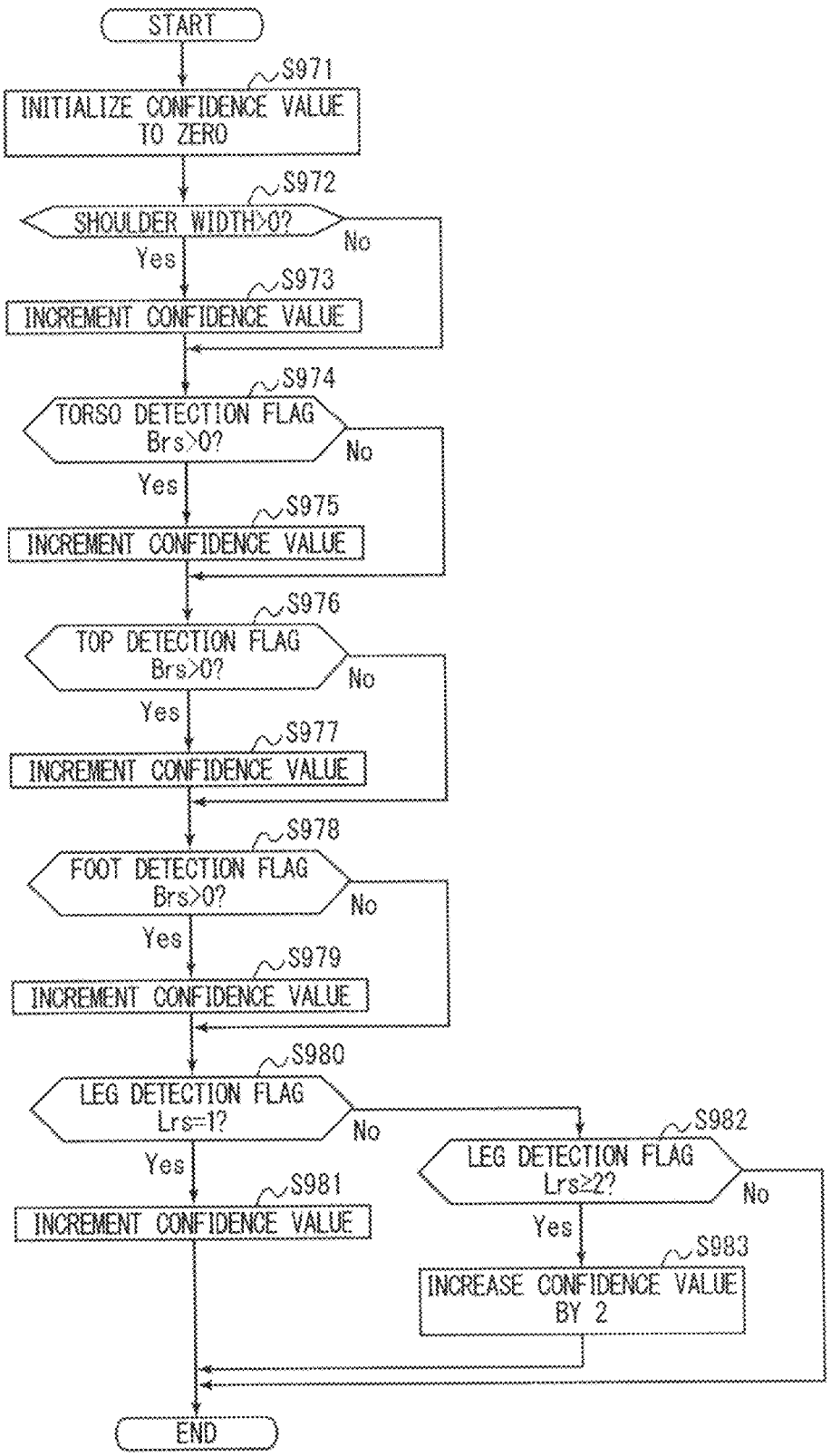

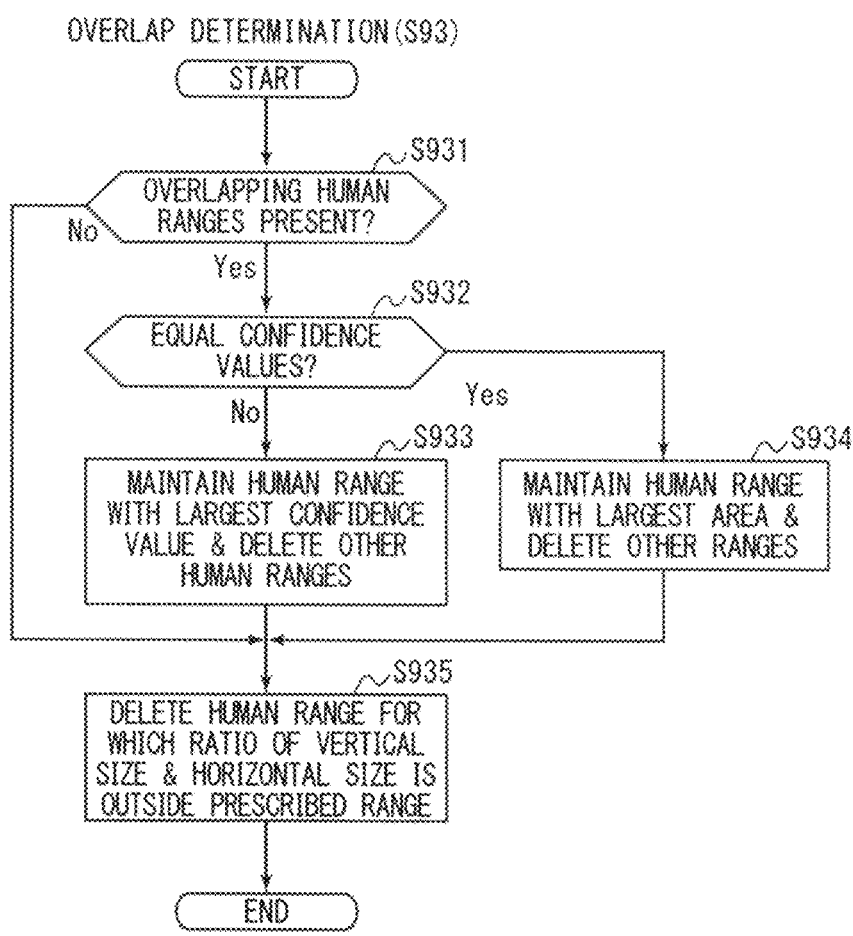

HUMAN DETECTION DEVICE

BACKGROUND OF THE INVENTION

1. Field of the Invention

The present invention relates to a human detection device that identifies a region of a person included in an image.

2. Description of the Background Art

Examples of techniques used to detect a person from an image taken by a camera include a neural network and pattern matching. It can be determined whether a person is present in a region set for detecting a person using such a technique.

Patent Document 1 discloses an object detecting system that detects a person from an image based on human symmetry.

In the object detecting system disclosed by Patent Document 1, a width of a person in an image is set depending on a longitudinal position in the image. The object detecting system evaluates horizontal symmetry in each pixel using a symmetry filter corresponding to the set width to generate a filter reaction image. The object detecting system subjects the filter reaction image to smoothing processing and thinning processing to obtain a segment from the filter reaction image. The object detecting system sets a rectangular region using a lower end of the segment as a reference and identifies whether the rectangular region is a candidate region including a pedestrian based on the vertical continuity and density of the segment in the rectangular region.

Patent Document 1: International Publication No. 2008/065729

As described above, whether a person is present in a set region in an image can be determined by a neural network or pattern matching. However, according to the above-described techniques, a human range in a candidate region cannot be identified even if the presence of a person in the candidate region is determined.

Furthermore, according to the above-described techniques, if the presence of a person is determined in a candidate region, a particular part (such as a torso and a leg) of the person included in the candidate region cannot be detected.

According to Patent Document 1, human bilateral symmetry is used to identify a candidate region in which a pedestrian is present. However, it is not presumed that the object detecting system according to Patent Document 1 would detect a particular human part similarly to a neural network.

SUMMARY OF THE INVENTION

A human detection device according to the invention includes a shoulder detecting unit configured to detect a shoulder position and a shoulder width of a person included in an input image from the input image and a vertical size determining unit configured to determine a vertical size of the person in the input image based on the shoulder position and the shoulder width detected by the shoulder detector.

In this way, a range of the person included in the input image can be identified.

Preferably, the vertical size determining unit includes a foot detector that detects a foot position of the person in the input image based on the shoulder position and the shoulder width detected by the shoulder detecting unit.

In this way, the vertical size of the person can be determined with high accuracy based on the detected foot position.

Preferably, the vertical size determining unit includes a top detector that detects a top position of the person in the input image based on the shoulder position and the shoulder width detected by the shoulder detector.

In this way, the vertical size of the person can be determined with high accuracy based on the detected top position.

A human detection device according to the invention includes a identifying unit configured to sequentially identify a pixel in a identified region of an input image as a reference pixel and a likelihood value calculating unit configured to identify two pixel groups in a prescribed shape positioned on the left and right of the reference pixel and calculate a shoulder likelihood value representing a degree of likelihood of the reference pixel being in a shoulder center of a person based on the pixel values of pixels included in the two pixel groups, a center determining unit configured to determine a position of a specific pixel having a shoulder likelihood value that satisfies a prescribed condition among the pixels in the identified region as a shoulder center of the person, and a shoulder width determining unit configured to determine a shoulder width of the person based on a distance between the two pixel groups.

In this way, the shoulder position and the shoulder width of the person in the image can be determined.

Preferably, the likelihood value calculating unit includes an arrangement setting unit configured to set at least two arrangement patterns for the two pixel groups so that the distance between the two pixel groups varies, an individual likelihood value calculating unit configured to calculate a shoulder likelihood value corresponding to each arrangement pattern based on the pixel values of the pixels included in the two pixel groups corresponding to each of the arrangement patterns, and a selecting unit configured to select a maximum shoulder likelihood value among the shoulder likelihood values corresponding to the arrangement patterns as a shoulder likelihood value for the reference pixel, and the shoulder width determining unit configured to determine a shoulder width of the person based on the distance between the two pixel groups in the arrangement pattern corresponding to the maximum shoulder likelihood value.

In this way, the shoulder width of the person can be determined with high accuracy.

A human detection device includes a shoulder detecting unit configured to detect a shoulder position and a shoulder width of a person included in an input image from the input image, a first region determining unit configured to determine a first region to be searched for a torso of the person based on the shoulder position and the shoulder width detected by the shoulder detecting unit, a identifying unit configured to sequentially identify each pixel in the first region as a reference pixel, a likelihood value calculating unit configured to identify two pixel groups in a prescribed shape positioned on the left and right of the reference pixel and calculate a torso likelihood value representing a degree of likelihood of the reference pixel being in a torso center of the person based on the pixel values of the pixels included in the two pixel groups, and a torso determining unit configured to generate a torso integrated value by adding up torso likelihood values for each column of pixels arranged in a vertical direction in the first region and determine that the torso of the person exists if the torso integrated value of any one column included in the first region satisfies a prescribed condition.

In this way, the torso of the person can be detected from the input image.

Preferably, the human detection device further includes an estimating unit configured to estimate a torso width when the reference pixel is in a center of the torso based on a distance between the two pixel groups and a center determining unit configured to determine a maximum torso width among torso widths estimated for pixels included in the first region as the torso width of the person and determine a position of the pixel having the maximum torso width as a center of the torso of the person.

In this way, the torso width of the person can be determined from the input image.

A human detection device according to the invention includes a shoulder detecting unit configured to detect a shoulder position and a shoulder width of a person included in an input image, a first region determining configured to determine a first region to be searched for a leg of the person based on the shoulder position and the shoulder width detected by the shoulder detecting unit, a identifying unit configured to sequentially identify each pixel in the first region as a reference pixel, a likelihood value calculating unit configured to identify two pixel groups in a prescribed shape positioned on the left and right of the reference pixel and calculate a leg likelihood value representing a degree of likelihood of the reference pixel being in a leg center of the person based on pixel values of pixels included in the two pixel groups, and a leg determining unit configured to generate a leg integrated value by adding up leg likelihood values for each column of pixels arranged in a vertical direction in the first region and determine that the leg of the person exists if the leg integrated value of any one column included in the first region satisfies a prescribed condition.

In this way, the leg of the person can be detected from the input image.

An object of the present invention is to provide a human detection device that allows a human range included in an image to be identified.

Another object of the present invention is to provide a human detection device that can detect a particular part of a person included in an image.

Objects, characteristics, aspects, and advantages of the present invention will become more apparent from the following detailed description and the accompanying drawings.

BRIEF DESCRIPTION OF THE DRAWINGS

FIG. 27 is a flowchart for illustrating the operation of the human detection device shown in FIG. 26.

FIG. 28 is a flowchart for illustrating the torso detection processing shown in FIG. 27.

FIG. 29 shows a general procedure of the processing of determining a torso searching region shown in FIG. 28.

FIG. 30 shows a method of calculating a torso likelihood value by the torso detector shown in FIG. 26.

FIG. 45 is a flowchart for illustrating the confidence value calculation processing shown in FIG. 43.

FIG. 46 is a flowchart for illustrating the overlap determination processing shown in FIG. 43.

DESCRIPTION OF THE EMBODIMENTS

<First Embodiment>

Now, an first embodiment of the present invention will be described in detail in conjunction with the accompanying drawings.

[1. Structure of Human Detection Device 1]

Figure 1:
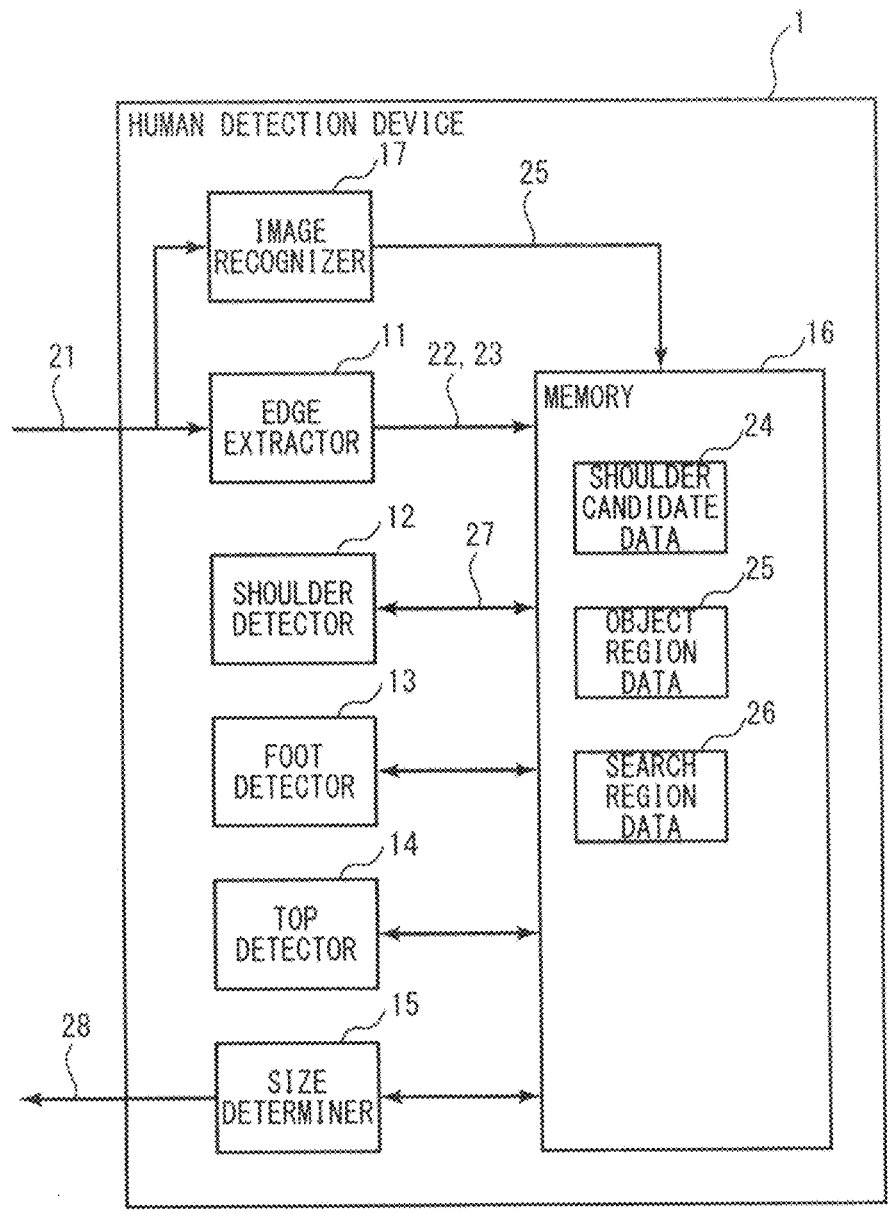
FIG. 1 is a functional block diagram showing a structure of a human detection device according to a first embodiment of the present invention.

FIG. 1 is a functional block diagram showing a structure of a human detection device 1 according to the first embodiment. The human detection device 1 identifies a human range included in an input image 21.

The human detection device 1 includes an image recognizer 17, an edge extractor 11, a shoulder detector 12, a foot detector 13, a head-of-top (hereinafter as top) detector 14, a size determiner 15, and a memory 16.

The edge extractor 11 performs edge extraction processing to the input image 21 to generate a horizontal-direction edge image (hereinafter as horizontal edge image) 22 and a vertical-direction edge image (hereinafter as vertical edge image) 23.

The shoulder detector 12 detects a shoulder center position and a shoulder width of a person included in the input image 21 using the horizontal edge image 22. The shoulder detector 12 generates shoulder candidate data 24 including detection results of the shoulder center position and the shoulder width and stores the data in the memory 16.

The foot detector 13 detects a foot position of the person included in the input image 21 using the horizontal edge image 22 and the shoulder candidate data 24. The foot position is detected based on the shoulder center position and the shoulder width detected by the shoulder detector 12.

The top detector 14 detects a position of the top of the person included in the input image 21 using the horizontal edge image 22 and the shoulder candidate data 24. The top position is detected based on the shoulder center and the shoulder width detected by the shoulder detector 12.

The size determiner 15 determines a horizontal size of the person included in the input image 21 based on the detected shoulder width of the person and determines a vertical size of the person included in the input image 21 based on the detected foot position and top position. The size determiner 15 generates human range data 28 including the determined sizes, the shoulder center position, the foot position, and the top position.

The image recognizer 17 determines the presence/absence of a person in the input image 21 using an algorithm such as a neural network and a support vector machine. If a person is included in the input image 21, the image recognizer 17 generates object region data 25 that roughly identifies a range in which the person is present. The region identified by the object region data 25 is to be subjected to shoulder detection.

The memory 16 is a storage device such as a RAM (Random Access Memory) and stores the shoulder candidate data 24, the object region data 25 and searching-region data 26. The searching-region data 26 stores criteria used to set a range to search for a foot position and a top position. The memory 16 is used as a working area for various kinds of processing performed by the edge extractor 11, the shoulder detector 12, the foot detector 13, the top detector 14, the size determiner 15, and the image recognizer 17.

[2. Overall Operation of Human Detection Device 1]

The human detection device 1 detects a shoulder center, a shoulder width, a foot position, and a top position of a person included in the input image 21 to identify the position and size of the person.

Figure 2:
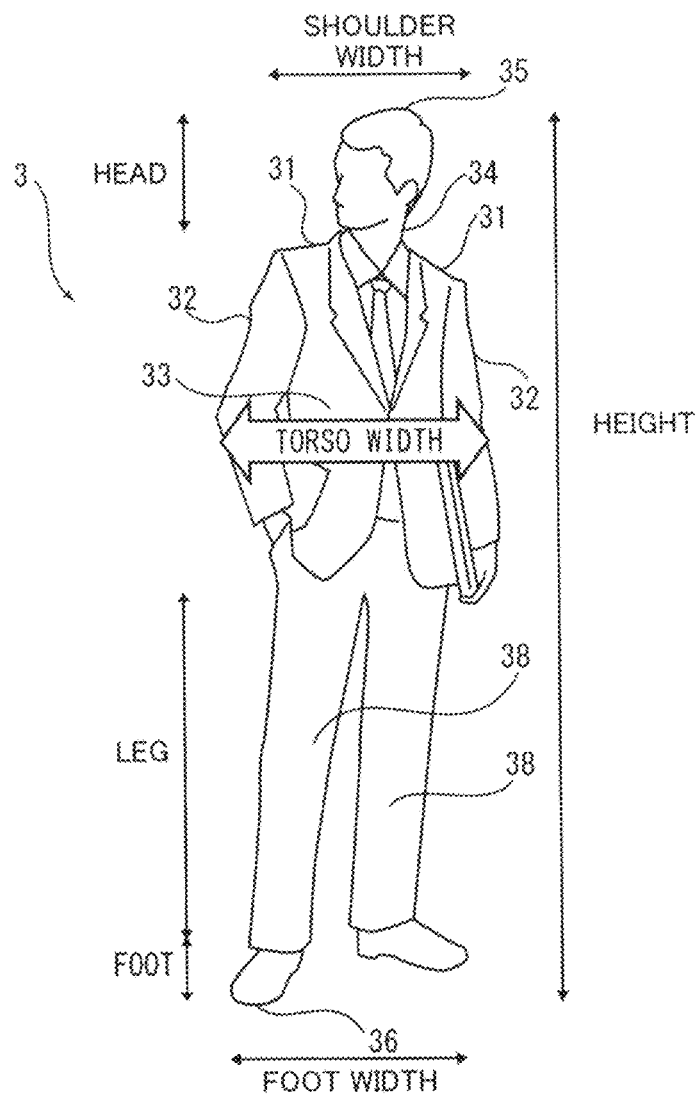
FIG. 2 is a view showing a positional relation among a shoulder, top, and foot of a person detected by the human detection device shown in FIG. 1.

FIG. 2 shows a positional relation among a shoulder, a foot, and a top of a person detected by the human detection device 1. As shown in FIG. 2, the shoulder 31 of the person 3 refers to the part from where an arm 32 is connected to the torso 33 to the base of the neck 34. When the person 3 shows the front, the shoulder 31 has a substantially triangular shape. The top 35 refers to an upper end of the person 3 who stands upright, and the foot 36 refers to a lower end of the person 3 who stands upright. The torso 33 is the part of the person excluding the head and limbs. The torso width is a horizontal size including the arms 32 and the torso 33. Only the horizontal size of the torso 33 may be detected as the torso width. The legs 38 refer to the part from the thighs to the ankles. The foot refers to the part under the ankle.

Figure 3:
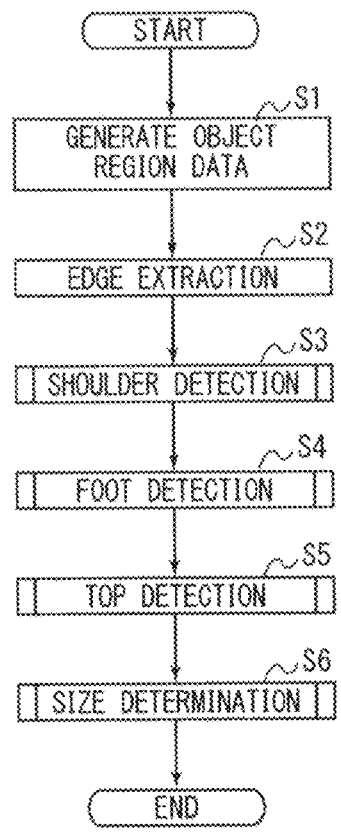
FIG. 3 is a flowchart for illustrating an operation of the human detection device shown in FIG. 1.

FIG. 3 is a flowchart for illustrating an operation of the human detection device 1. The human detection device 1 generates the object region data 25 that identifies an approximate region of a person included in an input image 21 (step S1). The input image 21 is image data (frame) taken by a camera (not shown). The camera is provided for example in a vehicle such as an automobile.

The object region data 25 is generated by the image recognizer 17 that uses an algorithm such as a neural network. In human detection using a neural network, the size of a detected person cannot be identified while a position where the person is detected can be roughly identified. The image recognizer 17 stores the object region data 25 representing the region in which the person is present and stores the data in the memory 16.

Figure 4:
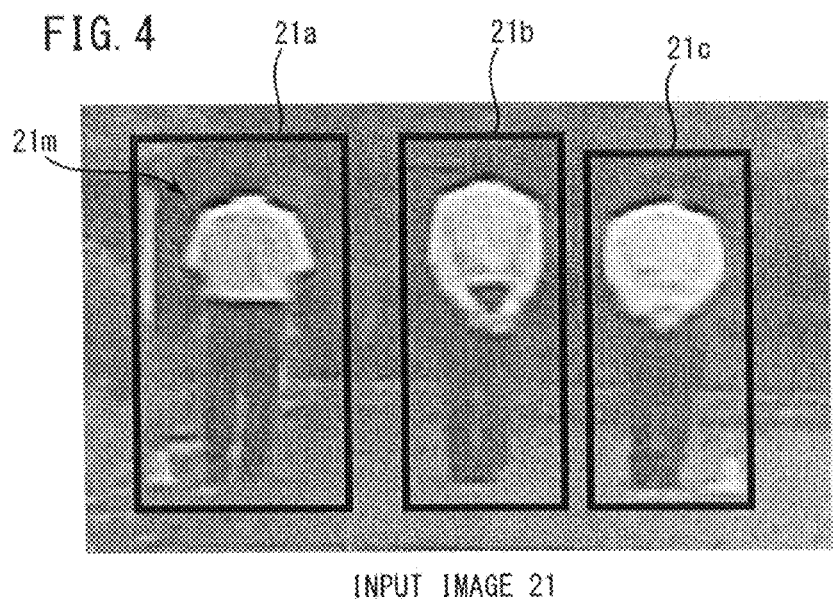
FIG. 4 shows an example of an input image input to the human detection device shown in FIG. 1.

FIG. 4 is a view showing an example of the input image 21. In FIG. 4, the input image 21 includes three people standing and showing the back. Frames 21a to 21c that surround the three people are regions each determined to have a person therein by the image recognizer 17 (object region) and the object region data 25 includes information used to identify the frames 21a to 21c.

Now, the following description is about an operation of the human detection device 1 in the process of identifying a range of a person in the frame 21a unless otherwise identified.

The human detection device 1 performs edge extraction processing to the input image 21 (step S2) and generates a horizontal edge image 22 and a vertical edge image 23. The human detection device 1 extracts an edge based on the gradient of pixel values in the vertical direction of the input image and generates the horizontal edge image 22. Therefore, in the horizontal edge image 22, an edge extending in the horizontal direction included in the input image 21 is emphasized. The human detection device 1 extracts an edge based on the gradient of pixel values in the horizontal direction of the input image to generate the vertical edge image 23. Therefore, in the vertical edge image 23, an edge extending in the vertical direction of the input image 21 is emphasized.

Figure 5:
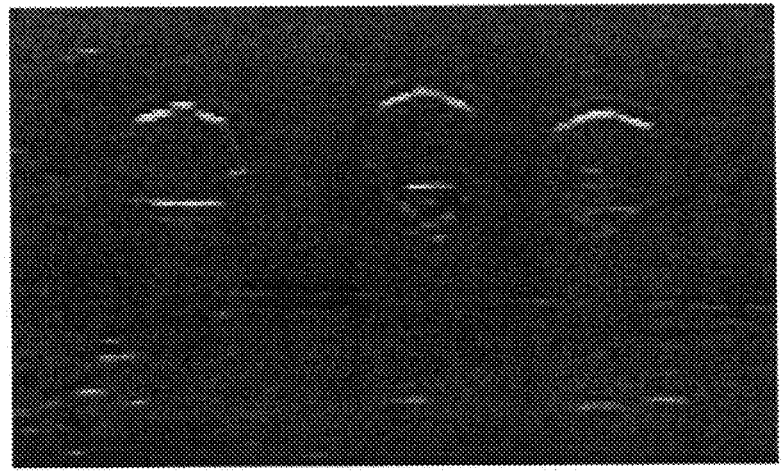
FIG. 5 shows a horizontal edge image generated from the image shown in FIG. 4.
Figure 6:
FIG. 6 is a vertical edge image generated from the image shown in FIG. 4.

FIG. 5 shows the horizontal edge image 22 generated from the input image 21 shown in FIG. 4. FIG. 6 shows the vertical edge image 23 generated from the input image 21 shown in FIG. 4. In the horizontal edge image 22 shown in FIG. 5, edges in the vicinity of the shoulders of the three men and the boundaries between the shirts and pants the three men wear are emphasized. In the vertical edge image 23 shown in FIG. 6, the arms and legs of the three men are emphasized.

The human detection device 1 detects the shoulder centers and shoulder widths of the people in the frames 21a to 21c identified by the object region data 25 using the horizontal edge image 22 (step S3). The shoulder centers and shoulder widths detected in step S3 are recorded in shoulder candidate data 24. Step S3 will be described later in detail.

The human detection device 1 detects a position of a foot corresponding to the shoulder center detected in step S3 (step S4). A region to search for the foot (foot searching region) is identified based on the shoulder center and the shoulder width detected in step S3 and the searching-region data 26. Step S4 will be described later in detail.

The human detection device 1 detects a position of a top corresponding to the shoulder center detected in step S3 (step S5). A region to search for the top (top searching region) is identified based on the shoulder center and the shoulder width detected in step S3 and the searching-region data 26. Step S5 will be described later in detail.

The human detection device 1 determines the size of a person in each of the frames 21a to 21c using results obtained from steps S3 to S5 (step S6). The human detection device 1 determines a horizontal size of the person based on the shoulder width detected in step S3 and a vertical size of the person based on the top position and the foot position detected in steps S4 and S5. Step S6 will be described later in detail.

[3. Edge Extraction Processing (Step S2)]

The edge extractor 11 subjects the input image 21 to band-pass filtering to extract horizontal and vertical edges from the input image 21. In the edge extraction processing, the following Expression (1) is used.

$$y(n) = \alpha \Sigma_k x(k) h(n-k) \quad (1)$$

$\alpha = 255/\text{max}$

In the upper part of Expression (1), x(n) is a pixel value in the input image 21, y(n) is a pixel value of the horizontal edge image 22 or the vertical edge image 23, h(n) represents a band-pass filer, and a will be described later. The band-pass filter h(n) used for horizontal edge extraction and the band-pass filter h(n) used for vertical edge extraction are different from each other.

In the lower part of Expression (1), max is a maximum value for the pixel value in the input image 21 and $\alpha$ is a normalization coefficient used to set a maximum value for y(n) to 255. The maximum value for y(n) can be set to 255 by multiplying an operation result by a sigma operator by a.

The edge extractor 11 applies Expression (1) to pixels arranged in the vertical direction in the input image 21 to extract a horizontal edge. The edge extractor 11 applies Expression (1) to pixels arranged in the horizontal direction in the input image 21 to extract a vertical edge. Using the band-pass filter h(n), a low-frequency component that represents an essential characteristic of the image and a high-frequency component that represents trivial changes in the image are removed from the input image 21, so that changes in the image in an intermediate frequency band are extracted as edges. An odd-numbered tap filter can be used as the band-pass filter h(n). For example, the tap number is any of 3, 5, 7, and 9.

[4. Shoulder Detection Processing (Step S3)]

Figure 7:
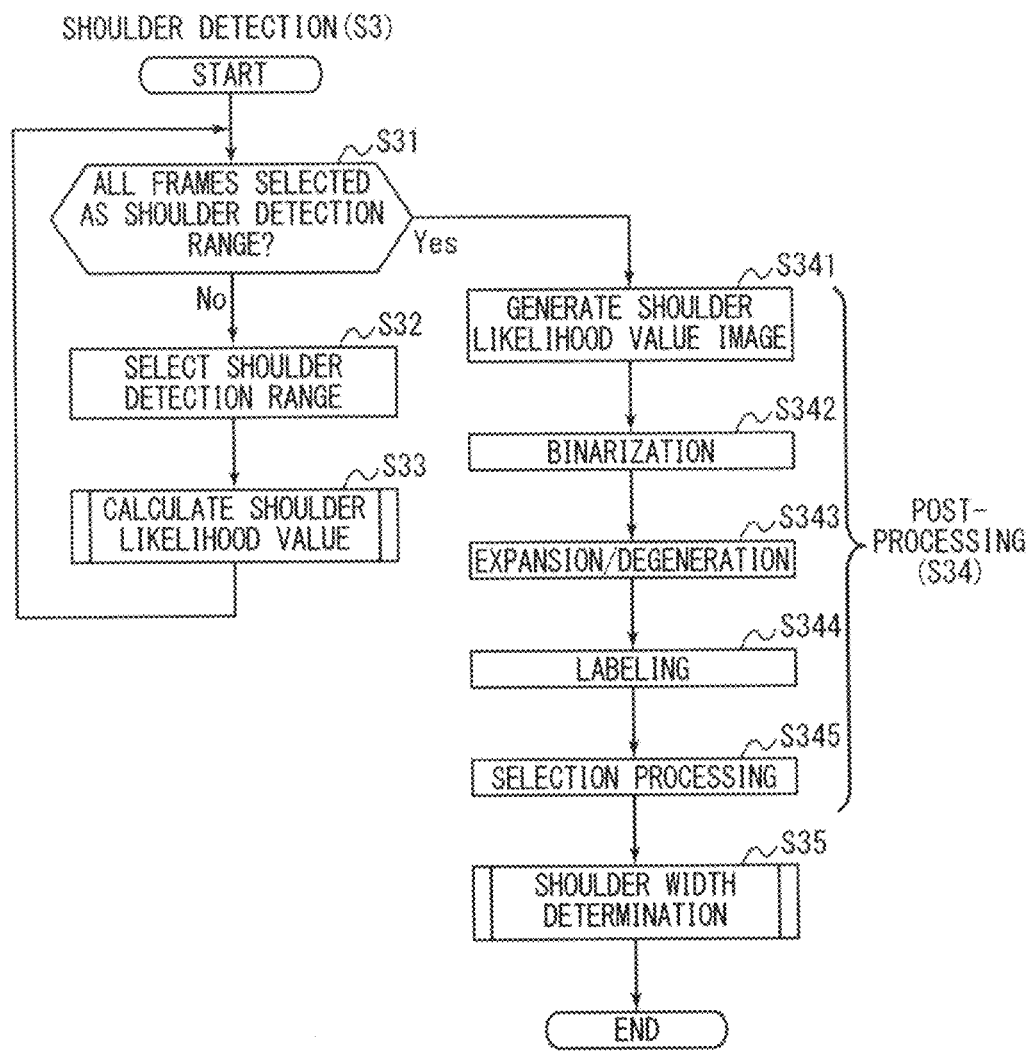
FIG. 7 is a flowchart for illustrating the shoulder detection processing shown in FIG. 3.

FIG. 7 is a flowchart for illustrating the shoulder detection processing (step S3) shown in FIG. 3. The shoulder detection processing (step S3) is performed by the shoulder detector 12.

The shoulder detector 12 determines whether all the frames 21a to 21c recorded in the object region data 25 have been selected as a range for detecting a shoulder of a person (shoulder detection range) (step S31). If all of the frames 21a to 21c have not been selected (No in step S31), the shoulder detector 12 selects one of the unselected frames (step S32). At the time of initial selection, the frame 21a is selected.

The shoulder detector 12 calculates a shoulder likelihood value for each pixel in the frame 21a (step S33). Step S33 will be described later in detail.

If the shoulder detector 12 has selected all the frames 21a to 21c (Yes in step S31), post-processing (step S34) is performed. In the post-processing (step S34), the shoulder detector 12 generates a shoulder likelihood value image 27 obtained by substituting the pixel values of the pixels in the input image 21 by the shoulder likelihood values (step S341). The shoulder detector 12 also subjects the generated shoulder likelihood value image 27 to binarization processing (step S342), expansion/degeneration processing (step S343), labeling processing (step S344), and shoulder width candidate selection processing (step 345). After the post-processing (step S34), the shoulder detector 12 performs shoulder width determination processing (step S35) and determines a shoulder center and a shoulder width of the person in each region of the frames 21a to 21c. Steps S34 and S35 will be described later in detail.

[4. 1 Shoulder Likelihood Value Calculation Processing (Step S33)]

Figure 8:
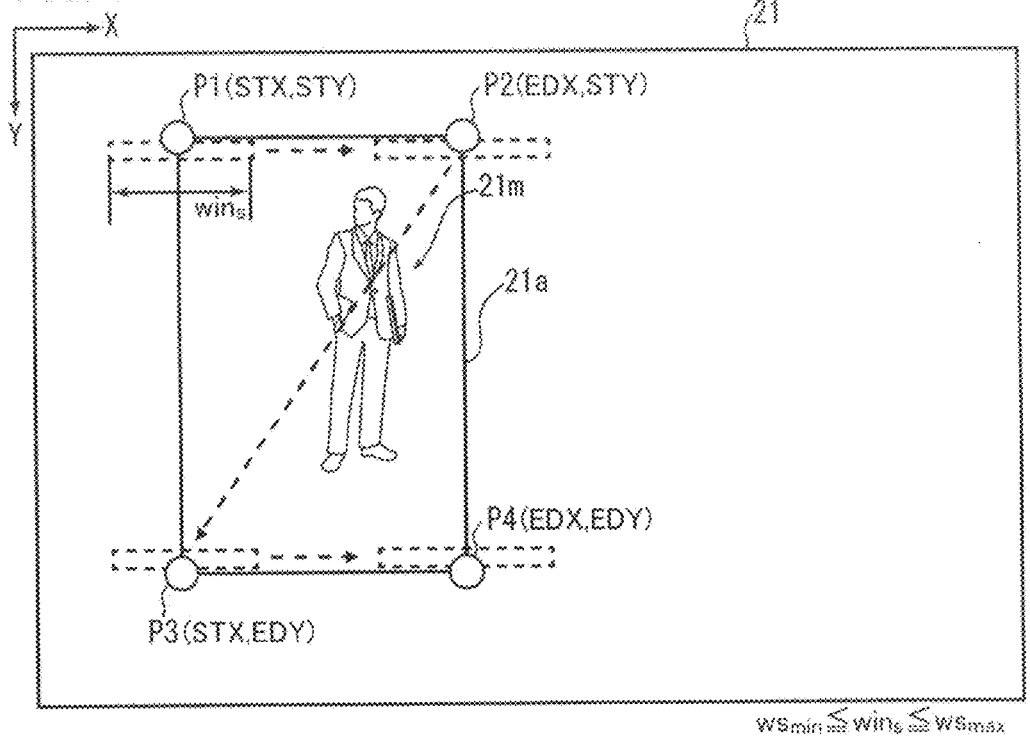
FIG. 8 is a view for illustrating a general procedure of a method of calculating a degree of likelihood (likelihood value) of each pixel in the frame shown in FIG. 4 corresponding to a shoulder center of a person.

In step S33, the shoulder detector 12 calculates a shoulder likelihood value and an estimated shoulder width for each pixel in the frame 21a. The shoulder likelihood value is a numerical value that represents a degree of likelihood of each pixel being in a shoulder center of the person and the estimated shoulder width is an estimated shoulder width of the person when the pixel is in the center of the shoulder. As the pixel is more likely to be in the center of the shoulder, the shoulder likelihood value increases. FIG. 8 generally illustrates a method of calculating the shoulder likelihood value. Note that the frame 21a and the person 21m in FIG. 8 are exaggerated in size.

In FIG. 8, it is assumed that the upper left vertex of the input image 21 is the origin, the horizontal direction corresponds to the X-axis, and the vertical direction corresponds to the Y-axis. The positive direction on the X-axis is rightward and the positive direction on the Y-axis is downward.

STX and STY represent the X and Y coordinates of a pixel P1 for which a shoulder likelihood value is calculated first in the frame 21a. EDX and EDY represent the X and Y coordinates of a pixel P4 for which a shoulder likelihood value is calculated last in the frame 21a, and $\text{win}_s$ is a shoulder width provisionally set during calculation of a shoulder likelihood value (hereinafter referred to as a "window width.") The minimum value for the window width is $\text{ws}_{min}$ and the maximum value for the window width is $\text{ws}_{max}$. The window width will be described later in detail.

The shoulder detector 12 calculates a shoulder likelihood value sequentially from the left for each of pixels arranged rightward from the pixel P1. If the shoulder likelihood value of the rightmost pixel P2 is calculated, the shoulder detector 12 calculates a shoulder likelihood value for an adjacent pixel under the pixel P1. The frame 21a is scanned in this way, so that the shoulder likelihood values are calculated for the pixels in the frame 21a.

Figure 9:
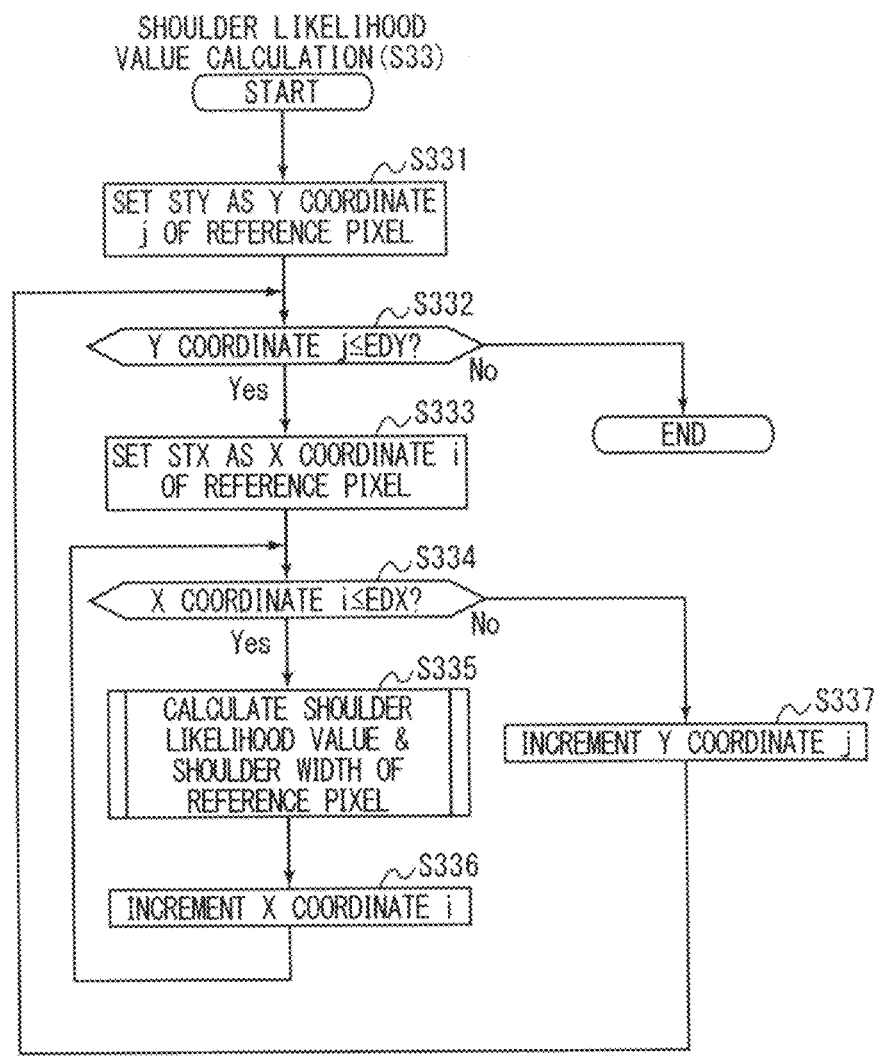
FIG. 9 is a flowchart for illustrating the processing of calculating a shoulder likelihood value shown in FIG. 7.

FIG. 9 is a flowchart for the shoulder likelihood value calculation processing (step S33). The processing by steps S331 to S337 (excluding step S335) shown in FIG. 9 allows the pixels in the frame 21a to be sequentially identified as reference pixels for which a shoulder likelihood value is calculated (step S33). Now, the shoulder likelihood value calculation processing (step S33) will be described in detail.

The shoulder detector 12 sets the Y coordinate j of a reference pixel as STY (step S331). The shoulder detector 12 determines whether the Y coordinate j is not exceeded EDY (step S332). If the Y coordinate j is equal to or less than EDY (Yes in step S332), the X coordinate i of the reference pixel is set to STX (step S333). When a reference pixel is set initially, the pixel P1 is set as a reference pixel.

The shoulder detector 12 determines whether the X coordinate i is not exceeded EDX (step S334). If the X coordinate i is equal to or less than EDX (Yes in step S334), the shoulder detector 12 calculates a shoulder likelihood value and an estimated shoulder width for the reference pixel (step S335). The step S335 will be described later in detail.

Now, the X coordinate i is incremented in order to set an adjacent pixel on the right of the present reference pixel as the next reference pixel (step S336). If the incremented X coordinate i is equal to or less than EDX (Yes in step S334), the shoulder detector 12 repeats steps S335 and S336. In this way, a shoulder likelihood value and an estimated shoulder width are sequentially calculated for the pixels arranged in the horizontal direction in the frame 21a. Hereinafter, a row of pixels arranged in the horizontal direction in the frame 21a will be referred to as a "pixel line."

On the other hand, if the incremented X coordinate i is larger than EDX (No in step S334), the shoulder detector 12 sets each pixel in the next pixel line as a reference pixel. More specifically, the shoulder detector 12 increments the Y coordinate j (step S337) and returns to step S332. If the Y coordinate j is equal to or less than EDY (Yes in step S332), the shoulder detector 12 sets the X coordinate i to STX (step S333). In this way, the leftmost pixel in the next pixel line is set as a reference pixel. The shoulder detector 12 repeats steps S333 to S337 until the Y coordinate j exceeds EDY (No in step S332). In this way, a shoulder likelihood value and an estimated shoulder width are calculated for each pixel in the frame 21a.

If the Y coordinate j exceeds EDY in step S332 (No in step S332), the shoulder detector 12 determines that shoulder likelihood values and shoulder widths have been calculated for all the pixels in the frame 21a and ends the processing in the flowchart in FIG. 9.

[4. 2 Processing of Calculating Shoulder Likelihood Value and Estimated Shoulder Width (Step S335)]

Figure 10:
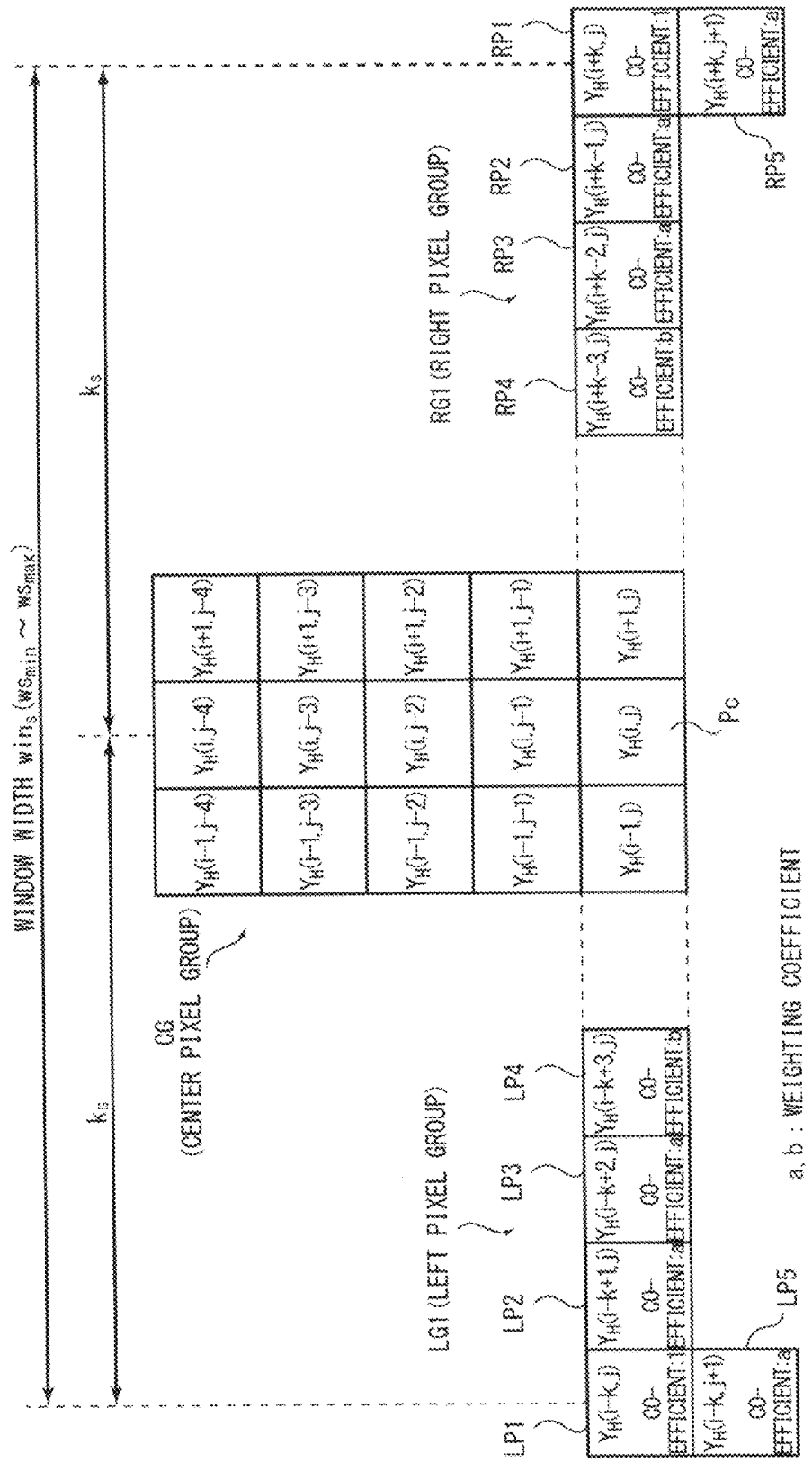
FIG. 10 is a flowchart for illustrating a method of calculating a shoulder likelihood value calculated by the shoulder detector shown FIG. 1.

FIG. 10 is a diagram for illustrating the processing of calculating a shoulder likelihood value and an estimated shoulder width. Referring to FIG. 10, a general procedure of how a shoulder likelihood value and an estimated shoulder width are calculated will be described.

The pixels in FIG. 10 are the pixels of a horizontal edge image 22. It is assumed that there are a left pixel group LG1 and a right pixel group RG1 symmetrical to each other with respect to a vertical axis through a reference pixel Pc. It is also assumed that there is a center pixel group CG including the reference pixel Pc.

The left pixel group LG1 and the right pixel group RG1 have a hook shape corresponding to a human shoulder shape. The left pixel group LG1 has pixels LP1 to LP5. The pixels LP1 to LP4 have the same Y coordinate as that of the reference pixel Pc and are arranged in the horizontal direction from the left to the right. The pixel LP5 is positioned immediately under the leftmost pixel LP1. The pixels LP1 to LP5 are provided with weight coefficients corresponding to the positions of the pixels. More specifically, a weight coefficient for the pixel LP1 is one. A weight coefficient for the pixels LP2, LP3, and LP5 is a. A weight coefficient for the pixel LP4 is b. The right pixel group RG1 has a shape reversed from the shape of the left pixel group LG1 in the horizontal direction and has pixels RP1 to RP5. The pixels RP1 to RP5 correspond to the pixels LP1 to LP5, respectively.

The center pixel group CG is a set of pixels that forms a rectangular shape having the reference pixel Pc and two adjacent pixels on the left and right of the reference pixel Pc as a base. The vertical size of the center pixel group CG is equal to the length of five pixels.

The distance from the reference pixel Pc to the leftmost pixel LP1 of the left pixel group LG1 is defined as a distance $k_s$. The distance $k_s$ is equal to the distance from the reference pixel Pc to the rightmost pixel RP1 of the right pixel group RG1. However, the distance from the reference pixel Pc to the pixel RP1 is not prevented from being different from the distance from the reference pixel Pc to the pixel LP1.

The shoulder detector 12 performs weighted addition to pixels in the left pixel group LG1 positioned the distance $k_s$ apart from the reference pixel Pc to generate a left calculated value. The shoulder detector 12 performs weighted addition to pixels in the right pixel group positioned the distance $k_s$ apart from the reference pixel Pc to generate a right calculated value. A value generated by adding the left calculated value and the right calculated value is obtained as a shoulder likelihood value at the distance $k_s$.

The shoulder detector 12 changes the distance $k_s$ in a range from $ws_{min}/2$ to $ws_{max}/2$ to calculate a shoulder likelihood value (individual shoulder likelihood value) for each distance $k_s$. The maximum value for an individual shoulder likelihood value corresponding to each distance $k_s$ is selected as a shoulder likelihood value for the reference pixel Pc and an estimated shoulder width is calculated based on the distance $k_s$ corresponding to the maximum individual shoulder likelihood value.

Figure 11:
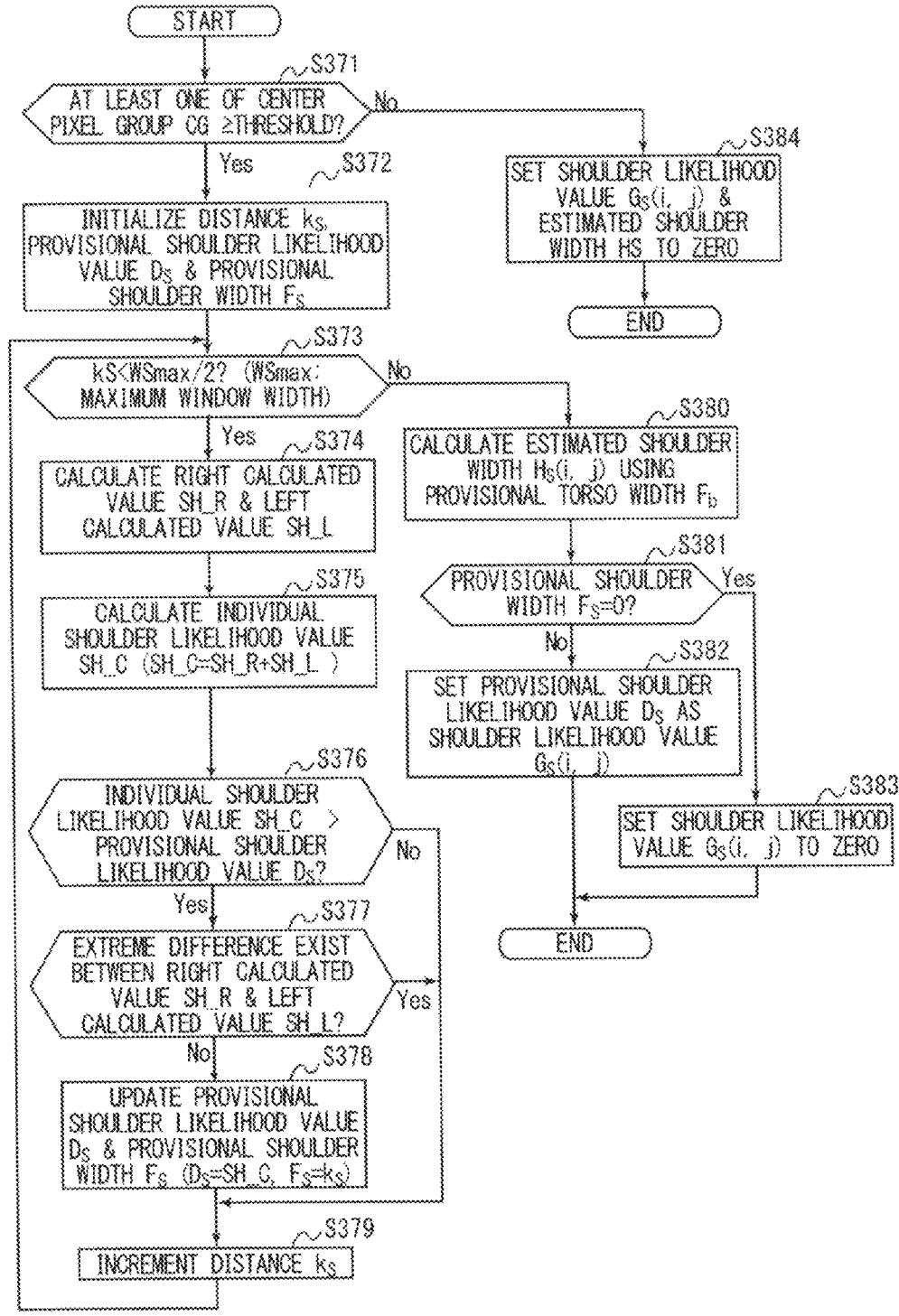
FIG. 11 is a flowchart for illustrating the processing of calculating a shoulder likelihood value and a shoulder width shown in FIG. 9.

FIG. 11 is a flowchart for the processing of calculating a shoulder likelihood value and an estimated shoulder width for the reference pixel Pc (step S335). Hereinafter, referring to FIGS. 10 and 11, the operation of the shoulder detector 12 that performs step S335 will be described.

The shoulder detector 12 determines whether the reference pixel Pc can be in a shoulder center. More specifically, the shoulder detector 12 determines whether the pixel values of all the pixels of the center pixel group CG are smaller than a predetermined threshold (step S371).

If the pixels values of all the pixels of the center pixel group CG are smaller than the predetermined threshold (No in step S371), the shoulder detector 12 determines that the reference pixel Pc does not correspond to a shoulder center and sets the shoulder likelihood value $G_s(i, j)$ and the estimated shoulder width $H_s(i, j)$ of the reference pixel Pc to zero (step S384).

Now, the reason why the shoulder likelihood value $G_s(i, j)$ and the estimated shoulder width $H_s(i, j)$ of the reference pixel Pc are set to zero will be described. In general, a horizontal edge is formed between the neck of a person and a garment for the upper body. Each pixel shown in FIG. 10 is a pixel in the horizontal edge image 22, and therefore if the reference pixel Pc corresponds to a shoulder center, at least one pixel of the center pixel group CG would include a horizontally extending edge and have a pixel value equal to or more than a prescribed value. Based on the assumption, if at least one pixel of the center pixel group CG has a pixel value equal to or more than the threshold, it is determined that the reference pixel Pc can be in a shoulder center. On the other hand, if all the pixels of the center pixel group CG have pixel values smaller than the threshold, it is determined that the reference pixel Pc does not correspond to a shoulder center and the shoulder likelihood value $G_s$ and the estimated shoulder width $H_s$ of the reference pixel Pc are set to zero.

If at least one pixel value of the center pixel group CG is equal to or larger than the preset threshold (Yes in step S371), the shoulder detector 12 determines that the reference pixel Pc can correspond to a shoulder center. The shoulder detector 12 then performs steps S372 to S383 to calculate a shoulder likelihood value $G_s$ and an estimated shoulder width $H_s$ for the reference pixel Pc.

The shoulder detector 12 initializes the distance $k_s$, a provisional shoulder likelihood value $D_s$, and a provisional shoulder width $F_s$ (step S372). The provisional shoulder width $D_s$ is the maximum value among the individual shoulder likelihood values calculated up to the present point.

The initial value for the distance $k_s$ is equal to a half of the minimum window width ($wsm_m$). The provisional shoulder width $F_s$ represents the distance $k_s$ corresponding to the provisional shoulder likelihood value $D_s$. In step S372, the shoulder likelihood value $D_s$ is set to a prescribed initial value. The initial value for the provisional shoulder width $F_s$ is zero.

The shoulder detector 12 determines whether the distance $k_s$ is smaller than a half of the maximum window width ($ws_{max}$) (step S373). If the distance $k_s$ is smaller than a half of the maximum window width ($ws_{max}$) (Yes in step S373), the shoulder detector 12 performs steps S374 and S375 to calculate an individual shoulder likelihood value corresponding to the present distance $k_s$.

In step S374, the shoulder detector 12 calculates a left calculated value SH_L generated by performing weighted addition to each pixel value of the left pixel group LG1 and a right calculated value SH_R generated by performing weighted addition to each pixel value of the right pixel group RG1. The left calculated value SH_L and the right calculated value SH_R are calculated by the following Expressions (2) and (3).

$$SH\_L = Y_H(i-k_s,j) + \{Y_H(i-k_s-1,j) + Y_H(i-k_s+2,j) + Y_H(i-k_s,j+1)\} \times a + Y_H(i-k_s+3,j) \times b \quad (2)$$

$$SH\_R = Y_H(i+k_s,j) + \{Y_H(i+k_s-1,j) + Y_H(i+k_s-2,j) + Y_H(i+k_s,j+1)\} \times a + Y_H(i+k_s-3,j) \times b \quad (3)$$

In Expressions (2) and (3), $Y_R$ is a pixel value in the horizontal edge image 22. The number a is a weight coefficient for the pixels LP2, LP3, LP5, RP2, RP3, and RP5, and b is a weight coefficient for the pixels LP4 and RP4. The weight coefficient for the pixels LP1 and RP1 is one. Note that in Expressions (2) and (3), the weight coefficients do not have to be used. More specifically, the pixel values may be simply added to generate the left calculated value SH_L and the right calculated value SH_R.

The shoulder detector 12 adds the right calculated value SH_R to the left calculated value SH_L to calculate an individual shoulder likelihood value SH_C corresponding to the present distance k8 (step S375).

The shoulder detector 12 determines whether the individual shoulder likelihood value SH_C is more than the provisional shoulder likelihood value $D_s$ (step S376). If the individual shoulder likelihood value SH_C is not more than the provisional shoulder likelihood value $D_s$ (No in step S376), the shoulder detector 12 determines that the positions of the left pixel group LG1 and the right pixel group RG1 at present do not match the shoulders of the person 21m and proceeds to step S379.

On the other hand, if the individual shoulder likelihood value SH_C is more than the provisional shoulder likelihood value $D_s$ (Yes in step S376), the shoulder detector 12 determines whether a condition for updating the provisional shoulder likelihood value $D_s$ is satisfied (step S377). More specifically, the shoulder detector 12 determines whether there is an extreme difference between the left calculated value SH_L and the right calculated value SH_R. If one of the following Expressions (4) and (5) is satisfied, there is no extreme difference between the values, and therefore the shoulder detector 12 determines that the provisional shoulder likelihood value $D_s$ can be updated.

$$SH\_R/t < SH\_L < SH\_R \quad (4)$$

$$SH\_L/t < SH\_R < SH\_L \quad (5)$$

In Expressions (4) and (5), t is an integer equal to or more than 2. Expression (4) indicates that the updating condition is satisfied for t=2, if the left calculated value SH_L is more than a half of the right calculated value SH_R and less than the right calculated value SH_R. Expression (5) indicates that the updating condition is satisfied if the right calculated value SH_R is more than a half of the left calculated value SH_L and less than the left calculated value SH_L. The shoulder detector 12 may perform step S377 without using Expressions (4) and (5). More specifically, the shoulder detector 12 may determine whether there is an extreme difference between the left calculated value SH_L and the right calculated value SH_R based on whether the ratio of the left calculated value SH_L and the right calculated value SH_R is within a prescribed range.

If any of Expressions (4) and (5) is satisfied, the left pixel group LG1 and the right pixel group RG1 have edges corresponding to the shapes of the shoulders of a person, and therefore the shoulder detector 12 determines that the condition for updating the provisional shoulder likelihood value $D_s$ and the provisional shoulder width $F_s$ is satisfied (No in step S377). The shoulder detector 12 proceeds to step S378.

On the other hand, if neither Expression (4) nor (5) is satisfied, at least one of the left pixel group LG1 and the right pixel group RG1 does not have an edge corresponding to a shoulder of the person, and the shoulder detector 12 determines that the updating condition is not satisfied (Yes in step S377). In this case, the shoulder detector 12 proceeds to step S379 to calculate an individual shoulder likelihood value SH_C for the next distance $k_s$.

If the updating condition is satisfied (No in step S377), the shoulder detector 12 updates the provisional shoulder likelihood value $D_s$ to the individual shoulder likelihood value SH_C calculated in step S375 and updates the provisional shoulder width $F_s$ to the present distance $k_s$ (step S378). The shoulder detector 12 then increments the distance $k_s$ (step S379).

The shoulder detector 12 repeats steps S374 to S379 until the distance $k_s$ exceeds a half of the maximum window width $ws_{max}$ (No in step S373). More specifically, the shoulder detector 12 sets arrangement patterns for the left pixel group LG1 and the right pixel group RG1 so that the distance between the left pixel group LG1 and the right pixel group RG1 varies and calculates individual shoulder likelihood values based on the pixel values of the pixels included in the left pixel group LG1 and the right pixel group RG1 in the various arrangement patterns. A maximum individual shoulder likelihood value SH_C and a distance $k_s$ corresponding to the maximum individual shoulder likelihood value SH_C are identified in the range from $ws_{min}/2$ to $ws_{max}/2$.

If the distance $k_s$ exceeds a half of the maximum window width $ws_{max}$ (No in step S373), the shoulder detector 12 determines that calculation of the individual shoulder likelihood value SH_C has ended and calculates an estimated shoulder width $H_s$ for the reference pixel Pc based on the provisional shoulder width $F_s$ (step S380). The estimated shoulder width $H_s(i, j)$ for the reference pixel Pc is obtained from the following Expression (6). The estimated shoulder width $H_s(i, j)$ is a value generated by doubling the provisional shoulder width $F_s$ and adding one to the result. More specifically, the estimated shoulder width is determined based on the distance between the left pixel group LG1 and the right pixel group RG1.

$$H_s(i,j) = 2 \times F_s + 1 \quad (6)$$

The shoulder detector 12 then determines whether the provisional width $F_s$ is zero (step S381). If the provisional shoulder width $F_s$ is more than zero (No in step S381), the shoulder detector 12 sets the provisional shoulder likelihood value $D_s$ as a shoulder likelihood value $G_s(i, j)$ for the reference pixel Pc (step S382). If the provisional shoulder width $F_s$ is zero (Yes in step S381), it indicates that no individual shoulder likelihood value exceeding the initial value of provisional shoulder likelihood value $D_s$ has been calculated, and therefore no significant shoulder width has been obtained. In this case, the shoulder detector 12 determines that the reference pixel Pc is not in a shoulder center and sets the shoulder likelihood value $G_s(i, j)$ for the reference pixel Pc to zero (step S383).

The processing of calculating a shoulder likelihood value and an estimated shoulder width for the reference pixel Pc has been described. A shoulder likelihood value and an estimated shoulder width are calculated according to the above-described processing for each of the pixels in the frame 21a.

4. 3 Post-Processing (Step S34)

As shown in FIG. 7, the shoulder detector 12 repeats steps S31 to S33 shown in FIG. 7 to calculate shoulder likelihood values and estimated shoulder widths for the pixels of the horizontal edge image 22 in the frames 21a to 21c. When all the frames are selected (Yes in step S31), the shoulder detector 12 generates a shoulder likelihood value image 27 using the shoulder likelihood values from the frames 21a to 21c (step S341).

Figure 12:
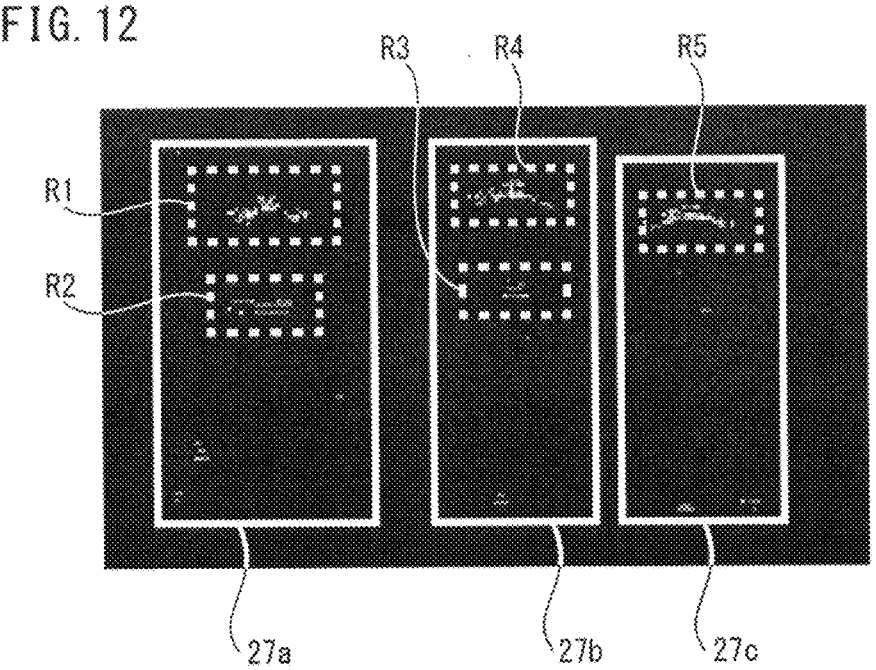
FIG. 12 shows a shoulder likelihood value image generated by the processing of producing a shoulder likelihood value image shown in FIG. 7.

FIG. 12 shows the shoulder likelihood value image 27 generated based on the horizontal edge image 22 shown in FIG. 5. Frames 27a to 27c shown in FIG. 12 correspond to the frames 21a to 21c shown in FIG. 4, respectively. The shoulder detector 12 sets the pixel value of each pixel in the frames 27a to 27c to the shoulder likelihood value obtained in step S335. The pixel values of the pixels positioned outside the frames 27a to 27c are set to zero. In this way, the shoulder likelihood value image 27 is generated.

The shoulder detector 12 then binarizes the shoulder likelihood value image 27 (step S342) and performs degeneration/expansion processing to the binarized shoulder likelihood value image 27 (step S343). In this way, fine patterns included in the binarized shoulder likelihood value image 27 are removed. The shoulder detector 12 performs labeling processing to the shoulder likelihood value image 27 removed of the fine patterns (step S344). In this way, unique numbers are allocated to regions including shoulder likelihood values larger than zero.

The shoulder detector 12 performs the processing of selecting a shoulder width candidate to remove regions having an area equal to or less than a prescribed value among the labelled regions and maintain only regions having an area larger than the prescribed value (step S345). The shoulder detector 12 selects regions R1 to R5 (see FIG. 12) from the shoulder likelihood value image 27 by step S345.

[4. 4 Shoulder Width Determination Processing (Step S35)]

Figure 13:
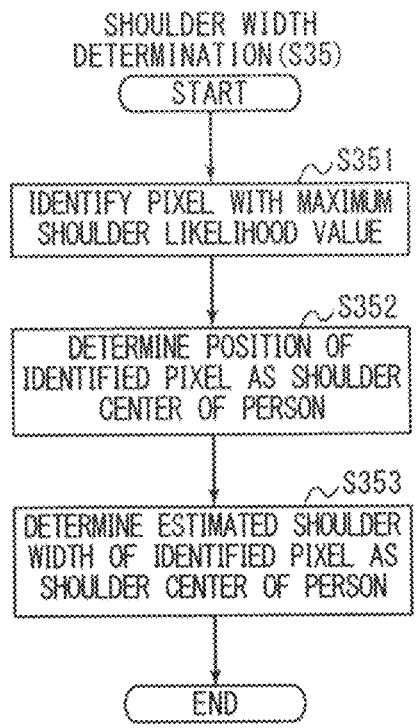
FIG. 13 is a flowchart for illustrating the shoulder width determining processing shown in FIG. 7.

The shoulder detector 12 determines a shoulder width and a shoulder center for each of the regions R1 to R5 (step S35). FIG. 13 is a flowchart for illustrating the processing of determining a shoulder width (step S35). The processing shown in FIG. 13 is performed to each of the regions R1 to R5. Hereinafter, how a shoulder center and a shoulder width in the region R1 are determined will be described as an example.

The shoulder detector 12 identifies a pixel having a maximum shoulder likelihood value among the pixels in the region R1 (step S351). The position of the identified pixel is determined as a shoulder center in the region R1 (step S352). An estimated shoulder width $H_s(i, j)$ for the pixel determined as the shoulder center is determined as a shoulder width for the person in the region R1 (step S353). The shoulder center and the shoulder width in the object region are recorded in shoulder candidate data 24.

As shown in FIGS. 4 and 12, the frame 21a (27a) has only a single person 21m, but the regions R1 and R2 are identified as shoulder candidates in the frame 27a. One of the regions R1 and R2 is identified as the shoulder of the person 21m that exists in the frame 27a by overlap determination processing (see FIG. 25) that will be described. Note that the region having the pixel with the maximum shoulder likelihood value between the regions R1 and R2 may be identified as a shoulder position in the frame 21a without performing the overlap determination processing that will be described. More specifically, the shoulder detector 12 determines the position of the pixel having the maximum shoulder likelihood value in the frame 21 as the shoulder center and the estimated shoulder width $H_s(i, j)$ of the pixel determined as the shoulder center may be determined as the shoulder of the person 21m included in the frame 21a.

Note that in the above described example, the left pixel group LG1 and the right pixel group RG1 have a hook shape but they may have other shapes. For example, multiple pixels that form a straight line extending in the upper right direction may be the left pixel group LG1 and multiple pixels that form a straight line extending in the upper left direction may be the right pixel group RG1. Alternatively, the left pixel group LG1 and the right pixel group RG1 may form a curved line. In other words, the left pixel group LG1 and the right pixel group RG1 may be set to have a prescribed shape that conforms to the shoulder shape of the person.

In the above-described example, the Y coordinate of the pixels LP1 to LP4 and RP1 to RP2 matches the Y coordinate of the reference pixel Pc but the arrangement is not limited to this. The left pixel group LG1 and the right pixel group RG1 need only be arranged on the left and right of the reference pixel.

[5. Foot Detection Processing (Step S4)]

Figure 14:
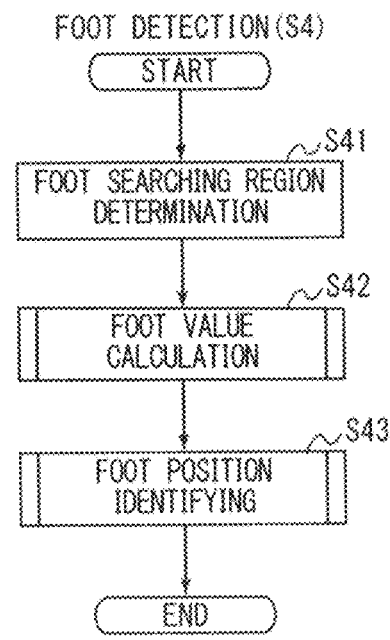
FIG. 14 is a flowchart for illustrating the foot detection processing shown in FIG. 3.

FIG. 14 is a flowchart for illustrating foot detection processing (step S4). The foot detector 13 performs the foot detection processing (step S4) to each of the regions R1 to R5 (see FIG. 12) in which the presence of a shoulder is determined by the shoulder detection processing (step S3). In this way, a foot position corresponding to the shoulder center in the regions R1 to R5 is identified. In the foot detection processing, the horizontal edge image 22 is used. Now, how to identify the foot position corresponding to the region R1 will be described as an example.

As shown in FIG. 14, the foot detector 13 determines a foot searching region corresponding to the region R1 based on the searching-region data 26 and the central coordinate of the shoulder and the shoulder width in the region R1 recorded in the shoulder candidate data 24 (step S41).

The foot detector 13 calculates a foot value by adding up pixel values in the horizontal edge image 22 in the foot searching region in the horizontal direction (step S42). More specifically, a foot value is generated for each of the pixel lines arranged in the horizontal direction. The foot value is used in step S43 in order to identify a foot position in the foot searching region.

The foot detector 13 identifies a foot position corresponding the region R1 based on the foot value obtained in step S42 (step S43). More specifically, the foot detector 13 identifies a foot value that satisfies a prescribed condition among the foot values generated in step S42. Among the foot values that satisfy the prescribed condition, Y coordinate of the pixel line being closest to the shoulder center in the region R1 is identified as the foot position corresponding to the region R1.

Now, steps in the foot detection processing will be described in detail.

[5. 1 Determining Foot Searching Region (Step S41)]

Figure 15:
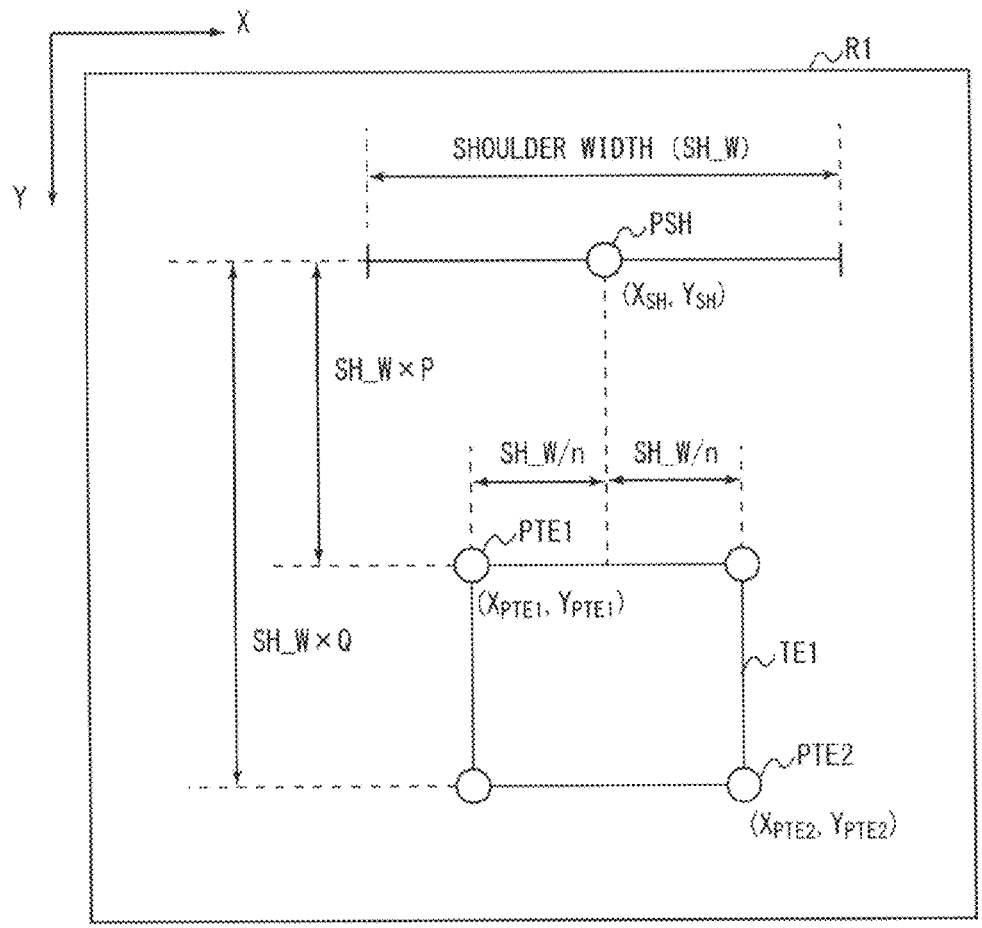
FIG. 15 shows a general procedure of the processing of determining a foot searching region shown in FIG. 14.

FIG. 15 shows a positional relation between a shoulder center PSH and a foot searching region TE1 in the region R1. As shown in FIG. 15, the foot searching region TE1 is defined as a rectangular region. If it is assumed that the shoulder center PSH is represented by coordinates $(X_{SH}, Y_{SH})$, the X coordinate $X_{PTE1}$ and the Y coordinate $Y_{PTE1}$ of a pixel PTE1 at the upper left vertex of the foot searching region TE1 are represented by the following Expression (7) and the X coordinate $X_{PTE2}$ and the Y coordinate $Y_{PTE2}$ of a pixel PTE2 at the lower right vertex are represented by the following Expression (8).

$$X_{PTE1} = X_{SH} - \frac{SH\_W}{n}, Y_{PTE1} = Y_{SH} + SH\_W \times P \quad (7)$$

$$X_{PTE2} = X_{SH} + \frac{SH\_W}{n}, Y_{PTE2} = Y_{SH} + SH\_W \times Q \quad (8)$$

In Expressions (7) and (8), SH_W is a shoulder width in the region R1, and P, Q, and n are arbitrary constants. Preferably, P is 2, Q is 3, and n is an integer from 2 to 5.

Expressions (7) and (8) are recorded in the searching-region data 26. The foot detector 13 determines the foot searching region TE1 using Expressions (7) and (8) and performs foot value calculation processing (step S42) that will be described later.

[5. 2 Foot Value Calculation Processing (Step S42)]

Figure 16:
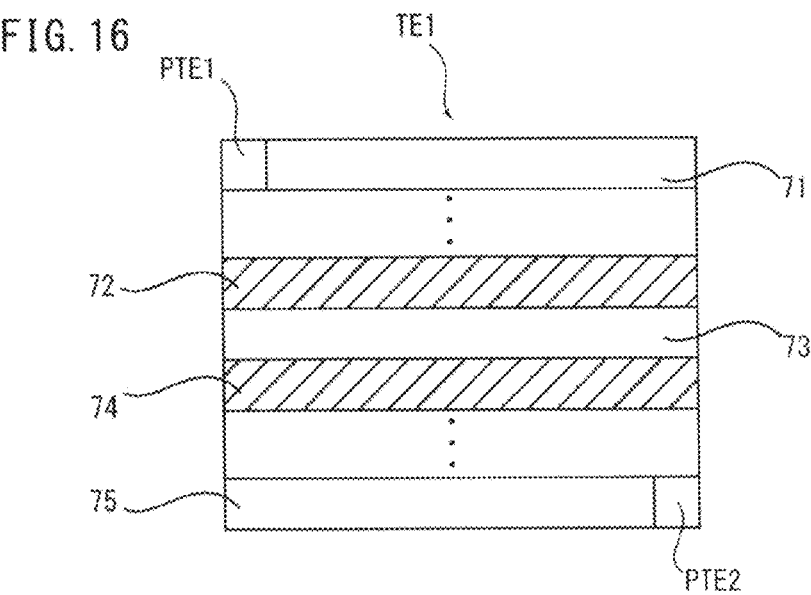
FIG. 16 is a view showing a general procedure of the foot value calculation processing shown in FIG. 14.

FIG. 16 shows a method of calculating a foot value in the foot searching region TE1. In FIG. 16, pixels in the foot searching region TE1 are partly not shown.

As shown in FIG. 16, the foot detector 13 adds up the pixel values of the pixels in the horizontal edge image 22 in the foot searching region TE1 on a pixel line basis to calculate a foot value. The pixel line is an arrangement of pixels in a row in the horizontal direction in the foot searching region. For example, the foot detector 13 adds up the pixel values of the pixels included in a pixel line 71 to calculate a foot value for the pixel line 71.

Figure 17:
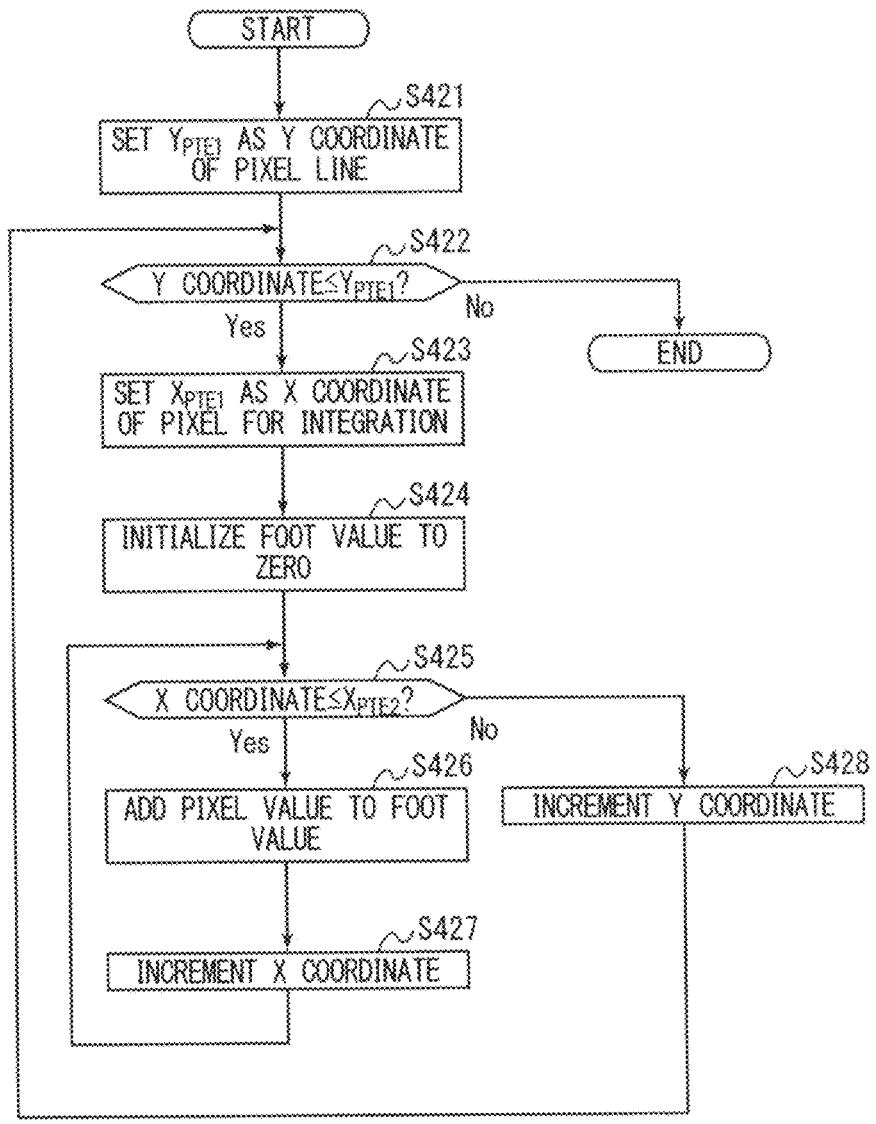
FIG. 17 is a flowchart for illustrating the foot value calculation processing shown in FIG. 14.

FIG. 17 is a flowchart for illustrating the foot value calculation processing (step S42). The foot detector 13 calculates foot values for pixel lines sequentially from the top of the foot searching region TE1. Now, referring to FIGS. 16 and 17, the procedure of calculating foot values will be described in detail.

The foot detector 13 sets $Y_{PTE1}$ as a Y coordinate for a pixel line for which a foot value is to be calculated in order to calculate a foot value for the pixel line 71 (step S421). The foot detector 13 determines whether the set Y coordinate for the pixel line is equal to or less than $Y_{PTE2}$ in order to determine the pixel line for calculation is within the foot searching region TE1 (step S422).

If the Y coordinate of the pixel line for calculation is equal to or less than $Y_{PTE2}$ (Yes in step S422), the foot detector 13 sets the X coordinate of a pixel for integration to $X_{PTE1}$ in order to determine the pixel for integration (step S423). When step S423 is performed initially, the pixel for integration is set to the pixel PTE1.

The foot detector 13 initializes the foot value of the pixel line 71 to zero (step S424) and determines whether the set X coordinate is equal to or lower than $X_{PTE2}$ in order to determine whether the X coordinate of the pixel for integration is within the foot searching region TE1 (step S425).

If the X coordinate of the pixel for integration is equal to or less than $X_{PTE2}$ (Yes in step S425), the foot detector 13 adds the pixel value of the pixel in the horizontal edge image 22 for integration to the foot value (step S426). The foot detector 13 increments the X coordinate of the pixel for integration (step S427). In this way, the adjacent pixel on the right of the present pixel for integration is set as a new pixel for integration.

The foot detector 13 repeats steps S426 and S427 until the X coordinate of the pixel for integration exceeds $X_{PTE2}$ (No in step S425). In this way, the foot value of the pixel line 71 is calculated.

If the X coordinate of the pixel for integration exceeds $X_{PTE2}$ (No in step S425), the foot detector 13 increments the Y coordinate of the pixel line for calculation (step S428) in order to change the pixel line for calculation. In this way, the adjacent pixel line below the present pixel line for calculation is set as a new pixel line for calculation. If the incremented Y coordinate is equal to or less than $Y_{PTE2}$ (Yes in step S422), the X coordinate of the pixel for integration is set to $X_{PTE1}$ in order to start calculating a foot value for the next pixel line (step S423).

Then, steps S422 to S428 are repeated until the Y coordinate of the pixel line for calculation exceeds $Y_{PTE2}$ (No in step S422). As a result, a foot value for each pixel line in the foot searching region TE1 is calculated.

[5. 3 Foot Position Identifying Processing (step S43)]

The foot detector 13 identifies a foot position that corresponds to the shoulder center PSH in the region R1 using the foot values corresponding to the pixel lines calculated in step S42. Note that referring to FIG. 16, a general procedure of determining a foot position will be described.

It is assumed that the foot detector 13 selects a pixel line 73 as a line for determination. The foot detector 13 determines a pixel line with the smaller foot value between the adjacent pixel lines 72 and 74 above and below the pixel line 73. Here, it is assumed that the pixel line 72 is determined.

If the foot value of the pixel line 73 for determination is more than s times the foot value of the pixel line 72 and more than s times the average value among the pixel lines 71 to 75, the foot detector 13 determines the pixel line 73 as a foot candidate corresponding to the shoulder center PSH.

The foot detector 13 determines a pixel line to be a foot candidate by determining whether each of the pixel lines in the foot searching region TE1 satisfies the above-described condition. The Y coordinate of the closest pixel line to the shoulder center PSH among the pixel lines determined as candidates is identified as a foot position corresponding to the shoulder center PSH.

Figure 18:
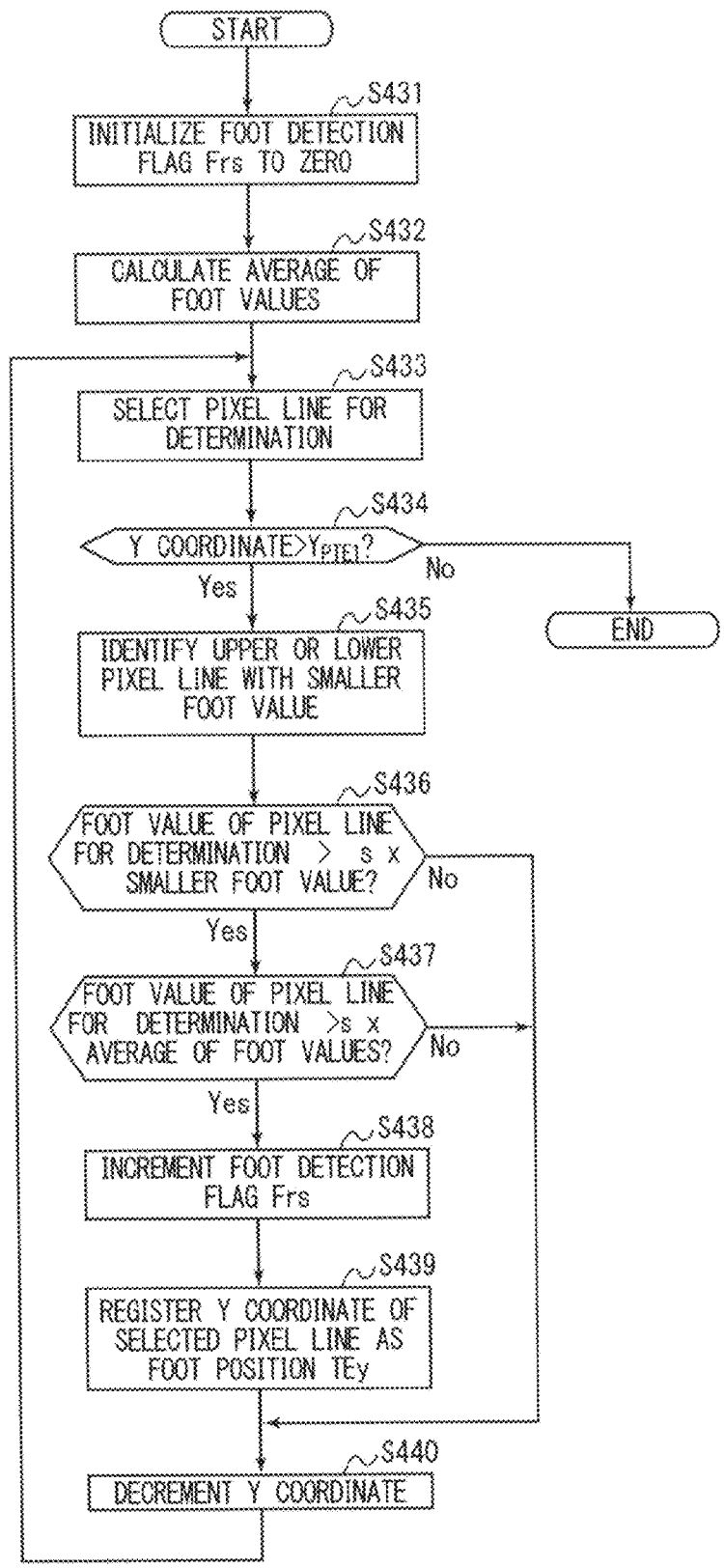
FIG. 18 is a flowchart for illustrating the processing of identifying a foot position shown in FIG. 14.

FIG. 18 is a flowchart for illustrating the foot position identifying processing (step S43). Referring to FIGS. 16 and 18, the operation of the foot detector 13 that performs the foot position identifying processing (step S43) will be described.

The foot detector 13 initializes a foot detection flag Frs to zero (step S431). The foot detector flag Frs indicates whether a foot position has been identified from the foot searching region TE1 and is used in size determination processing (step S6) that will be described. The foot detection flag Frs being zero indicates that a foot position has not been identified, while the flag Frs being one or more indicates that a foot position has been identified.

The foot detector 13 calculates the average of the foot values of the pixel lines in the foot searching region TE1 (step S432).

The foot detector 13 determines whether a pixel line satisfies a condition for a foot sequentially from the lower side of the foot searching region TE1. The foot detector 13 selects a pixel line for determination among the pixel lines in the foot searching region TE1 (step S433). During initial selection, a pixel line in the second lowest position from the bottom in the foot searching region TE1 is selected. The pixel line 75 in the lowermost position does not have a pixel line thereunder for comparison and therefore is not selected for determination. The pixel line in the uppermost position in the foot searching region TE1 is not selected for determination for the same reason.

The foot detector 13 determines whether the Y coordinate of the selected pixel line is more than $Y_{PTE1}$ in order to determine whether the selected pixel line has a pixel line to be compared thereto (step S434).

If the Y coordinate of the selected pixel line is more than $Y_{PTE1}$ (Yes in step S434), the foot detector 13 identifies the smaller foot value between the foot values of the adjacent pixel lines positioned above and below the pixel line for determination (step S435). If the foot value of the pixel line for determination is more than s times the identified foot value (Yes in S436), the foot detector 13 proceeds to step S437. On the other hand, if the foot value of the pixel line for determination is not more than s times the identified foot value (No in step S436), the foot detector 13 determines that the pixel line for determination does not satisfy the foot condition and proceeds to step S440 to select the next pixel line.

The foot detector 13 determines in step S437 whether the foot value of the pixel line for determination is more than s times the average of the foot values. If the foot value of the pixel line for determination is not more than s times the average of the foot values (No in step S437), the foot detector 13 determines that the pixel line for determination does not satisfy the foot condition and proceeds to step S440 to select the next pixel line.

On the other hand, if the foot value of the pixel line for determination is more than s times the average of the foot values (Yes in step S437), the foot detector 13 determines that the pixel line for determination satisfies the foot condition and increments the foot detection flag Frs (step S438). The foot detector 13 registers the Y coordinate of the pixel line for determination as a foot position TEy (step S439).

The foot detector 13 decrements the Y coordinate of the pixel line for determination in order to select the next pixel line as a pixel line for determination (step S440). A pixel line for determination is newly selected based on the decremented Y coordinate (step S433). As described above, the Y coordinate is decremented in order to determine whether pixel lines satisfy the foot condition sequentially from the lower side of the foot searching region TE1.

Now, the foot detector 13 repeats steps S435 to S440 until the Y coordinate of the pixel line for determination is equal to or lower than $Y_{PTE1}$ (No in step S434). In this way, the foot position TEy is updated every time a pixel line that satisfies the foot condition is identified (step S439). As a result, the foot detector 13 can identify as a foot position the closest pixel line to the shoulder center PSH among the pixel lines that satisfy the foot condition.

[6. Top Detection Processing (step S5)]

[6. 1 General Procedure of Top Detection Processing (Step S5)]

Figure 19:
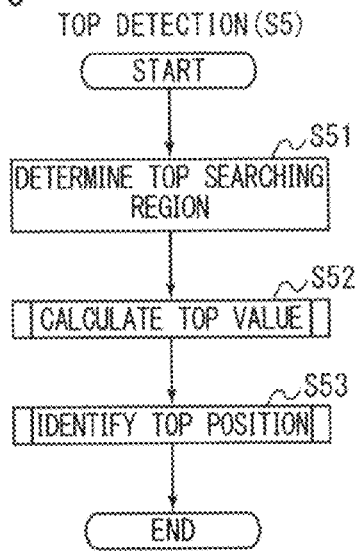
FIG. 19 is a flowchart for illustrating the top detection processing shown in FIG. 3.

FIG. 19 is a flowchart for illustrating top detection processing (step S5). The top detector 14 performs top detection processing (step S5) to each of the regions R1 to R5 (see FIG. 12) determined to have a shoulder by the shoulder detection processing (step S3). In this way, a top position corresponding to the shoulder center in the regions R1 to R5 can be identified. In the top detection processing, the horizontal edge image 22 is used. Now, how to identify a top position corresponding to the region R1 will be described as an example.

The top detection processing (step S5) is the same as the foot detection processing (step S4) described above except for a method of determining a top searching region through which a top position is searched. Therefore, what is common between the top detection processing (step S5) and the foot detection processing (step S4) will be partly omitted from the following description.

As shown in FIG. 19, the top detector 14 determines a top searching region corresponding to the region R1 based on the shoulder center PSH in the region R1 (step S51).

Figure 20:
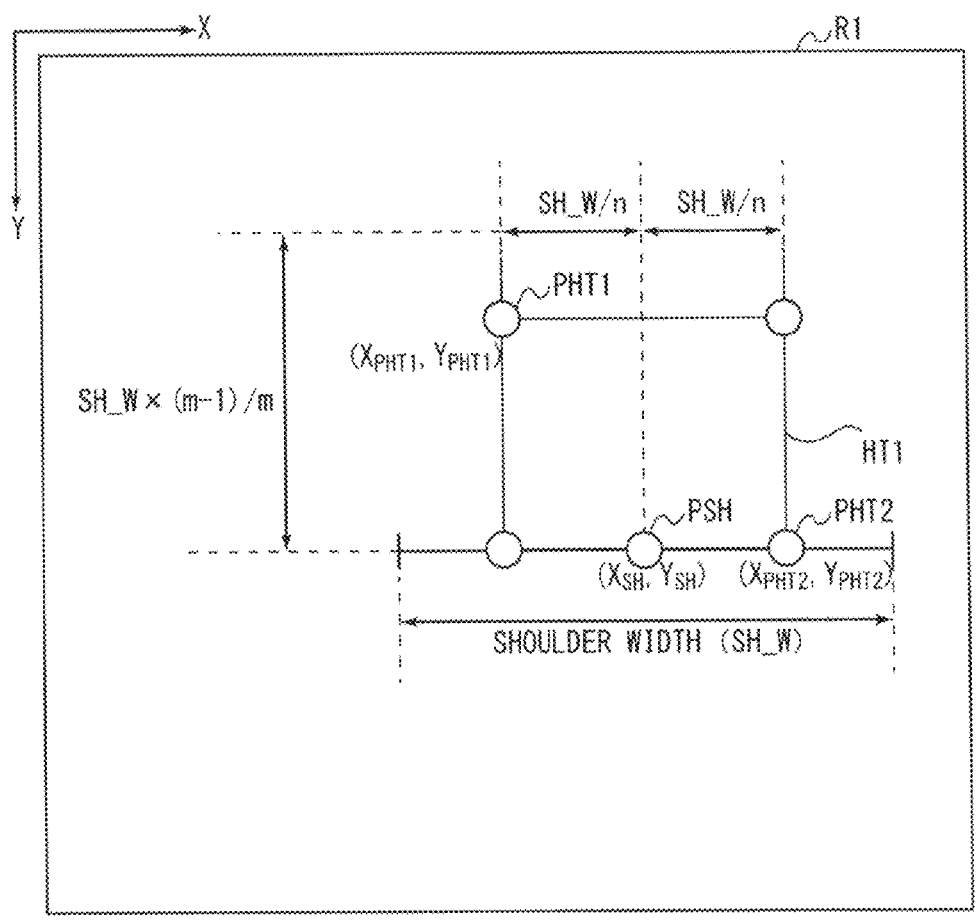
FIG. 20 is a general procedure of the processing of determining a top searching region shown in FIG. 19.

FIG. 20 is a view showing a positional relation between the shoulder center PSH and the top searching region HT1. As shown in FIG. 20, the top searching region HT1 is defined as a rectangular region. The X coordinate $X_{PHT1}$ and the Y coordinate $Y_{PHT1}$ of the pixel PHT1 at the upper left vertex of the top searching region HT1 are represented by the following Expression (9) and the X coordinate $X_{PHT2}$ and the Y coordinate $Y_{PHT2}$ of the pixel PHT2 at the lower right vertex are represented by the following Expression (10).

$$X_{PHT1} = X_{SH} - \frac{SH\_W}{n}, Y_{PHT1} = Y_{SH} - SH\_W \times \frac{m-1}{m} \quad (9)$$

$$X_{PHT2} = X_{SH} + \frac{SH\_W}{n}, Y_{PHT2} = Y_{SH} \quad (10)$$

In Expressions (9) and (10), n and m are arbitrary constants. The constant n is common to the constant n used in Expressions (7) and (8). The constant m is an integer from 3 to 6. Expressions (9) and (10) are recorded in the searching-region data 26. The top detector 14 determines the top searching region HT1 using Expressions (9) and (10) and performs the top value calculation processing (step S52) that will be described.

The top detector 14 adds up the pixel values in the horizontal edge image 22 in the top searching region HT1 in the horizontal direction to calculate a top value (step S52). The top value is used in step S53 in order to identify a top position in the top searching region HT1.

The top detector 14 identifies a top position corresponding to the region R1 based on the top value obtained in step S52 (step S53). The top detector 14 identifies a top value for a pixel line having the same condition as the condition used in the foot detection processing (step S4) among the top values of the pixel lines generated in step S52. The Y coordinate of the closest pixel line to the shoulder center PSH in the region R1 among the pixel lines having the identified top value is identified as a top position corresponding to the region R1.

[6. 2 Top Value Calculation (Step S52)]

Figure 21:
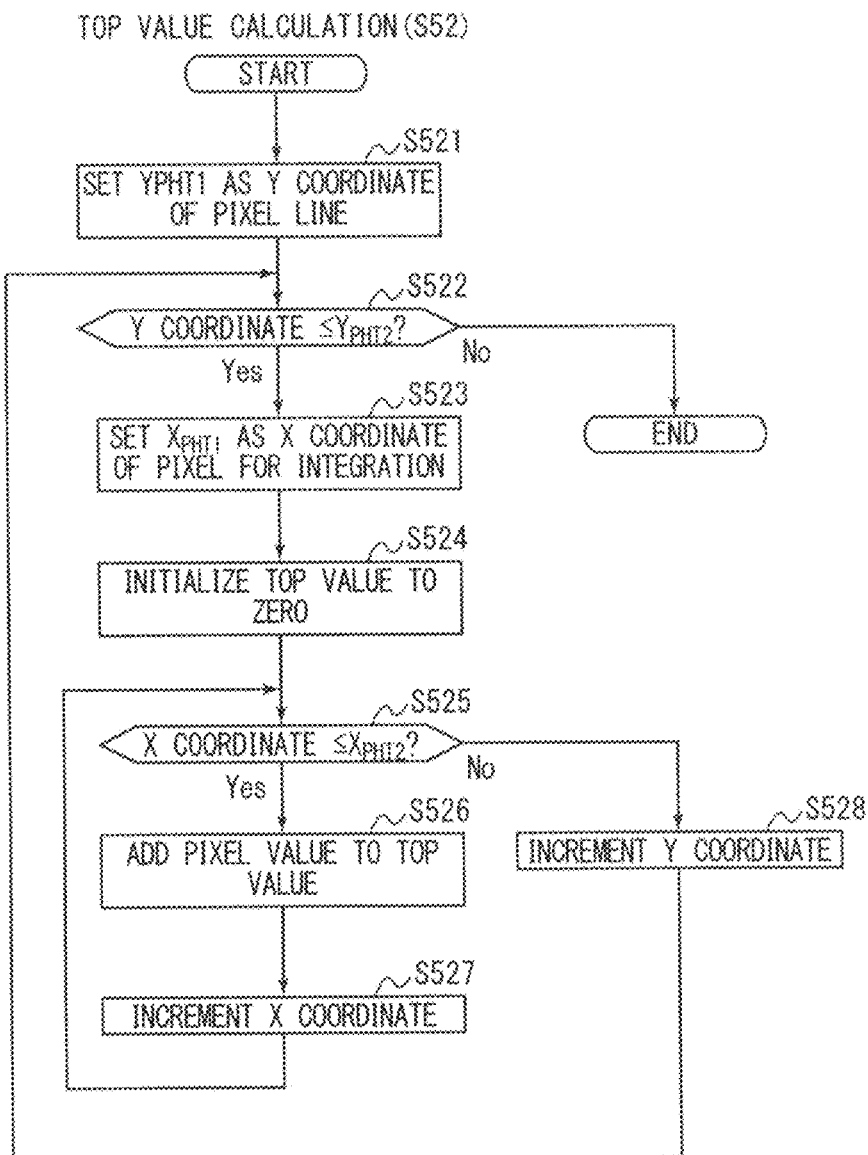
FIG. 21 is a flowchart for illustrating the top value calculation processing shown in FIG. 19.

FIG. 21 is a flowchart for illustrating top value calculation processing (step S52). A method of calculating the top value detected by the top detector 14 is the same as the method of calculating the foot value as described above except that a region for calculation is a top searching region HT1. More specifically, steps S521 to S528 in FIG. 21 correspond to steps S421 to S428 in FIG. 17.

The top detector 14 sets $Y_{PHT1}$ as a Y coordinate for a pixel line for which a top value is to be calculated (step S521). The top detector 14 determines whether the set Y coordinate of the pixel line is equal to or less than $Y_{PHT2}$ (step S522).

If the Y coordinate of the pixel line for calculation is equal to or less than $Y_{PHT2}$ (Yes in step S522), the top detector 14 determines the X coordinate of the pixel for integration as $X_{PHT1}$ (step S523). The Y coordinate of the pixel for integration is $Y_{PHT1}$ set in step S521. The first pixel to be set as a pixel for integration is the pixel PHT1.

The top detector 14 initializes the top value of a pixel line for calculation (step S524). If the X coordinate of the pixel for integration is equal to or less than $X_{PHT2}$ (Yes in step S525), the top detector 14 adds the pixel value of the pixel in the horizontal edge image 22 for integration to the top value (step S526). The top detector 14 increments the X coordinate of the pixel for integration (step S527). In this way, an adjacent pixel on the right of the present pixel for integration is set as a new pixel for integration.

The top detector 14 repeats steps S526 and S527 until the X coordinate of the pixel for integration exceeds $X_{PHT2}$ (No in step S525). If the X coordinate of the pixel for integration is more than $X_{PHT2}$ (No in step S525), the top detector 14 increments the Y coordinate of the pixel line for integration (step S528). In this way, an adjacent pixel line under the present pixel line for calculation is set as a new line for calculation. In order to start calculating a top value for the next pixel line, the X coordinate of the pixel for integration is set to $X_{PHT1}$ (step S523).

Thereafter, until the Y coordinate of the pixel line for calculation exceeds $Y_{PHT2}$ (No in step S522), steps S522 to S528 are repeated. As a result, a top value for each pixel line in the top searching region HT1 is calculated.

[6. 3 Top Position Detection Processing (Step S53)]

The top detector 14 determines a top position corresponding to the shoulder center PSH in the region R1 using the top value of each pixel line calculated in step S52. The top position is determined according to the same determining method used for determining the foot position.

Figure 22:
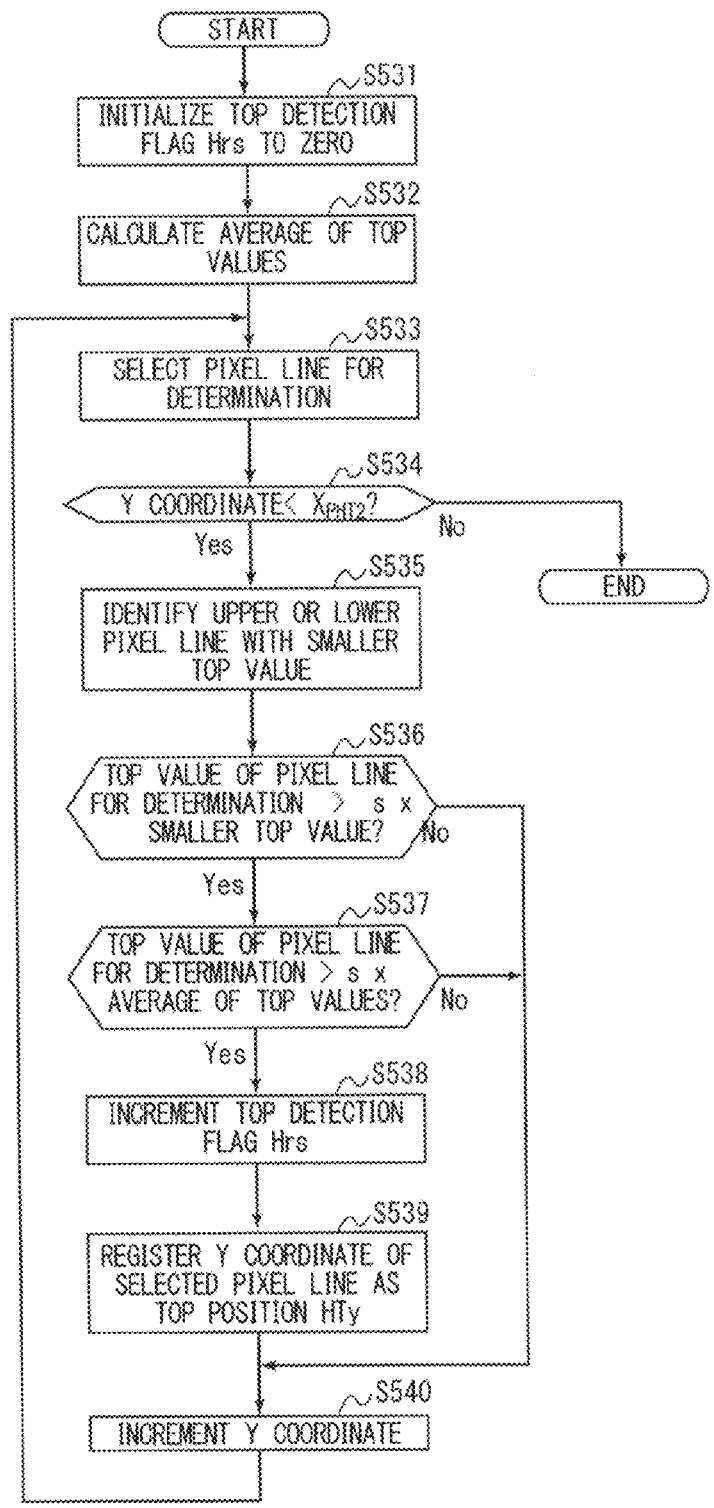
FIG. 22 is flowchart for illustrating the processing of identifying a top position shown in FIG. 19.

FIG. 22 is a flowchart for illustrating the top position detection processing (step S53). Steps S531 to S540 shown in FIG. 22 correspond to steps S431 to S440 shown in FIG. 18. Note however that the top detector 14 determines whether each pixel line satisfies a top condition sequentially from the uppermost pixel line in the top searching region HT1.

The top detector 14 initializes a top detection flag Hrs to zero (step S531). The top detection flag Hrs indicates whether a top position has been identified from the top searching region HT1 and is used in size determination processing (step S6) that will be described. The top detection flag Hrs being zero indicates that no top position has been identified while the top detection flag Hrs being one or more indicates that a top position has been identified.

The top detector 14 calculates the average of the top values of the pixel lines in the top searching region HT1 (step S532). The top detector 14 selects a pixel line for determination among the pixel lines in the top searching region HT1 (step S533). During the initial selection, the second uppermost pixel line in the top searching region HT1 is selected.

The top detector 14 determines whether the Y coordinate of the pixel line for determination is less than $Y_{PHT2}$ (step S534). If the Y coordinate for determination is smaller than $Y_{PHT2}$ (Yes in step S534), the top detector 14 identifies the smaller top value between the top values of the adjacent pixel lines above and under the pixel line for determination (step S535). If the top value of the pixel line for determination exceeds s times the identified top value (Yes in step S536), the top detector 14 proceeds to step S537. On the other hand, if the top value of the pixel line for determination is equal to or less than s times the identified top value (No in step S536), the top detector 14 determines that the pixel line for determination does not satisfy a condition for a top and proceeds to step S540 in order to select the next pixel line.

If the top value of the pixel line for determination is equal to or less than s times the average of the top values (No in step S537), the top detector 14 proceeds to step S540 in order to select the next pixel line. On the other hand, if the top value of the pixel line for determination exceeds s times the average of the top values (Yes in step S537), the top detector 14 determines that the pixel line for determination satisfies the top condition and increments the top detection flag Hrs (step S538). The top detector 14 registers the Y coordinate of the pixel line for determination as a top position HTy (step S539).

The top detector 14 increments the Y coordinate of the pixel line for determination in order to select the next pixel line as a pixel line for determination (step S540). Based on the incremented Y coordinate, a pixel line for determination is newly selected (step S533).

Thereafter, the top detector 14 repeats steps S535 to S540 until the Y coordinate of the pixel line for determination is equal to or more than $Y_{PHT2}$ (No in step S534). In this way, the top position HTy is updated every time a pixel line that satisfies the top condition is identified (step S539). As a result, the top detector 14 can identify the closest pixel line to the shoulder center PSH among the pixel lines that satisfy the top condition as a top position.

[7. Size Determination Processing (Step S6)]

Figure 23:
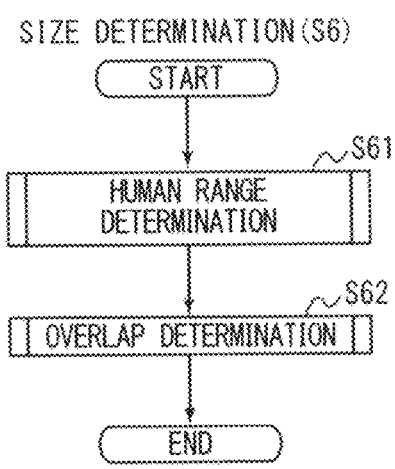
FIG. 23 is a flowchart for illustrating the size determination processing shown in FIG. 3.

FIG. 23 is a flowchart for illustrating the size determination processing (step S6) shown in FIG. 3. Hereinafter, referring to FIG. 23, the size determination processing (step S6) will be described.

The size determiner 15 determines a human range corresponding to each of the regions R1 to R5 based on a shoulder center position, a shoulder width, a foot position, and a top position in the regions R1 to R5 (step S61).

The size determiner 15 determines whether the human ranges corresponding to the regions R1 to R5 overlap (step S62). If multiple human ranges overlap, the size determiner 15 selects one of the human ranges and deletes the unselected human ranges.

[7. 1 Human Range Determination (Step S61)]

Figure 24:
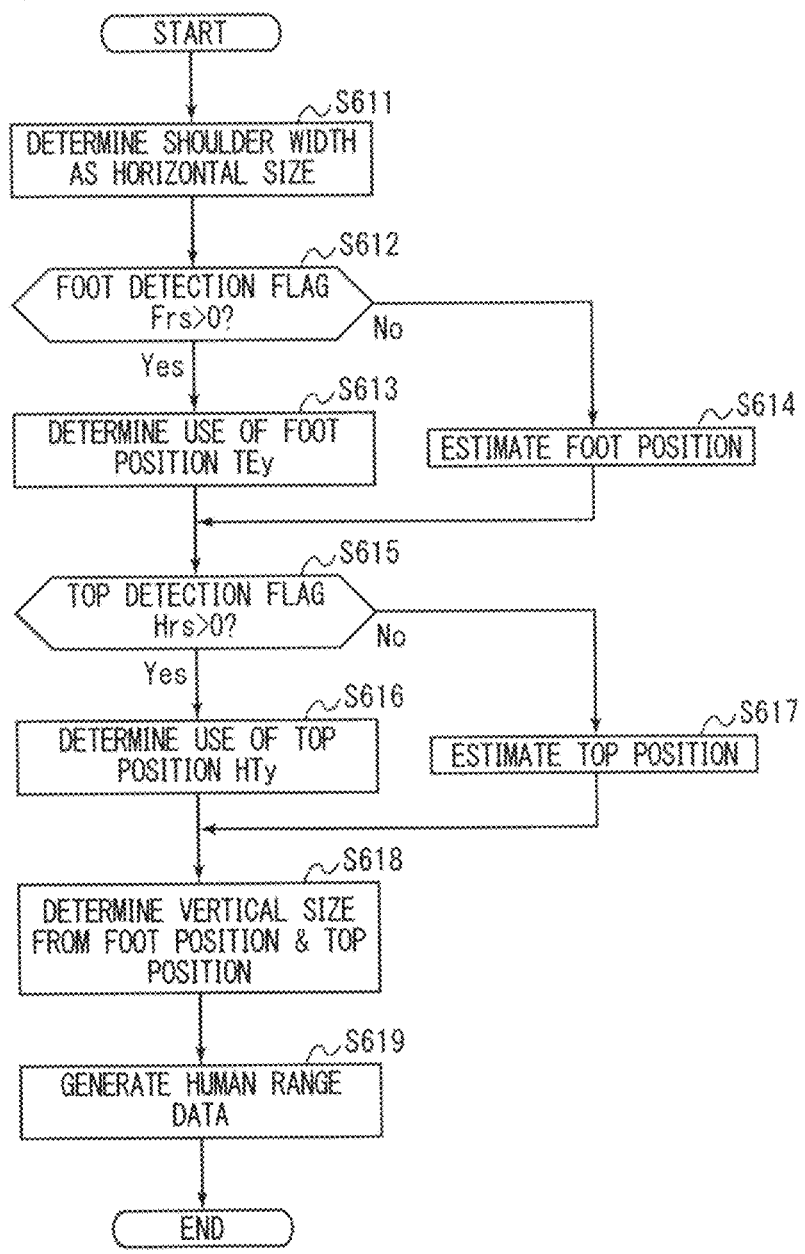
FIG. 24 is a flowchart for illustrating the human range determination processing shown in FIG. 23.

FIG. 24 is a flowchart for illustrating human range determination processing (step S61). The size determiner 15 performs the human range determination processing (step S61) to each of the regions R1 to R5 and generates human range data 28 corresponding to the regions R1 to R5.

Now, the human range determination processing (step S61) will be described in detail by referring to how to determine a human range corresponding to the region R1 as an example. The size determiner 15 determines a shoulder width in the region R1 as a horizontal size for a person corresponding to the range R1 (step S611).

The size determiner 15 then determines whether the foot detection flag Frs for the region R1 is more than zero (step S612). The foot detection flag Frs being more than zero (Yes in step S61.2) indicates that the foot position corresponding to the shoulder center PSH in the region R1 has been identified by the foot detection processing (step S4). In this case, the size determiner 15 determines use of the foot position TEy identified by the foot detection processing (step S4) (step S613).

On the other hand, if the foot detection flag Frs in the region R1 is zero (No in step S612), the foot position corresponding to the shoulder center PSH in the region R1 has not been identified by the foot detection processing (step S4). In this case, the size determiner 15 estimates a foot position based on the shoulder center PSH and shoulder width in the region R1 (step S614). For example, the size determiner 15 multiplies the shoulder width in the region R1 by a coefficient preset for estimating a foot position and adds the result of multiplication to the Y coordinate $Y_{SH}$ of the shoulder center PSH to obtain a foot position.

The size determiner 15 then determines whether the top detection flag Hrs for the region R1 is more than zero (step S615). The top detection flag Hrs being more than zero (Yes in step S615) indicates that the top position corresponding to the shoulder center PSH in the region R1 has been identified by the top detection processing (step S5). In this case, the size determiner 15 determines use of the top position HTy identified by the top detection processing (step S5) (step S616).

On the other hand, the top detection flag Hrs for the region R1 being zero (No in step S615) indicates that no top position corresponding to the shoulder center PSH in the region R1 has been identified by the top detection processing (step S5). In this case, the size determiner 15 estimates a top position according to the same method as step S614 (step S617). A coefficient preset for estimating a top position is a value different from the coefficient for estimating a foot position.

The size determiner 15 determines a vertical size of the person corresponding to the region R1 based on the foot position and the top position (step S618). More specifically, the vertical size can be obtained by subtracting the Y coordinate of the top position from the Y coordinate of the foot position. The size determiner 15 determines a human range corresponding to the region R1 based on the shoulder center PSH, the shoulder width, the foot position TEy, the top position $HT_y$, the horizontal size, and the vertical size in the region R1 and generates human range data 28 including the shoulder center PSH, the shoulder width, the foot position TEy, the top position HTy, the horizontal size, and the vertical size in the region R1. Similarly, human range data 28 corresponding to each of the regions R2 to R5 is generated.

[7. 2 Overlap Determination Processing (Step S62)]

The reason why the overlap determination processing (step S62) is performed will be described. As shown in FIG. 12, in the frame 27a, the two regions R1 and R2 that include a shoulder width are identified. A human range is identified for each of the regions, so that multiple human ranges are identified in the frame 27a. In the frame 21a shown in FIG. 4 (corresponding to the frame 27a), however, only one person 21m exists. In this way, when two shoulder widths are detected in the same frame, the one person can be detected as different persons. The size determiner 15 performs the overlap determination processing (step S62) and prevents one person from being mistakenly detected as more than one person.

Figure 25:
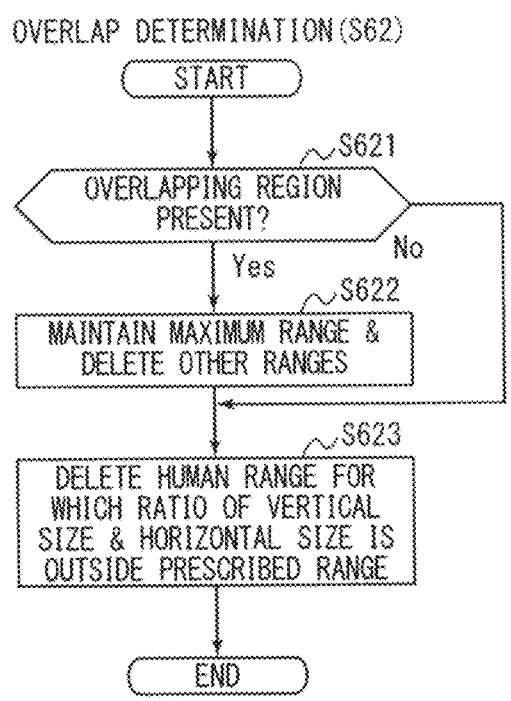
FIG. 25 is a flowchart for illustrating the overlap determination processing shown in FIG. 23.

FIG. 25 is a flowchart for illustrating the overlap determination processing (step S62). As shown in FIG. 25, the size determiner 15 determines whether overlapping human ranges are present among human ranges corresponding to the regions R1 to R5 (step S621). If overlapping human ranges are present (Yes in step S621), the size determiner 15 maintains human range data 28 corresponding to the human range with the largest area and deletes the other human range data 28 (step S622). The size determiner 15 maintains the human range data 28 with no overlapping as it is.

The size determiner 15 then deletes any presently maintained human range data 28 for which the ratio of the vertical size and the horizontal size is not within a prescribed range (step S623). The prescribed range is determined based on a typical ratio of human vertical and horizontal sizes. If the ratio of the vertical size and the horizontal size is not within the prescribed range, it is determined that the human range identified in step S61 is based on a result of erroneously detecting something else as a person. The size determiner 15 externally outputs undeleted human range data 28.

As in the foregoing, the human detection device 1 according to the embodiment detects a shoulder center and a shoulder width of a person from an input image 21 and identifies a foot position and a top position based on the detected shoulder center and shoulder width. A horizontal size of the person is determined based on the detected shoulder width and a vertical size of the person is determined based on the detected foot position and top position. In this way, a human range included in the input image 21 can be identified.

<Second Embodiment>

Now, a human detection device 2 according to a second embodiment of the present invention will be described. According to the first embodiment described above, the human detection device 1 detects a shoulder center, a shoulder width, a foot position, and a top position of a person. In contrast, the human detection device 2 detects a torso width and a leg width in addition to the above.

Hereinafter, features different from the first embodiment will be described mainly while those in common with the first embodiment described above will not be described.

[1. Structure of Human Detection Device 2]

Figure 26:
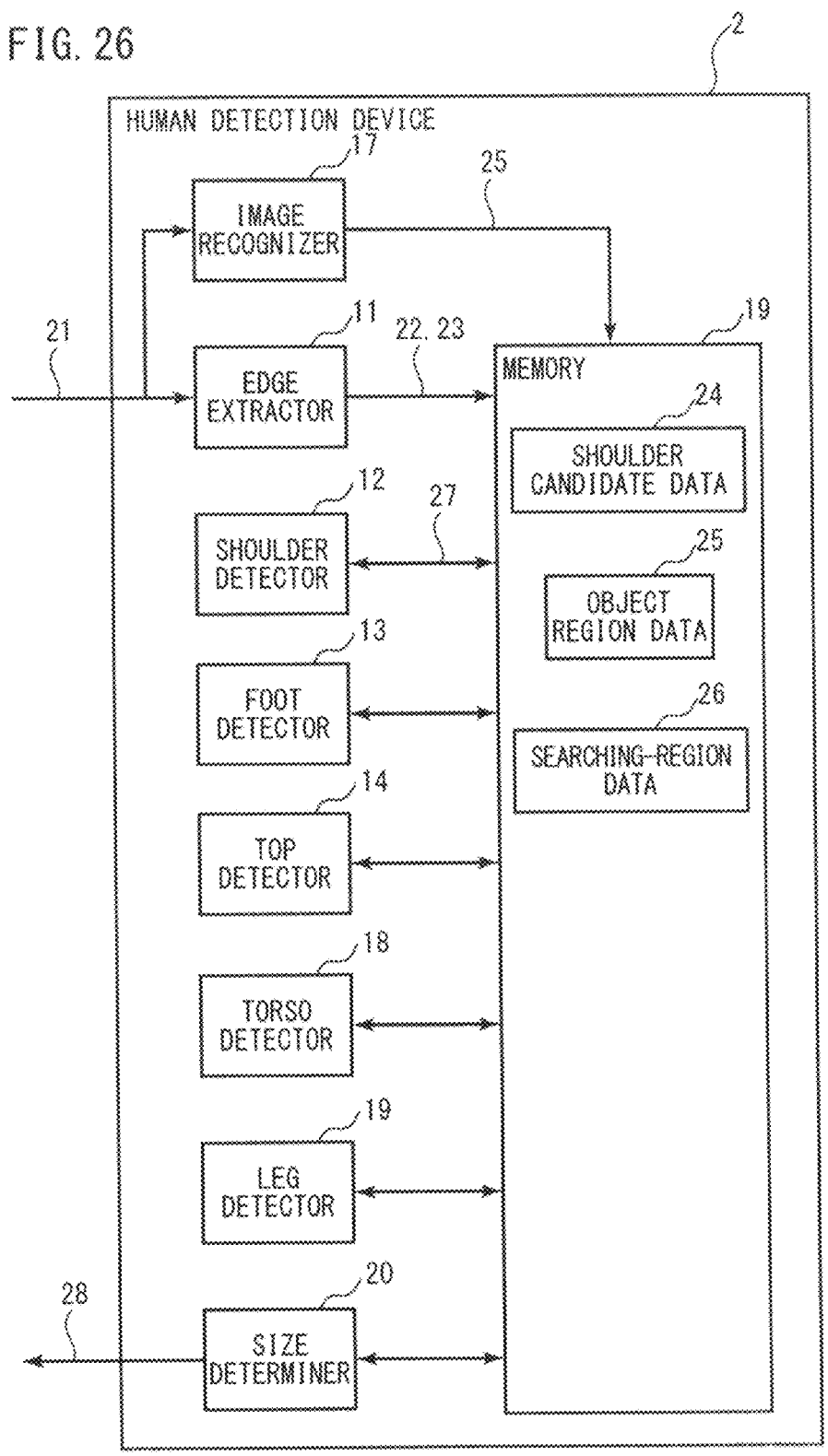
FIG. 26 is a functional block diagram showing a structure of a human detection device according to a second embodiment of the present invention.

FIG. 26 is a functional block diagram showing a structure of the human detection device 2 according to the embodiment. The human detection device 2 identifies a human range included in an input image 21.

The human detection device 2 includes an edge extractor 11, a shoulder detector 12, a foot detector 13, a top detector 14, a memory 16, an image recognizer 17, a torso detector 18, a leg detector 19, and a size determiner 20.

The edge extractor 11, the shoulder detector 12, the foot detector 13, the top detector 14, the memory 16, and the image recognizer 17 are the same as those according to the first embodiment.

The torso detector 18 detects a torso position and a torso width of a person included in the input image 21 using a vertical edge image 23 and shoulder candidate data 24. The torso position and the torso width are detected based on a shoulder center and a shoulder width detected by the shoulder detector 12.

The leg detector 19 detects a leg of the person included in the input image 21 using the vertical edge image 23 and the shoulder candidate data 24. The leg of the person is detected based on the shoulder center and the shoulder width detected by the shoulder detector 12.

The size determiner 20 determines a horizontal size of the person included in the input image 21 based on the detected shoulder width and torso width of the person and a vertical size of the person included in the input image 21 based on the detected foot position and top position. The size determiner 20 generates human range data 28 including the determined sizes, the shoulder center position, the foot position, the top position, and the like.

[2. Overall Operation of Human Detection Device 2]

The human detection device 2 detects a shoulder center, a shoulder width, a torso, a leg, a foot position, and a top position of a person included in an input image 21 and identifies the position and sizes of the person.

FIG. 27 is a flowchart for illustrating an operation of the human detection device 2. In the flowchart in FIG. 27, steps S1 to S5 are the same as those according to the first embodiment and therefore a detailed description thereof will not be provided.

The human detection device 2 detects a torso position and a torso width corresponding to a shoulder center detected in step S3 (step S7). A region searched for a torso (torso searching region) is identified based on the shoulder center and the shoulder width detected in step S3 and the searching-region data 26. Step S16 will be described later in detail.

The human detection device 2 detects a leg corresponding to the shoulder center detected in step S3 (step S8). The region searched for a leg (leg searching region) is identified based on the shoulder center and the shoulder width detected in step S3 and the searching-region data 26. Step S8 will be described later in detail.

The human detection device 2 determines a human range in the frames 21a to 21c (see FIG. 4) using the results in steps S3 to S5, S7, and S8 (step S9). The human detection device 2 finally determines whether a person is included in the frames 21a to 21c based on the results of processing in steps S3 to S5, S7, and S8. If a person is included in each frame, the human detection device 2 determines a horizontal size of the person based on the shoulder width and the torso width detected in steps S3 and S7 and determines a vertical size of the person based on the foot position and the top position detected in step S4 and S5. Step S9 will be described later in detail.

In the flowchart shown in FIG. 27, the order of performing processing in steps S4, S5, S7, and S8 is not particularly limited. These processing steps need only be performed after the shoulder center and the shoulder width of the person are identified by step S3.

Now, the processing in steps S7 to S9 will be described in detail.

3. Torso Detection Processing (Step S7)

FIG. 28 is a flowchart for illustrating torso detection processing (step S7) shown in FIG. 27. The torso detection processing (step S7) is performed by the torso detector 18. The torso detector 18 performs the processing shown in FIG. 28 to each of the regions R1 to R5 (see FIG. 12) determined to have a shoulder therein. In this way, a torso center and a torso width corresponding to a shoulder center in each of the regions R1 to R5 are identified.

In the torso detection processing (step S7), the vertical edge image 23 (see FIG. 6) is used. How to detect a torso center and a torso width corresponding to the region R1 will be described as an example.

As shown in FIG. 28, the torso detector 18 determines a torso searching region corresponding to the region R1 based on searching-region data 26 and the shoulder center and the shoulder width in region R1 recorded in the shoulder candidate data 24 (step S71).

The torso detector 18 calculates a torso likelihood value for each pixel in the torso searching region (step S72). The torso likelihood represents the degree of likelihood of each pixel corresponding to a torso center. The torso detector 18 adds up the likelihood values of pixels in the vertical direction (Y-axis direction) to calculate a torso integrated value (step S73). Hereinafter, a line of pixels arranged in the vertical direction in the leg searching region that will be described will be referred to as a "column."

The torso detector 18 determines the presence/absence of a torso in the torso searching region based on a torso integrated value for each column (step S74). The torso detector 18 determines a torso center and a torso width corresponding to a shoulder in the region R1 based on the torso integrated value of each column (step S75). Note that if the absence of a torso is determined in step S74, step S75 may be omitted.

[3. 1 Torso Searching Region Determination (Step S71)]

FIG. 29 is a view showing a positional relation between a shoulder center PSH and a torso searching region BD1. As shown in FIG. 29, the torso searching region BD1 is defined as a rectangular region. The X coordinate $X_{PBD1}$ and the Y coordinate $Y_{PBD1}$ of a pixel PBD1 at the upper left vertex of the torso searching region BD1 are represented by the following Expression (11) and the X coordinate $X_{PBD2}$ and the Y coordinate $Y_{PBD2}$ of a pixel PBD2 at the lower right vertex are represented by the following Expression (12). A window width winb will be described later.

$$X_{PBD1} = X_{SH} - \frac{SH\_W}{n}, Y_{PBD1} = Y_{SH} \tag{11}$$

$$X_{PBD2} = X_{SH} + \frac{SH\_W}{n}, Y_{PBD2} = Y_{SH} + SH\_W \times R \tag{12}$$

In Expressions (11) and (12), the constant n is common to the constant n used in Expressions (7) and (8). The constant R is preferably 2. Using Expressions (11) and (12) recorded in the searching-region data 26, the torso detector 18 determines the torso searching region BD1.

[3. 2 Processing of Calculating Torso Likelihood Value (Step S72)]

The torso detector 18 calculates a torso likelihood value for each pixel in the torso searching region BD1 (step S72). The procedure of calculating the torso likelihood value is basically the same as that used in calculating the shoulder likelihood value (see FIG. 11). Note however that a left pixel group and a right pixel group used for calculating a torso likelihood value have different shapes from the left pixel group LG1 and the right pixel group RG1 (see FIG. 10) used for calculating a shoulder likelihood value. Furthermore, the center pixel group CG (see FIG. 10) is not used for calculating a torso likelihood value.

FIG. 30 illustrates the procedure of calculating a torso likelihood value and an estimated torso width for each pixel. The pixels in FIG. 30 are pixels in the vertical edge image 23. A torso likelihood value is calculated for a reference pixel Pb. Assume that there are a left pixel group LG2 and a right pixel group RG2 positioned on the left and right of the reference pixel Pb. The left pixel group LG2 and the right pixel group RG2 each have three pixels continuously arranged in the Y axis direction. The left pixel group has pixels LP6 to LP8 sequentially from the top. The right pixel group RG2 has pixels RP6 to RP8 sequentially from the top. The pixels LP6 and RP6 have the same Y coordinate as that of the reference pixel Pb.

The torso detector 18 performs weighted addition to each pixel in the left pixel group LG2 positioned a distance $k_b$ apart from the reference pixel Pb to generate a left calculated value. The torso detector 18 performs weighted addition to each pixel in the right pixel group RG2 the distance $k_b$ apart from the reference pixel Pb to generate a right calculated value. A numerical value generated by adding the left calculated value and the right calculated value is obtained as a torso likelihood value at the distance $k_b$.

The torso detector 18 changes the distance $k_b$ in the range from a half of a minimum window width $wb_{min}$ to a half of a maximum window width $wb_{max}$ to calculate torso likelihood values for respective distances $k_b$ (individual torso likelihood values). The minimum window width $wb_{min}$ and the maximum window width $wb_{max}$ are the minimum and maximum values for the distance between the left pixel group LG2 and the right pixel group RG2 and represented by Expressions (13) and (14).

$$wb_{min} = SH\_W - SH\_W/f \quad (13)$$

$$wb_{max} = SH\_W + SH\_W/f \quad (14)$$

The constant f is an integer from 3 to 6 in Expressions (13) and (14).

A maximum value among multiple individual torso likelihood values is selected as a torso likelihood value for the reference pixel Pb and an estimated torso width is determined based on the distance $k_b$ corresponding to the maximum individual likelihood value.

Figure 31:
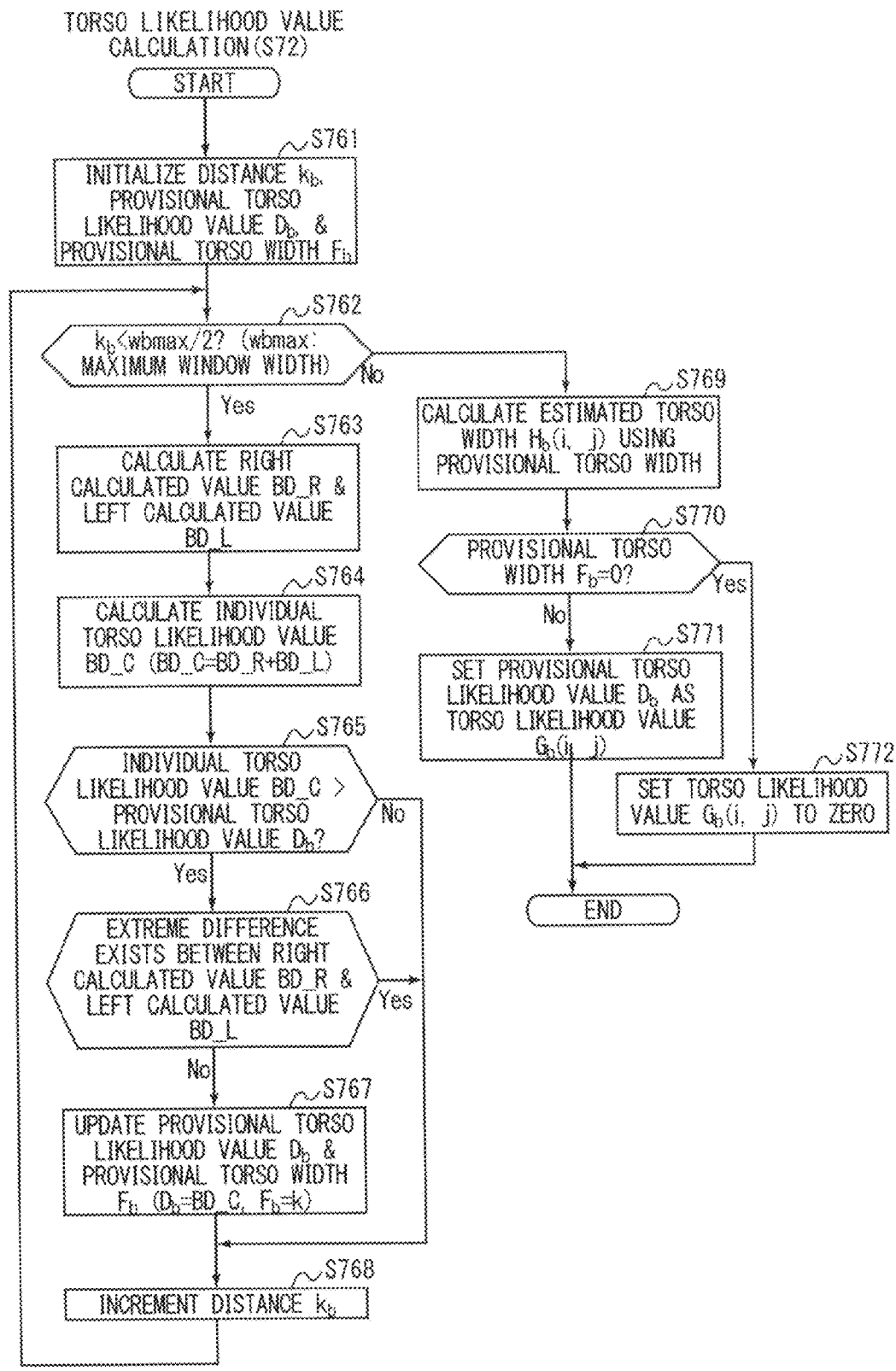
FIG. 31 is a flowchart for illustrating the processing of calculating a torso likelihood value shown in FIG. 28.

FIG. 31 is a flowchart for illustrating the processing of calculating a torso likelihood value and an estimated torso width for the reference pixel Pb (step S72). The processing shown in FIG. 31 is performed for each pixel in the torso searching region BD1. Steps S761 to S772 shown in FIG. 31 correspond to steps S372 to S383 shown in FIG. 11. Hereinafter, a description of the same processing as the processing shown in. FIG. 11 will be partly omitted.

Each pixel in the torso searching region BD1 is determined as a pixel for calculation according to the same procedure as that of the processing shown in FIG. 9. More specifically, the pixels in the torso searching region BD1 are scanned sequentially from the pixel PBD1 at the upper left vertex to the pixel PBD2 at the upper right vertex in the torso searching region BD1 in the left-right direction.

As shown in FIG. 31, the torso detector 18 initializes a distance $k_b$, a provisional torso likelihood value $D_b$, and a provisional torso width $F_b$ (step S761). The provisional torso likelihood value $D_b$ is the maximum value among individual torso likelihood values calculated up to the point and a prescribed initial value is set thereto. The initial value for the distance $k_b$ is a half of the minimum window width ($wb_{min}$). The provisional torso width $F_b$ is set to zero.

If the distance $k_b$ is less than a half of the maximum window width ($wb_{max}$) (Yes in step S762), the torso detector 18 calculates a left calculated value BD_L generated by performing weighted addition to each pixel value in the left pixel group LG2 and a right calculated value BD_R generated by performing weighted addition to each pixel value in the right pixel group RG2 (step S763). The left calculated value BD_L and the right calculated value BD_R are calculated according to the following Expressions (15) and (16).

$$BD\_L = Y_V(i-k_b,j) + Y_V(i-k_b,j+1) \times c + Y_V(i-k_b,j+2) \times d \quad (15)$$

$$BD\_R = Y_V(i+k_b,j) + Y_V(i+k_b,j+1) \times c + Y_V(i+k_b,j+2) \times d \quad (16)$$

In Expressions (15) and (16), $Y_V$ represents the pixel value of each pixel in the vertical edge image 23. The constant c is a weight coefficient for the pixels LP7 and RP7 and the constant d is a weight coefficient for the pixels LP8 and RP8. A weight coefficient for the pixels LP6 and RP6 is one. The torso detector 18 adds the right calculated value BD_R to the left calculated value BD_L to calculate an individual torso likelihood value BD_C corresponding to the present distance $k_b$ (step S764).

If the individual likelihood value BD_C exceeds the provisional torso likelihood value $D_b$ (Yes in step S765), the torso detector 18 determines whether an updating condition for the provisional torso likelihood value $D_b$ is satisfied (step S766). More specifically, the torso detector 18 determines whether there is an extreme difference between the left calculated value BD_L and the right calculated value BD_R based on expressions resulting by substituting the left calculated value SH_L and the right calculated value SH_R in Expressions (4) and (5) by the left calculated value BD_L and the right calculated value BD_R. The torso detector 18 updates the provisional torso likelihood value $D_b$ to the individual torso likelihood value BD_C and the provisional torso width $F_b$ to the present distance $k_b$ (step S767) upon determining that there is no extreme difference (No in step S766). Then, the torso detector 18 increments the distance $k_b$ (step S768).

The torso detector 18 repeats steps S763 to S768 until the distance $k_b$ exceeds $wb_{max}/2$ (No in step S762). In this way, the maximum individual torso likelihood value BD_C and the distance $k_b$ corresponding to the maximum individual torso likelihood value BD_C are identified in the range from $wb_{min}/2$ to $wb_{max}/2$.

If the distance $k_b$ is equal to or more than $wb_{max}/2$ (No in step S762), the torso detector 18 calculates an estimated torso width $H_b(i, j)$ for the reference pixel Pb based on the provisional torso width $F_b$ (step S769). The estimated torso width $H_b(i, j)$ is generated from an expression resulting by substituting the provisional shoulder width $F_s$ by the provisional torso width $F_b$ in Expression (6).

If the provisional torso width $F_b$ is more than zero (No in step S770), the torso detector 18 sets the provisional torso likelihood value $D_b$ as a torso likelihood value $G_b(i, j)$ for the reference pixel Pb (step S771). If the provisional torso width $F_b$ is zero (Yes in step S770), the torso likelihood value $G_b(i, j)$ is set to zero (step S772).

[3. 3 Processing of Calculating Torso Integrated Value (Step S73)]

Figure 32:
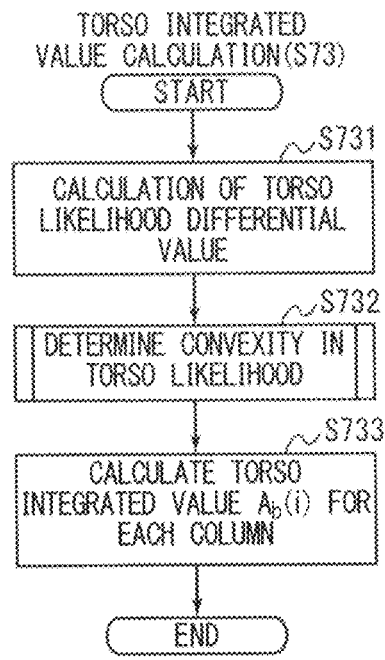
FIG. 32 is a flowchart for illustrating the processing of calculating a torso integrated value shown in FIG. 28.

Then, in step S73, the torso detector 18 adds up the torso likelihood values of the pixels in the torso searching region BD1 on a column basis. FIG. 32 is a flowchart for illustrating the processing of calculating a torso integrated value (step S73).

Referring to FIG. 32, the processing of calculating a torso integrated value (step S73) will be described. The torso detector 18 calculates a torso likelihood differential value for each pixel in the torso searching region BD1 (step S731). The torso detector 18 performs the processing of determining convexity in torso-likelihood for each of the pixels in the torso searching region BD1 using the torso likelihood differential value of each pixel (step S732). A pixel having a torso likelihood value greater than the left and right likelihood values is identified in the torso searching region BD1 by step S732. The torso detector 18 adds up the torso likelihood values $G_b$ of the pixels on a column basis to calculate a torso integrated value $A_b(i)$ (step S733).

[3. 3. 1 Calculation of Torso Likelihood Differential Value (Step S731)]

Figure 33:
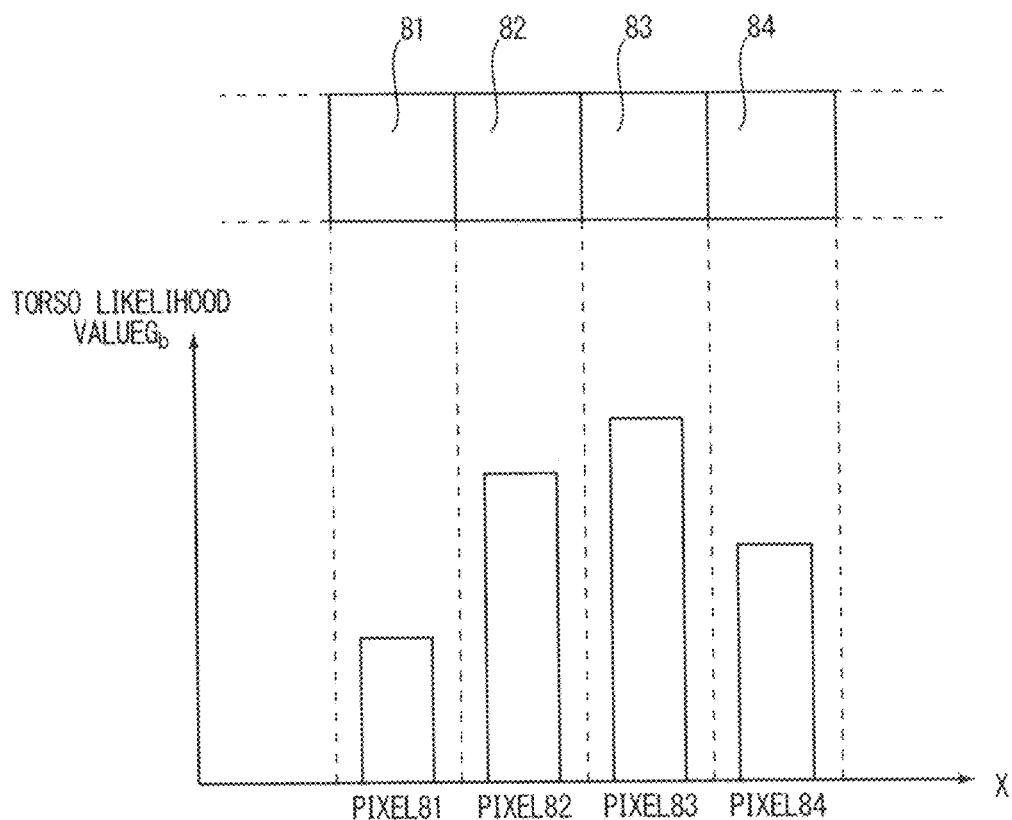
FIG. 33 is a view showing an example of a pixel arrangement and a distribution of torso likelihood values in the torso searching region shown in FIG. 29.

FIG. 33 shows an example of an arrangement of some of pixels and a torso likelihood distribution in the torso searching region BD1. Referring to FIG. 33, step S731 will be described. A torso likelihood differential value for a pixel 83 is generated by subtracting the torso likelihood value of an adjacent pixel 82 on the left of the pixel 83 from the torso likelihood value of the pixel 83.

Each pixel is determined as a pixel for calculating a torso likelihood differential value in the same procedure as that of the processing shown in FIG. 9. However, the leftmost pixel in the torso searching region BD1 including the pixel PBD1 is not determined as a pixel for calculating a torso likelihood differential value, since a torso likelihood value for its left adjacent pixel is not calculated.

[3. 3. 2 Processing of Determining Convexity in Torso Likelihood (step S732)]

In the processing of determining convexity in torso likelihood (step S732), it is determined whether the torso likelihood value $G_b$ of each pixel in the torso searching region BD1 has a torso likelihood value greater than the torso likelihood values $G_b$ of pixels on the left and right thereof.

Figure 34:
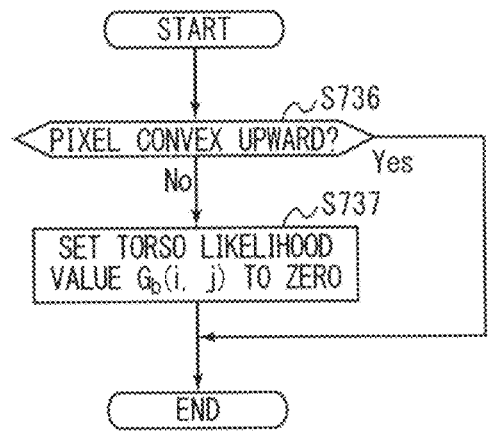
FIG. 34 is a flowchart for illustrating the processing of determining convexity in torso likelihood shown in FIG. 32.

FIG. 34 is a flowchart for illustrating the processing of determining convexity in torso likelihood (step S732). Referring to FIGS. 33 and 34, step 732 will be described in detail by referring to the case in which the pixel 83 is to be determined as an example.

The torso detector 18 determines whether the torso likelihood value $G_b$ of the pixel 83 is convex upward based on the following Expression (17) (step S736).

$$lin(i)>0, lin(i-1)>0 \text{ and } lin(i+1)<0 \qquad (17)$$

In Expression (17), lin(i) is a torso likelihood differential value for a pixel for determination, lin(i−1) is a torso likelihood differential value for an adjacent pixel on the left of the pixel for determination, and lin(i+1) is a torso likelihood difference value for an adjacent pixel on the right of the pixel for determination.

If the three inequalities according to Expression (17) are all satisfied, the torso likelihood value of the pixel 83 is determined to be convex upward (Yes in step S736). If lin(i)>0, the torso likelihood value of the pixel 83 is greater than that of the pixel 82. If lin(i−1)>0, the torso likelihood value of the pixel 82 is greater than that of the pixel 81. If lin(i+1)<0, the torso likelihood value of the pixel 83 is greater than that of the pixel 84. As a result, the peak position of the torso likelihood value $G_b$ in the interval of the pixels 81 to 84 is at the pixel 83, and therefore it is determined that the torso likelihood value of the pixel 83 is convex upward.

If a pixel for determination is convex upward (Yes in step S736), the torso likelihood value of the pixel for determination is maintained as it is. On the other hand, if the pixel is not convex upward (No in step S736), the torso likelihood value of the pixel is set to zero (step S737). In the example shown in FIG. 33, it is determined that the pixel 83 is convex upward (Yes in step S736) and therefore the torso likelihood value of the pixel 83 is maintained. On the other hand, it is determined that the pixels 81, 82, and 84 are not convex upward (No in step S736), and therefore the torso likelihood values of the pixels 81, 82, and 84 are set to zero (step S737).

In the processing of determining convexity in torso likelihood (step S732), each pixel is selected as a pixel for determination according to the same procedure as that of the processing shown in FIG. 9. The torso detector 18 however cannot perform determination (step S736) using Expression (17) to the first and second pixels from the left and the rightmost pixel in the torso searching region BD. These pixels are not selected as pixels for determination in step S736 and their torso likelihood values are set to zero.

In this way, since the torso likelihood values of pixels that are not convex upward based on the determination are set to zero as described above, the difference among the torso integrated values $A_b(i)$ of the columns calculated in step S733 can be made distinct. Note that the torso integrated value $A_b(i)$ can be obtained while omitting the processing of determining convexity in torso-likelihood (step S732).

[3. 4 Torso Presence/Absence Determination (Step S74)]

Figure 35:
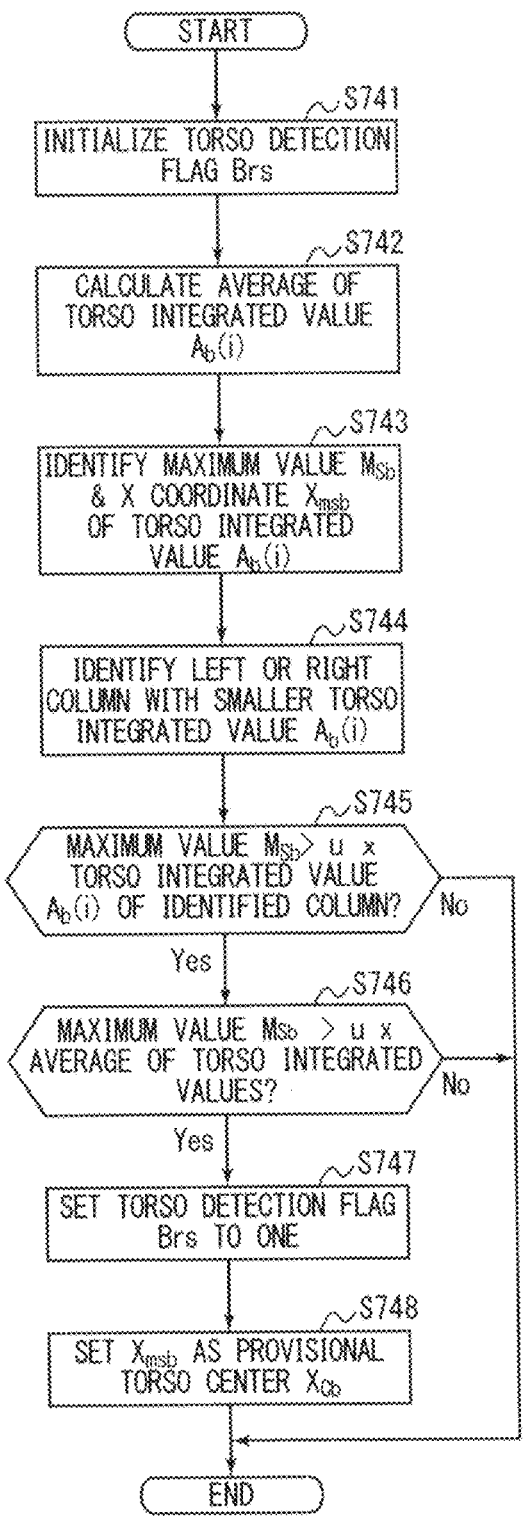
FIG. 35 is a flowchart for illustrating the torso presence/absence determination processing shown in FIG. 28.

FIG. 35 is a flowchart for illustrating the processing of determining torso presence/absence (step S74). Referring to FIG. 35, step S74 will be described in detail.

The torso detector 18 initializes the torso detection flag Brs to zero (step S741). The torso detection flag Brs indicates whether a torso is detected from the torso searching region BD1 and the flag is used in the size determination processing (step S9) that will be described. The torso detection flag Brs being zero indicates that a torso has not been detected and the torso detection flag Brs being one or more indicates that a torso has been detected.

The torso detector 18 calculates the average of torso integrated values $A_b(i)$ using the torso integrated values $A_b(i)$ of the columns (step S742). The torso detector 18 identifies a maximum torso integrated value (torso maximum value $M_{sb}$) among the torso integrated values $A_b(i)$ of the columns and identifies the X coordinate $X_{msb}$ of a column corresponding to the torso maximum value $M_{sb}$ (step S743).

The torso detector 18 selects a column having a smaller torso integrated value $A_b(i)$ between the two adjacent columns on the left and right of the column having the torso maximum value $M_{sb}$ (step S744). The torso detector 18 determines whether the torso maximum value $M_{sb}$ exceeds u times the torso integrated value $A_b(i)$ of the column identified in step S744 (step S745).

If the torso maximum value $M_{sb}$ is equal or less than u times the torso integrated value $A_b(i)$ of the identified column (No in step S745), the torso detector 18 determines that the torso maximum value $M_{sb}$ does not have any distinct peak compared to the other torso integrated values $A_b(i)$ and no significant torso width has been detected in the torso searching region BD. In this case, the torso detector 18 ends the processing in FIG. 35 while maintaining the torso detection flag Brs at zero.

On the other hand, if the torso maximum value $M_{sb}$ exceeds u times the torso integrated value of the identified column (Yes in step S745), the torso detector 18 determines whether the torso maximum value $M_{sb}$ exceeds u times the average of the torso integrated values (step S746). The torso detector 18 determines that no significant torso width can be detected similarly to the above if the torso maximum value $M_{sb}$ is equal to or less than u times the average of the torso integrated values (No in step S746) and ends the processing shown in FIG. 35.

On the other hand, if the torso maximum value $M_{sb}$ exceeds u times the average of the torso integrated values (Yes in step S746), the torso detector 18 determines that there is a significant torso width and sets the torso determination flag Brs to one (step S747). The torso detector 18 sets the X coordinate $X_{msb}$ of the column having the torso maximum value $M_{sb}$ to a provisional torso center $X_{cb}$ and ends the processing shown in FIG. 35.

[3. 5 Torso Width Determination (Step S75)]

Figure 36:
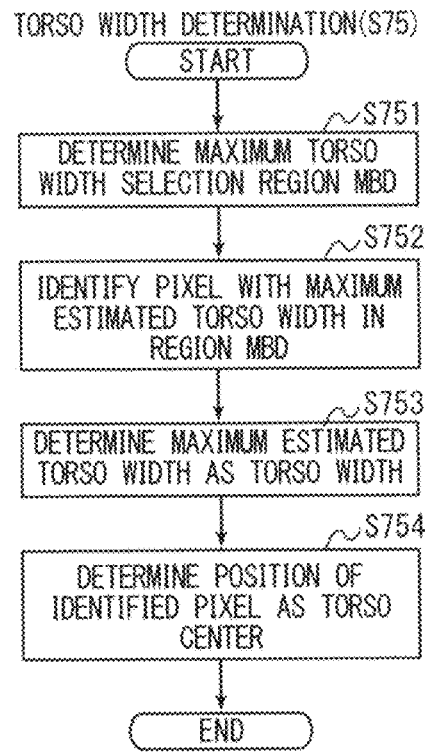
FIG. 36 is a flowchart for illustrating the torso width determination processing shown in FIG. 28.

FIG. 36 is a flowchart for illustrating torso width determination processing (step 75). Referring to FIG. 36, step S75 will be described in detail.

The torso detector 18 determines a maximum torso width selection region MBD based on the provisional torso center $X_{cb}$ set in step S748 (step S751).

Figure 37:
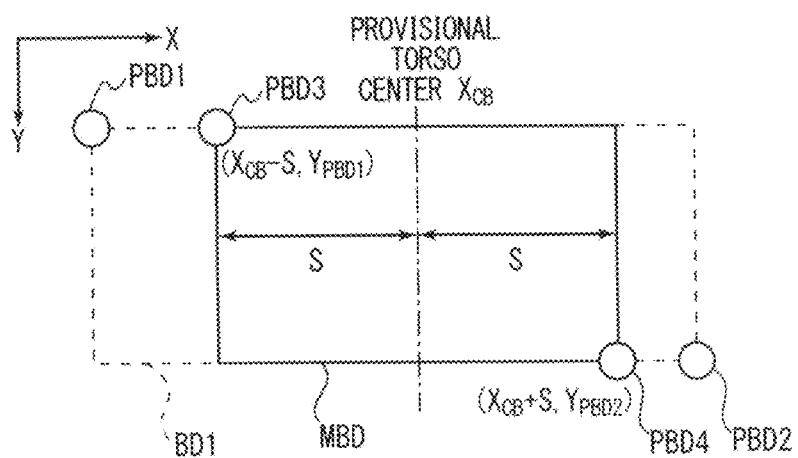
FIG. 37 shows a maximum torso width selection region for use in the torso width determination processing shown in FIG. 28.

FIG. 37 shows a relation between the maximum torso width selection region MBD and the provisional torso center $X_{cb}$. The X coordinate of a pixel PBD3 at the upper left vertex of the maximum torso width selection region MBD is a value generated by subtracting a predetermined constant S from the provisional torso center $X_{cb}$ and the Y coordinate is equal to the Y coordinate of the pixel PBD1. The X coordinate of a pixel PBD4 at the upper right vertex is a value generated by adding the constant S to the provisional torso center $X_{cb}$ and the Y coordinate is equal to the Y coordinate of the Y coordinate of the pixel PBD2. The constant S is such a value that allows the maximum torso width selection region MBD to be positioned in the torso searching region BD1.

The torso detector 18 identifies a pixel having a maximum estimated torso width $H_b$ among the pixels in the maximum torso width selection region MBD (step S752). The torso detector 18 determines the maximum estimated torso width $H_b$ as a torso width corresponding to the region R1 (step S753) and the coordinates of the pixel having the maximum estimated torso width $H_b$ as a torso center (step S754).

In this way, the torso center and torso width corresponding to the region R1 are identified. The torso center and torso width corresponding to each of the regions R2 to R5 are identified in the same manner. The torso detection flags Brs and the torso widths obtained for the regions R1 to R5 are used in the size determination processing (step S9) that will be described in the following.

[4. Leg Detection Processing (Step S8)]

Figure 38:
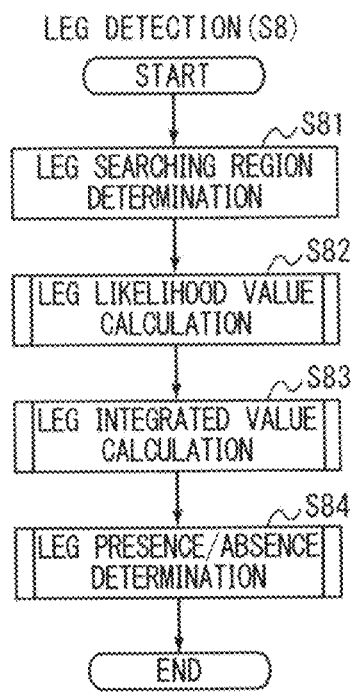
FIG. 38 is a flowchart for illustrating the leg detection processing shown in FIG. 27.

FIG. 38 is a flowchart for illustrating leg detection processing (step S8) shown in FIG. 27. The leg detection processing (step S8) is performed by the leg detector 19. The leg detector 19 performs the processing shown in FIG. 38 to each of the regions R1 to R5 (see FIG. 12) determined to have a shoulder. In this way, a leg corresponding to a shoulder center in the regions R1 to R5 is detected. The vertical edge image 23 (see FIG. 6) is used in the leg detection processing (step S8).

The leg detection processing (step S8) is the same as the torso detection processing (step S7) except that a leg searching region is different from the torso searching region BD1 and a leg width is not identified. In the following, the leg detection processing (step S8) will be described mainly about its features different from the torso detection processing (step S7) by referring to how to detect a leg corresponding to the region R1 as an example.

As shown in FIG. 38, the leg detector 19 determines a leg searching region corresponding to the region R1 based on the searching-region data 26 and the shoulder candidate data 24 (step S81). The leg detector 19 calculates a leg likelihood value for each pixel in the leg searching region (step S82). The leg likelihood value represents the degree of likelihood of each pixel corresponding to a center of a leg. The leg detector 19 adds up the leg likelihood values of pixels in the Y-axis direction and calculates a leg integrated value for each column (step S83). The leg detector 19 determines the presence/absence of a leg in the leg searching region based on the leg integrated value of each column (step S84).

In the leg detection processing (step S8), a leg center or a leg width corresponding to region R1 does not have to be obtained. In general, a person has a leg width smaller than the shoulder width and the torso width, and therefore the leg width is not used to determine the horizontal size of the person in the size determination processing (step S9). However, the present embodiment does not exclude the possibility of obtaining a leg center and a leg width corresponding to the regions R1 to R5.

[4. 1 Leg Searching Region Determination (step S81)]

Figure 39:
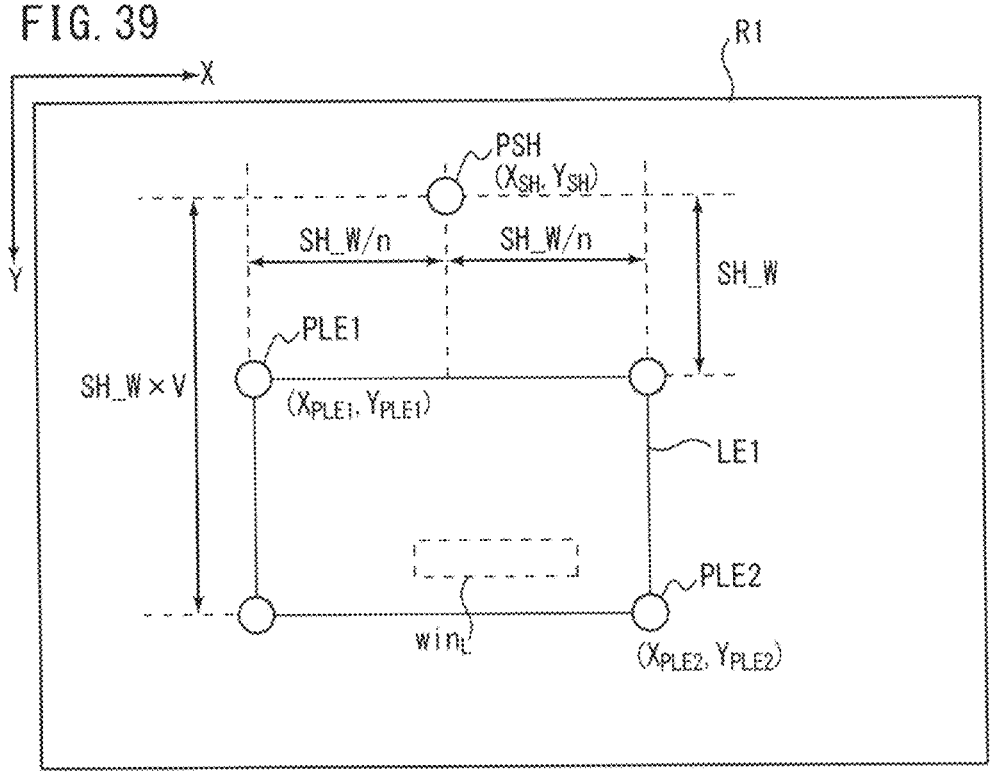
FIG. 39 is a general procedure of the processing of determining a leg searching region shown in FIG. 38.

FIG. 39 shows a positional relation between the shoulder center PSH and a leg searching region LE1. As shown in FIG. 39, the X coordinate $X_{PLE1}$ and the Y coordinate $Y_{PLE1}$ of a pixel PLE1 at the upper left vertex of the leg searching region LE1 are represented by the following Expression (18) and the coordinate $X_{PLE2}$ and the Y coordinate $Y_{PLE2}$ of a pixel PLE2 at the lower right vertex are represented by the following Expression (19). The window width $win_L$ will be described later.

$$X_{PLE1} = X_{SH} - \frac{SH\_W}{n}, \quad Y_{PLE1} = Y_{SH} + SH\_W \quad (18)$$

$$X_{PLE2} = X_{SH} + \frac{SH\_W}{n}, \quad Y_{PLE2} = Y_{SH} + SH\_W \times V \quad (19)$$

In Expressions (18) and (19), the constant n is common to the constant n used in Expressions (7) and (8). The constant V is preferably 2.5. The leg detector 19 determines the leg searching region LE1 using Expressions (18) and (19) recorded in the searching-region data 26.

[4. 2 Leg Likelihood Value Calculation Processing (Step S82)]

The leg detector 19 calculates a leg likelihood value for each pixel in the leg searching region LE1 (step S82). Similarly to the torso likelihood value calculation processing (see FIG. 30), a reference pixel Pb, a left pixel group LG2, and a right pixel group RG2 are set in the leg searching region LE1. The leg likelihood value is calculated by performing weighted addition to the pixel values in the left pixel group LG2 and weighted addition to the pixel values in the right pixel group RG2. The minimum window width $wb_{min}$ and the maximum window width $wb_{max}$ used in the torso likelihood value calculation processing (step S72) are also used in the leg likelihood value calculation processing (step S82).

Figure 40:
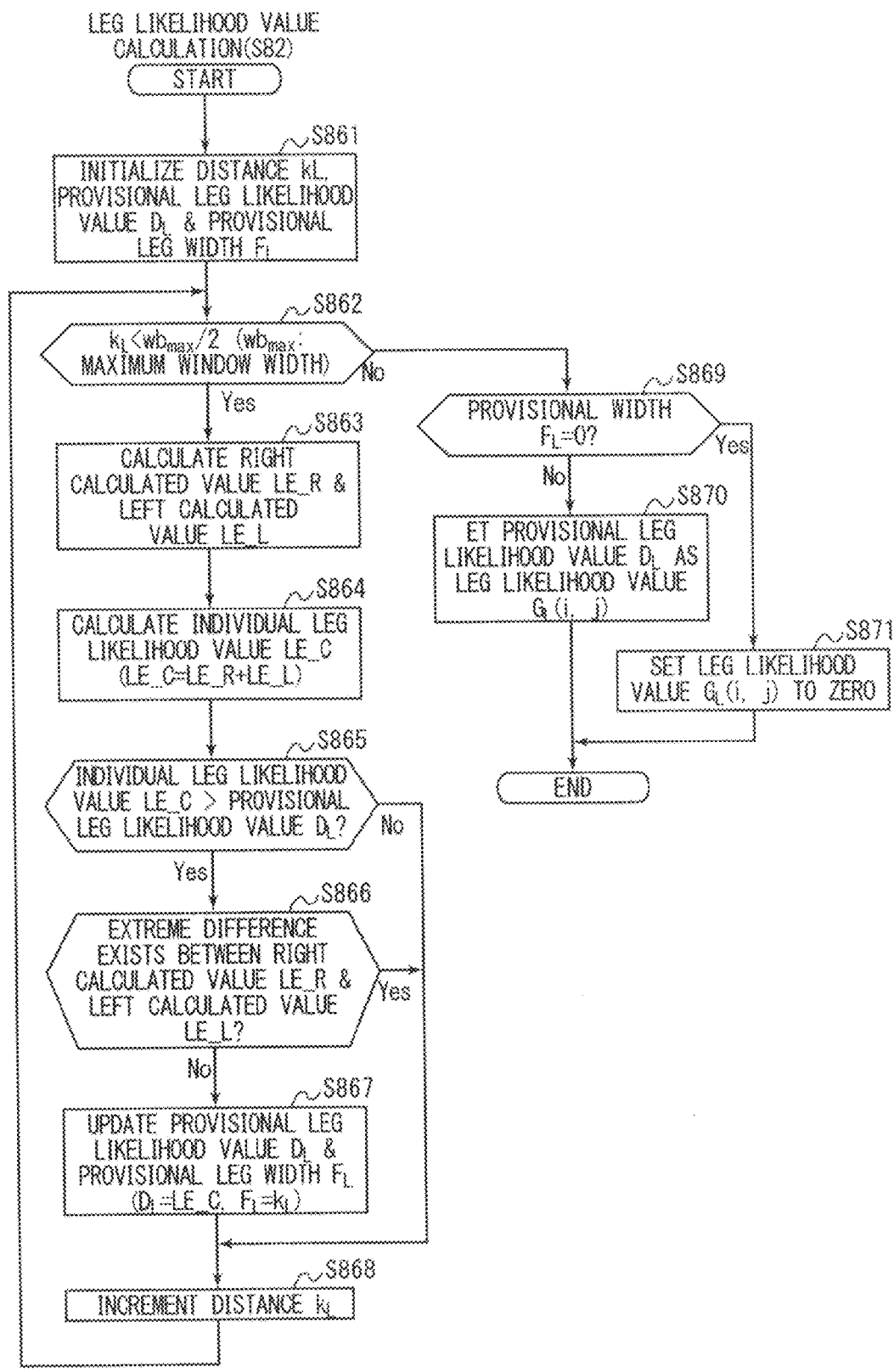
FIG. 40 is a flowchart for illustrating the processing of calculating a leg likelihood value shown in FIG. 38.

FIG. 40 is a flowchart for illustrating the leg likelihood value calculation processing (step S82). Steps S861 to S868 shown in FIG. 40 correspond to steps S761 to 768 shown in FIG. 31 and steps S869 to S871 correspond to steps S770 to S772 shown in FIG. 31. This is because in the leg detection processing (step S8), a leg width is not obtained and therefore calculation of an estimated leg width is not necessary.

As shown in FIG. 40, the leg detector 19 initializes a distance $k_L$, a provisional likelihood value $D_L$, and a provisional leg width $F_L$ (step S861). If the distance $k_L$ is smaller than a half of the maximum window width ($wb_{max}$) (Yes in step S862), the leg detector 19 calculates a left calculated value LE_L and a right calculated value LE_R using expressions resulting by substituting the distance $k_b$ by the distance $K_L$ in Expressions (15) and (16) described above (step S863). The leg detector 19 adds the right calculated value LE_R to the left calculated value LE_L to obtain an individual leg likelihood value LE_C (step S864).

If the individual leg likelihood value LE_C exceeds the provisional leg likelihood value $D_L$ (Yes in step S865), the leg detector 19 determines whether there is an extreme difference between the left calculated value LE_L and the right calculated value LE_R (step S866). The leg detector 19 updates the provisional leg likelihood value $D_L$ to the individual leg likelihood value LE_C and updates the provisional leg width $F_L$ to the present distance $k_L$ (step S867) upon determining that there is no extreme difference (NO in step S866). The leg detector 19 increments the distance $k_L$ (step S868).

The leg detector 19 repeats steps S863 to S868 until the distance $k_L$ exceeds $wb_{max}/2$ (No in step S862). In this way, the maximum individual leg likelihood value LE_C and the distance $k_L$ corresponding to the maximum individual leg likelihood value LE_C are identified in the range from $wb_{min}/2$ to $wb_{max}/2$.

If the distance $k_L$ is equal to or more than $wb_{max}/2$ (No in step S862), the leg detector 19 determines whether the provisional leg width $F_L$ is zero (step S869). If the provisional leg width $F_L$ is greater than zero (No in step S869), the leg detector 19 sets the provisional likelihood value $D_L$ as a leg likelihood value $G_L$ (i, j) for the reference pixel Pb (step S870). If the provisional leg width $F_L$ is zero (Yes in step S869), the leg likelihood value $G_L$ (i, j) is set to zero (step S871).

4. 3 Leg Integrated Value Calculation Processing (Step S83)

Figure 41:
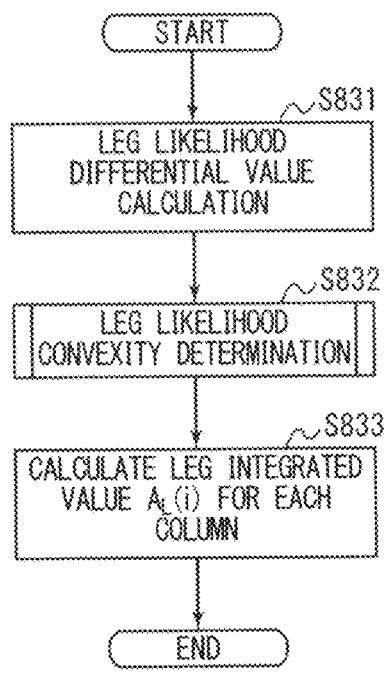
FIG. 41 is a flowchart for illustrating the processing of calculating a leg integrated value shown in FIG. 38.

FIG. 41 is a flowchart for illustrating leg integrated value calculation processing (step S83). The leg detector 19 calculates a leg integrated value $A_L(i)$ corresponding to each column in the leg searching region LE1 according to the same procedure as that of the torso integrated value calculation processing (step S73).

The leg detector 19 calculates a leg likelihood differential value for each pixel in the leg searching region LE1 (step S831). The leg likelihood differential value is generated by subtracting the leg likelihood value of an adjacent pixel on the left side from the leg likelihood value of the pixel for calculation.

The leg detector 19 performs the processing of determining convexity in leg likelihood (step S832) using the leg likelihood differential value of each pixel. In step S832, the same processing as that shown in FIG. 34 is performed. More specifically, if a pixel for calculation is convex upward, the leg likelihood value of the pixel is maintained as it is. If the pixel for calculation is not convex upward, the leg likelihood value of the pixel is set to zero.

After step S832, the leg detector 19 adds up the leg likelihood values $G_L$ of the pixels for each column to calculate a leg integrated value $A_L(i)$ (step S833).

[4. 4 Leg Presence/Absence Determination (Step S84)]

Figure 42:
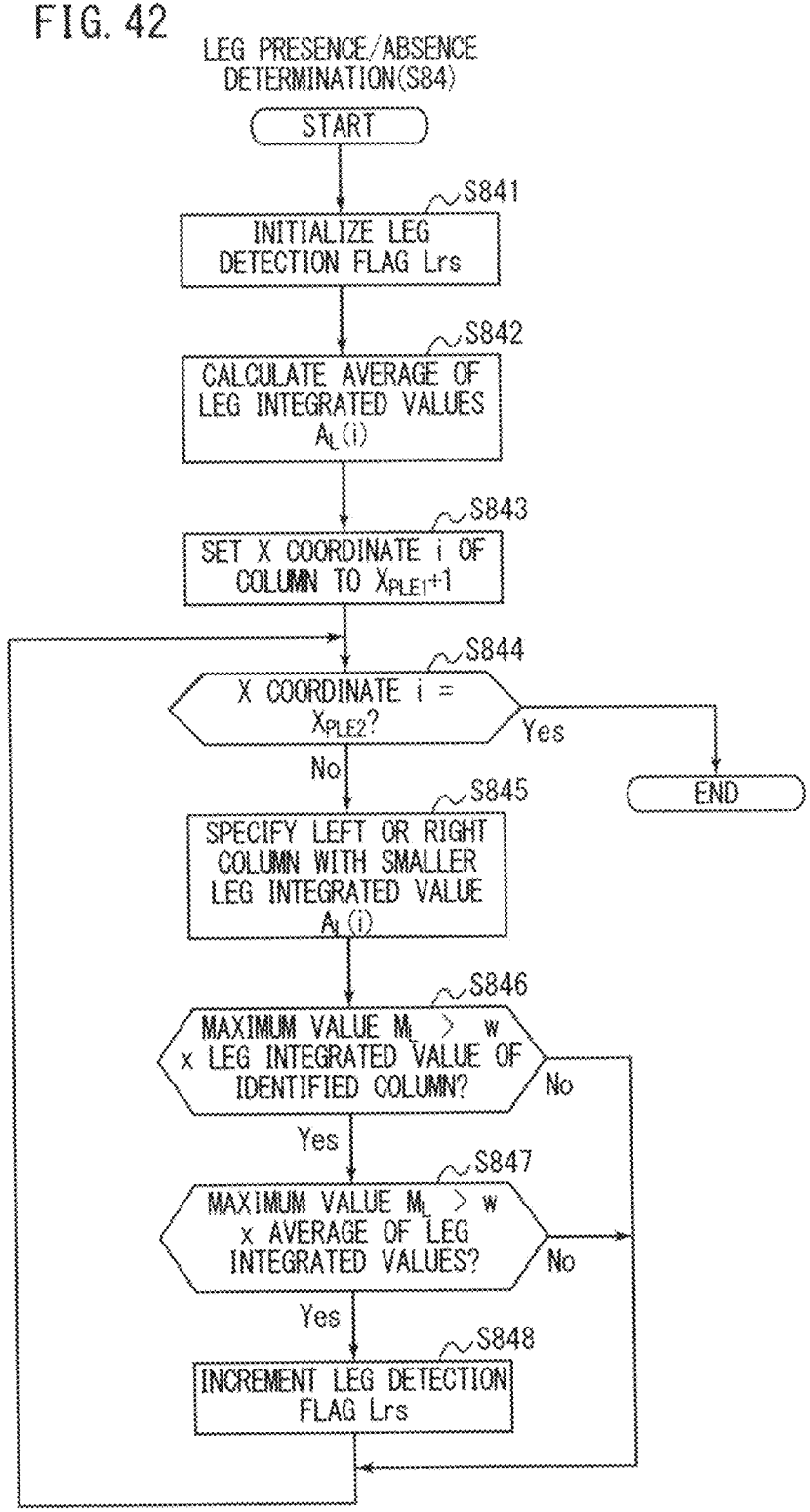
FIG. 42 is a flowchart for illustrating the leg presence/absence determination processing shown in FIG. 38.

FIG. 42 is a flowchart for illustrating leg presence/absence determination processing (step S84). In the torso presence/absence determination processing (step S74), the presence/absence of a torso is determined based on the maximum torso integrated value $A_b(i)$ while in the leg presence/absence determination processing (step S84), it is determined whether the leg integrated value $A_L(i)$ of each column has a more significant peak than the leg integrated values of the columns on the left and right.

The leg detector 19 initializes a leg detection flag Lrs to zero (step S841). The leg detection flag Lrs being zero indicates that no leg has been detected and the leg detection flag Lrs being equal to or more than one indicates that a leg has been detected.

The leg detector 19 calculates the average of the leg integrated values $A_L(i)$ of the columns (step S842) and sets the X coordinate i of a column for determination to $X_{PLE1}+1$ (step S844). In this way, the second column from the left in the leg searching region LE1 is selected as a column for determination. The leftmost column does not have a column for comparison on the left thereof and is therefore left out from determination.

The leg detector 19 determines whether the X coordinate i of a column for determination is equal to $X_{PLE2}$ (step S844). If the X coordinate is equal to $X_{PLE2}$ (Yes in step S844), a column for determination is the rightmost column in the leg searching region LE1 and there is no column to be compared therewith on the right. Therefore, the leg detector 19 ends the processing shown in FIG. 42.

On the other hand, if the X coordinate of the column for determination is smaller than $X_{PLE2}$ (No in step S844), the leg detector 19 identifies the column with the smaller leg integrated value $A_L(i)$ between the two columns adjacent to the column for determination on the left and right (step S845). The leg detector 19 determines whether the leg integrated value $A_L(i)$ of the column for determination is more than w times the leg integrated value $A_L(i)$ of the column identified in step S845 (step S846).

If the leg integrated value $A_L(i)$ of the column for determination is equal to or less than w times the leg integrated value $A_L(i)$ of the identified column (No in step S846), the leg detector 19 determines that the leg integrated value $A_L(i)$ of the column for determination does not have a distinct peak compared to those on the left and right thereof.

On the other hand, if the leg integrated value $A_L(i)$ of the column for determination is more than w times the leg integrated value of the identified column (Yes in step S846), the leg detector 19 determines whether the leg integrated value $A_L(i)$ of the column for determination is more than w times the average of the leg integrated values (step S847). If the leg integrated value $A_L(i)$ of the column for determination is equal to or less than u times the average of the leg integrated values (No in step S847), the leg detector 19 determines that the leg integrated value $A_L(i)$ of the column for determination does not have a distinct peak compared to those on the left and the right thereof similarly to the above.

On the other hand, if the leg integrated value $A_L(i)$ of the column for determination is more than w times the average of the integrated values (Yes in step S847), the leg detector 19 determines that the leg integrated value $A_L(i)$ of the column for determination has a significant peak and increments the leg detection flag Lrs (step S848). The leg detector 19 then sets the column on the right of the present column for determination as the next column for determination.

The leg detector 19 repeats steps S845 to S848 until the X coordinate of the next column for determination is equal to the $X_{PLE2}$ (Yes in step S844). In this way, the leg determination flag Lrs is set to a value from 0 to 2. For example, if a person corresponding to the region R1 shows the back (or the front) in the input image 21 like the person 21m in FIG. 4, two columns having a significant leg integrated value peak are identified. In this case, the leg detection flag Lrs has a value of two, which indicates that two legs have been detected. Alternatively, if one leg of the person 21m is hid behind the other leg, one column having a significant leg integrated value peak is identified. In this case, the leg detection flag Lrs has a value of 1, which indicates that one leg has been detected.

In this way, a leg(s) corresponding to the region R1 is detected. A leg corresponding to each of the regions R2 to R5 is identified in the same manner. The leg detection flags Lrs obtained for the regions R1 to R5 are used in the size determination processing (step S9) that will be described in the following.

[5. Size Determination Processing (Step S9)]

Figure 43:
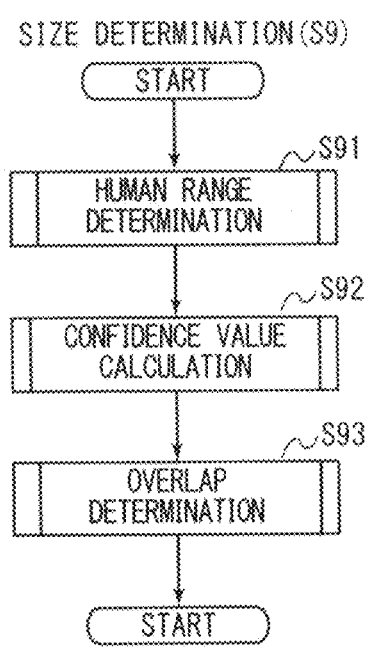
FIG. 43 is a flowchart for illustrating the size determination processing shown in FIG. 27.

FIG. 43 is a flowchart for illustrating the size determination processing (step S9) shown in FIG. 27. Now, referring to FIG. 43, the size determination processing (step S9) will be described.

The size determiner 20 determines a human range corresponding to each of the regions R1 to R5 (step S91) based on detection results from steps S3 to S5, S7, and S8. The size determiner 20 calculates a confidence value for a person corresponding to each region (step S92). The confidence value represents a degree of possibility that a person corresponding to each region is an actual person. The size determiner 20 determines whether a human range corresponding to the regions R1 to R5 overlap (step S93). If multiple human ranges overlap, the size determiner 20 selects one of the overlapping human ranges and deletes the unselected human ranges.

[5. 1 Human Range Determination (step S91)]

Figure 44:
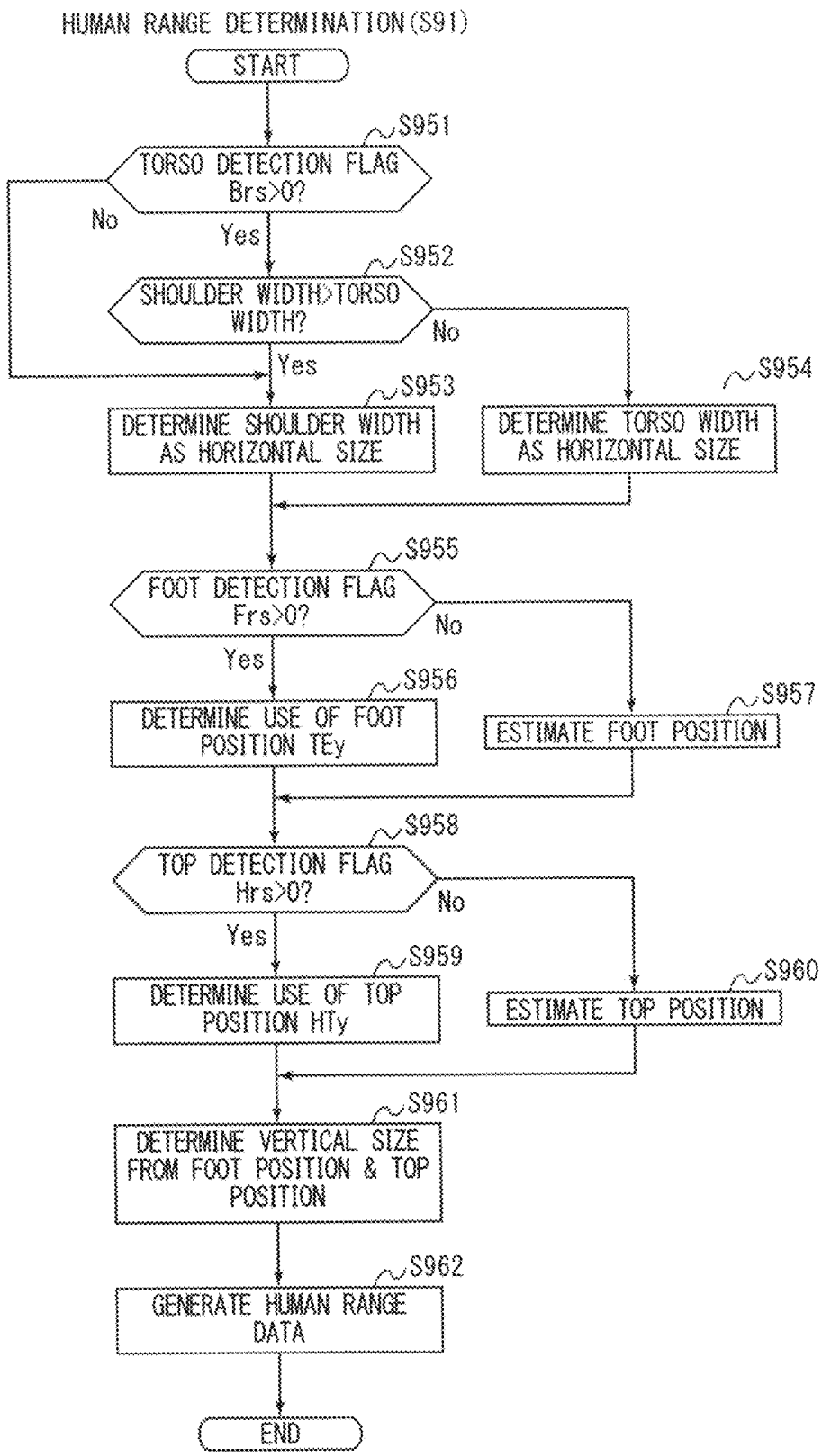
FIG. 44 is a flowchart for illustrating the human range determination processing shown in FIG. 43.

FIG. 44 is a flowchart for illustrating human range determination processing (step S91). The size determiner 20 performs the human range determination processing (step 91) to each of the regions R1 to R5 to generate human range data 28 corresponding to the regions R1 to R5.

Hereinafter, the human range determination processing (step S61) will be described in detail by referring to how to determine a human range corresponding to the region R1 as an example.

The size determiner 20 determines a horizontal size of a person corresponding to the region R1 by steps S951 to S954. The size determiner 20 determines whether the torso detection flag Brs is more than zero (step S951). If the torso detection flag Brs is more than zero (Yes in step S951), a torso width corresponding to the shoulder in the region R1 has been detected. The size determiner 20 determines whether the shoulder width in the region R1 is greater than the detected torso width (step S952).

If the shoulder width is equal to or more than the torso width (Yes in step S952), the size determiner 20 determines the shoulder width as a horizontal size of the person corresponding to the region R1 (step S953). On the other hand, if the shoulder width is less than the torso width (No in step S952), the size determiner 20 determines the torso width as a horizontal size of the person corresponding to the region R1 (step S954).

Referring back to the description of step S951, if the torso detection flag Brs is zero (No in step S951), a torso width corresponding to the shoulder in the region R1 has not been detected, and therefore the size determiner 20 determines the shoulder width detected in the region R1 as a horizontal size of the person corresponding to the region R1 (step S953).

The size determiner 20 then determines a vertical size of the person corresponding to the region R1 by steps S955 to S960. The foot detection flag Frs being more than zero (Yes in step S955) indicates that a foot position corresponding to the shoulder in the region R1 has been identified. In this case, the size determiner 20 determines use of the foot position TEy identified by the foot detection processing (step S4) (step S956).

On the other hand, if the foot detection flag Frs for the region R1 is zero (No in step S955), no foot position corresponding to the shoulder in the region R1 has been identified. Therefore, the size determiner 20 estimates a foot position based on the shoulder center PSH and the shoulder width in the region R1 (step S957). For example, the size determiner 20 multiplies the shoulder width in the region R1 by a coefficient preset for estimating a foot position and adds the result of multiplication to the Y coordinate $Y_{SH}$ of the shoulder center PSH to obtain a foot position.

The size determiner 20 then determines whether the top detection flag Hrs for the region R1 is more than zero (step S958). If the top detection flag Hrs is more than zero (Yes in step S958), a top position corresponding to the shoulder in the region R1 has been identified. In this case, the size determiner 20 determines use of the top position HTy identified by the top detection processing (step S5) (step S959).

On the other hand, if the top detection flag Hrs for the region R1 is zero (No in step S958), no top position corresponding to the shoulder in the region R1 has been identified. In this case, the size determiner 20 estimates a top position according to the same method as that in step S957 (step S860). The coefficient preset for estimating a top position has a value different from the coefficient for estimating a foot position.

The size determiner 20 determines a vertical size of the person corresponding to the region R1 (step S961) based on the foot position and the top position. More specifically, the vertical size can be obtained by subtracting the Y coordinate of the top position from the Y coordinate of the foot position. The size determiner 20 determines a human range corresponding to the region R1 based on the shoulder center PSH, the horizontal size, and the vertical size corresponding to the region R1 and generates human range data 28 including the shoulder center PSH, the foot position TEy, the top position HTy, the horizontal size, and the vertical size. Human range data 28 corresponding to each of the regions R2 to R5 is generated in the same manner.

[5. 2 Confidence Value Calculation (Step S92)]

FIG. 45 is a flowchart for illustrating confidence value calculation processing (step S92). The size determiner 20 performs the confidence value calculation processing (step S92) to each of the regions R1 to R5 and calculates a confidence value that represents a degree of how much the human range data 28 for regions R1 to R5 represents an actual human range. The calculated confidence values are used in the overlap determination processing (step S93) that will be described later. In the following, how to calculate a confidence value about a person corresponding to the region R1 will be described as an example.

As shown in FIG. 45, the size determiner 20 initializes the confidence value to zero (step S971). If the shoulder width corresponding to the region R1 is more than zero (Yes in step S972), the size determiner 20 increments the confidence value (step S973). If the shoulder width corresponding to the region R1 is zero (No in step S972), the size determiner 20 proceeds to step S974 without incrementing the confidence value.

If the torso detection flag Brs for the region R1 is more than zero (Yes in step S974), the size determiner 20 increments the confidence value (step S975). If the torso detection flag Brs for the region R1 is zero (No in step S974), the size determiner 20 proceeds to step S976 without incrementing the confidence value.

If the top detection flag Hrs for the region R1 is more than zero (Yes in step S976), the size determiner 20 increments the confidence value (step S977). If the top detection flag Hrs for the region R1 is zero (No in step S976), the size determiner 20 proceeds to step S978 without incrementing the confidence value.

If the foot detection flag Frs for the region R1 is more than zero (Yes in step S978), the size determiner 20 increments the confidence value (step S979). If the foot detection flag Frs for the region R1 is zero (No in step S978), the size determiner 20 proceeds to step S980 without incrementing the confidence value.

If the leg detection flag Lrs for the region R1 is one (Yes in step S980), the size determiner 20 increments the confidence value (step S981). If the leg detection flag Lrs for the region R1 is not one (No in step S980), the size determiner 20 determines whether the leg detection flag Lrs is equal to or more than two (step S982).

If the leg detection flag Lrs is equal to or more than two (Yes in step S982), the size determiner 20 increases the confidence value by 2 (step S983). This is because two legs have been detected in the leg presence/absence determination processing (step S84, see FIG. 42). On the other hand, if the leg detection flag Lrs for the region R1 is zero (No in step S982), the size determiner 20 ends the processing shown in FIG. 45 without incrementing the confidence value.

In this way, the size determiner 20 calculates a confidence value about a person corresponding to each region based on detection results about the shoulder, torso, leg, foot, and top of the person.

5. 3 Overlap Determination Processing (Step S93)

Now, a reason for performing the overlap determination processing (step S93) will be described. As shown in FIG. 12, in the frame 27a, the two regions R1 and R2 that each indicate a shoulder width are identified. A human range is identified for each of the regions, so that multiple human ranges are identified in the frame 27a. In the frame 21a (that corresponds to the frame 27a) shown in FIG. 4, however, only the one person 21m exists. In this way, when two shoulder widths are detected in the same frame, the same one person can be detected as separate persons in some cases. The size determiner 20 performs the overlap determination processing (step S93) to prevent one person from being erroneously detected as more than one person.

FIG. 46 is a flowchart for illustrating the overlap determination processing (step S93). As shown in FIG. 46, the size determiner 20 determines whether overlapping human ranges exist among the human ranges that correspond to the regions R1 to R5 (step S931).

If overlapping human ranges exist (Yes in step S931), the size determiner 20 determines whether the overlapping human ranges have equal confidence values (step S932). If the confidence values are not equal (No in step S932), the size determiner 20 maintains human range data 28 corresponding to the human range having the maximum confidence value among the overlapping human ranges and deletes the other human range data (step S933). More specifically, the size determiner 20 selects the human range having the maximum confidence value among the overlapping human ranges.

On the other hand, if the confidence values are equal (Yes in step S932), the size determiner 20 maintains human range data 28 corresponding to the human range having the largest area among the overlapping human ranges and deletes the other human range data 28 (step S934). More specifically, the size determiner 20 selects the human range having the largest area among the overlapping human ranges.

The size determiner 20 maintains the non-overlapping human range data 28 as it is.

The size determiner 20 then deletes human range data 28 for which the ratio of the vertical size and the horizontal size is without a prescribed range among the presently maintaining human range data 28 (step S935). The prescribed range is determined based on a typical ratio of a vertical size and a horizontal size of a person. If the ratio of the vertical and horizontal sizes are not within the prescribed range, it is determined that the human range identified in step S91 has resulted by erroneously detecting something else as a person. The size determiner 20 outputs the human range data 28 which has not been deleted to the outside.

As in the foregoing, the human detection device 2 according to the embodiment detects a shoulder center and a shoulder width of a person from an input image 21 and identifies a torso width, a foot position, and a top position based on the detected shoulder center and shoulder width. In this way, a horizontal size and a vertical size of the person included in the input image 21 can be identified.

In the above example according to the embodiment, the image recognizer 17 generates object region data 25 and a human range in the frames 21a to 21c defined by the object region data 25 is identified, but the invention is not limited to the arrangement. The human detection device 1 may detect a shoulder center position or a shoulder width from the input image 21 as a whole without using the object region data 25.

In the example according to the embodiment described above, a shoulder center position and a shoulder width are detected from the input image 21 based on the horizontal symmetry of shoulders, but the invention is not limited to the arrangement. The human detection device 1 may obtain a shoulder center position and a shoulder width by any other general image recognition processing.

In the example according to the embodiment described above, a torso, a leg, a foot position, and a top position are detected based on a shoulder center and a shoulder width and a human range is identified. However, the human detection device 1 may be used only for the purpose of detecting the presence/absence of a torso of a person and the presence/absence of a leg of a person.

In the example according to the embodiment described above, the foot detector 13 performs both steps S436 and S437 to a pixel line for determination in the foot position identifying processing (step S43, see FIG. 18), but the invention is not limited to the arrangement. The foot detector 13 may perform at least one of steps S436 and S437 to determine whether a pixel line for determination satisfies a condition for a foot. The same applies to the top position identifying processing (step S53, see FIG. 22), the torso presence/absence determination processing (step S64, see FIG. 35), and the leg presence/absence determination processing (step S74, see FIG. 42).

In the example according to the embodiment described above, in step S437 (see FIG. 18), the foot detector 13 determines whether a foot value of a pixel line for determination exceeds s times the average of foot values of pixel lines but the invention is not limited to this arrangement. Instead of the average of foot values, an average such as a median value of foot values may be used. More specifically, if the foot value of a pixel line for determination satisfies a prescribed relation with respect to the foot value of each pixel line, the foot detector 13 may determine that a foot value corresponding to a shoulder center PSH has been detected. This also applies to steps S537 (see FIG. 22), S746 (see FIG. 35), and step S846 (see FIG. 42).

In the human detection device 1, 2 according to the described embodiment, each functional block may be formed individually as a single chip including a semiconductor device such as an LSI or partly or entirely included on a single chip. The method of forming an integrated circuit is not limited to that of LSIs and such a circuit may be implemented by a dedicated circuit or a general-purpose processor. An FPGA (Field Programmable Gate Array) that can be programmed after an LS1 is generated or a reconfigurable processor that includes reconfigurable circuit cell connection or setting in the LSI may be employed.

Processing by each functional block according to the embodiment may be partly or entirely implemented by programs. The processing by each functional block according to the embodiment is partly or entirely performed by a central processing unit (CPU) in a computer. The programs used to perform the processing are stored in a storage device such as a hard disk and a ROM, read out from a ROM or to RAM and run.

The various kinds of processing according to the embodiment may be implemented by hardware or software (including implementation with an OS (Operating System), middleware, or a prescribed library). Alternatively, they may be implemented by mixed processing by software and hardware. It should be understood that if the human detection device 1 according to the embodiment is implemented by hardware, timings must be adjusted for performing the various kinds of processing. According to the embodiment, details of timing adjustment for various signals which should be encountered in actual hardware designing are not described for the ease of description.

A computer program adapted to cause a computer to perform the above-described method and a computer-readable storage medium recorded with the program are included in the scope of the invention. Here, examples of the computer-readable storage medium include a flexible disk, a hard disk, a CD-ROM, an MO, a DVD, a DVD-ROM, a DVD-RAM, a BD (Blue-ray Disc), and a semiconductor memory.

The above-described computer programs may not only be recorded on the storage medium but also be transmitted through a telecommunication line, a wireless or wire communication line, or a network including the Internet.

While the embodiments shown in the accompanying drawings have been described, the detailed description of the invention should not be construed to limit the invention unless otherwise indicated and the same is intended to allow the invention to read broadly within the scope of the claims.

What is claimed is:

1. A human detection device, comprising:
   circuitry configured to implement
   a shoulder detecting unit configured to detect a shoulder position and a shoulder width of a person included in an input image from the input image; and
   a vertical size determining unit configured to determine a vertical size of the person in the input image based on the shoulder position and the shoulder width detected by the shoulder detecting unit, the vertical size determining unit comprises a foot detecting unit configured to detect a foot position of the person in the input image based on the shoulder position and the shoulder width detected by the shoulder detecting unit,
   wherein the foot detecting unit comprises
   a foot region setting unit configured to set a searching region for a foot of the person based on the detected shoulder position and shoulder width,
   a first adding up unit configured to add up pixel values of pixels included in the foot searching region for each of pixel lines arranged in the horizontal direction, and
   a foot position determining unit configured to determine a position of a first line as the foot position if a relation between an integrated value of the first line produced by the first adding up unit and an integrated value of a pixel line adjacent to the first line satisfies a prescribed condition.

2. The human detection device according to claim 1, wherein if the integrated value of the first line exceeds an average of the integrated values of pixel lines added up by the first adding up unit, the foot position determining unit determines the position of the first line as the foot position.

3. The human detection device according to claim 1, wherein if multiple pixel lines included in the foot searching region are determined as the foot position, the foot position determining unit determines a position of the closest pixel line to the detected shoulder position among the multiple pixel lines included in the foot searching region as the foot position.

4. The human detection device according to claim 1, wherein the vertical size determining unit comprises a top detecting unit configured to detect a top position of the person in the input image based on the shoulder position and the shoulder width detected by the shoulder detecting unit.

5. The human detection device according to claim 4, wherein the top detecting unit comprises:
   a top region setting unit configured to set a searching region for a top of the person based on the detected shoulder position and shoulder width;
   a second adding up unit configured to add up pixel values of pixels included in the top searching region for each of pixel lines arranged in the horizontal direction; and
   a top position determining unit configured to determine a position of a second line as a position of the top if a relation between an integrated value of the second line produced by the second adding up unit and an integrated value of a pixel line adjacent to the second line satisfies a prescribed condition.

6. The human detection device according to claim 5, wherein the top position determining unit determine the position of the second line as the top position if the integrated value of the second line exceeds an average of the integrated values of the pixel lines added up by the second adding up unit.

7. The human detection device according to claim 5, wherein if multiple pixel lines included in the top searching region are determined as the top position, the top position determining unit determines a position of the closest pixel line to the detected shoulder position among the multiple pixel lines included in the top searching region as the top position.

8. The human detection device according to claim 1, wherein the vertical size determining unit comprises:
   a top detecting unit configured to detect a top position of the person in the input image based on the shoulder position and the shoulder width detected by the shoulder detecting unit; and
   a calculating unit configured to calculate a vertical size of the person based on the foot position detected by the foot detecting unit and the top position detected by the top detecting unit.

9. The human detection device according to claim 8, further comprising:
   a range determining unit configured to determine a range of the person based on the detected shoulder position and shoulder width, the detected foot position, and the detected top position;
   an overlap determining unit configured to determine whether a range of a first person overlaps a range of a second person if the range of the first person and the range of the second person are determined by the range determining unit; and
   a range maintaining unit configured to maintain a range having a larger area between the range of the first person and the range of the second person if the overlap determining unit determines the ranges overlap.

10. The human detection device according to claim 1, further comprising:
    a horizontal size determining unit configured to determine a horizontal size of the person based on the shoulder width detected by the shoulder detecting unit;
    a ratio determining unit configured to determine whether a ratio of the horizontal size of the person determined by the horizontal size determining unit and the vertical size of the person determined by the vertical size determining unit is within a prescribed range; and
    a human determining unit configured to determine that the person is detected if the ratio determining unit determines that the ratio is within the prescribed range.

11. A human detection device, comprising:
    circuitry configured to implement
    a identifying unit configured to sequentially identify a pixel in a identified region of an input image as a reference pixel;
    a likelihood value calculating unit configured to identify two pixel groups in a prescribed shape positioned on the left and right of the reference pixel and calculate a shoulder likelihood value representing a degree of likelihood of the reference pixel being in a shoulder center of a person based on the pixel values of pixels included in the two pixel groups;

a center determining unit configured to determine a position of a specific pixel having a shoulder likelihood value that satisfies a prescribed condition among the pixels in the identified region as a shoulder center of the person;

a shoulder width determining unit configured to determine a shoulder width of the person based on a distance between the two pixel groups;

an adding unit configured to calculate a left added value produced by adding pixel values in a left pixel group among the two pixel groups and a right added value produced by adding pixel values in a right pixel group; and a ratio determining unit configured to determine whether a ratio of the left added value and the right added value is within a prescribed range, wherein if the ratio determining unit determines that the ratio is outside the prescribed range, a selecting unit excludes a shoulder likelihood value corresponding to the ratio from selection.

12. The human detection device according to claim 11, wherein the likelihood value calculating unit comprises:

an arrangement setting unit configured to set at least two arrangement patterns for the two pixel groups so that the distance between the two pixel groups varies;

an individual likelihood value calculating unit configured to calculate a shoulder likelihood value corresponding to each arrangement pattern based on the pixel values of the pixels included in the two pixel groups corresponding to each of the arrangement patterns, wherein the selecting unit is configured to select a maximum shoulder likelihood value among the shoulder likelihood values corresponding to the arrangement patterns as a shoulder likelihood value for the reference pixel, and the shoulder width determining unit configured to determine a shoulder width of the person based on the distance between the two pixel groups in the arrangement pattern corresponding to the maximum shoulder likelihood value.

13. The human detection device according to claim 12, wherein the adding unit weights each pixel value in the left pixel group according to the position of the pixel and each pixel value in the right pixel group according to the position of the pixel, the left added value is calculated by adding the weighted pixel values in the left pixel group, and the right added value is calculated by adding the weighted pixel values in the right pixel group.

14. The human detection device according to claim 11, further comprising a labeling unit configured to label each pixel in the identified region based on the shoulder likelihood value of the pixel to produce a labeling region, wherein a shoulder likelihood value that satisfies the prescribed condition is a maximum shoulder likelihood value among the shoulder likelihood values of the pixels included in the labeling region.

15. The human detection device according to claim 11, wherein a shoulder likelihood value that satisfies the prescribed condition is a maximum shoulder likelihood value in the identified region.

16. The human detection device according to claim 11, further comprising a pixel value determining unit configured to identifies a center pixel group including the reference pixel and positioned between the two pixel groups and determines whether at least one pixel included in the identified center pixel group has a pixel value greater than a prescribed threshold, wherein the likelihood value calculating unit calculates a shoulder likelihood value for the reference pixel if it is determined that at least one pixel has a pixel value greater than the prescribed threshold.

17. A human detection device, comprising:

a shoulder detecting unit configured to detects a shoulder position and a shoulder width of a person included in an input image from the input image;

a first region determining unit configured to determine a first region to be searched for a torso of the person based on the shoulder position and the shoulder width detected by the shoulder detecting unit;

a identifying unit configured to sequentially identify each pixel in the first region as a reference pixel;

a likelihood value calculating unit configured to identify two pixel groups in a prescribed shape positioned on the left and right of the reference pixel and calculate a torso likelihood value representing a degree of likelihood of the reference pixel being in a torso center of the person based on the pixel values of the pixels included in the two pixel groups;

a torso determining unit configured to produce a torso integrated value by adding up torso likelihood values for each column of pixels arranged in a vertical direction in the first region and determine that a torso of the person exists if the torso integrated value of any one column included in the first region satisfies a prescribed condition;

a torso width detecting unit configured to detect a torso width of a person based on the distance between the two pixel groups; and a foot detecting unit configured to detect a foot position of the person based on the shoulder position and the shoulder width detected by the shoulder detecting unit.

18. The human detection device according to claim 17, wherein the torso determining unit determines that the torso of the person exists if a relation between the torso integrated value of each column and a maximum torso integrated value among the torso integrated values of the columns included in the first region satisfies a first relation.

19. The human detection device according to claim 17, wherein the torso determining unit comprises a selecting unit configured to identify two columns positioned on the left and right of the column having the maximum torso integrated value among the torso integrated values of the columns included in the first region and selects a column having a smaller torso integrated value between the identified two columns, and the torso determining unit determines that the torso of the person exists if a relation between the maximum torso integrated value and the torso integrated value of the column selected by the selecting unit satisfies a second relation.

20. The human detection device according to claim 17, further comprising:

an estimating unit configured to estimate a torso width when the reference pixel is in a center of the torso based on a distance between the two pixel groups; and a center determining unit configured to determine a maximum torso width among torso widths estimated for pixels included in the first region as a torso width of the person and determine a position of the pixel having the maximum torso width as a center of the torso of the person.

21. The human detection device according to claim 20, further comprising a second region determining unit configured to determine a second region included in the first region based on a position of the column having a maximum torso integrated value, wherein the center determining unit determines a maximum torso width among torso widths estimated for pixels included in the second region as a torso width of the person.

22. The human detection device according to claim 20 wherein the likelihood value calculating unit comprises:

an arrangement setting unit configured to set at least two arrangement patterns for the two pixel groups so that the distance between the two pixel groups varies;

an individual likelihood value calculating unit configured to calculate a torso likelihood value corresponding to each arrangement pattern based on pixel values of pixels included in the two pixel groups corresponding to each arrangement pattern; and a torso likelihood value selecting unit configured to select a maximum torso likelihood value among torso likelihood values corresponding to each arrangement pattern as a torso likelihood value for the reference pixel, and the estimating unit estimates a torso width for the reference pixel based on the distance between two pixel groups identified by an arrangement pattern corresponding to the maximum torso likelihood value.

23. The human detection device according to claim 17, further comprising:

a top detecting unit configured to detect a top position of the person based on a shoulder position and a shoulder width detected by the shoulder detecting unit;

a horizontal size determining unit configured to determine a horizontal size of the person based on the shoulder width detected by the shoulder detecting unit and the torso width detected by the torso width detecting unit; and a vertical size determining unit configured to determine a vertical size of the person based on the top position detected by the top detecting unit and the foot position detected by the foot detecting unit.

24. The human detection device according to claim 23, further comprising a leg detecting unit configured to detect a leg of the person based on the shoulder position and the shoulder width detected by the shoulder detecting unit; and a confidence calculating unit configured to calculate a confidence value about the person based on detection results of a shoulder width, a torso width, a leg, a top position, and a foot position of the person.

25. The human detection device according to claim 23, further comprising:

a range determining unit configured to determine a range of the person based on the shoulder position and the shoulder width detected by the shoulder detecting unit, the foot position detected by the foot detecting unit, and the top position detected by the top detecting unit;

an overlap determining unit configured to determine whether a range of a first person overlaps a range of a second person if the range determining unit determine the range of the first person and the range of the second person; and a range selecting unit configured to select one of the range of the first person and the range of the second person if the overlap determining unit determines that the ranges overlap.

26. The human detection device according to claim 25, further comprising a confidence value calculating unit configured to calculate a confidence value about the person based on detection results of a shoulder width, a torso width, a top position, and a foot position of the person, wherein the range selecting unit selects the range of the first person if the confidence value about the first person is greater than the confidence value about the second person.

27. The human detection device according to claim 25, wherein the range selecting unit selects the range of the first person if the range of the first person has a greater area than that of the range of the second person.

28. A human detection device, comprising:

a shoulder detecting unit configured to detect a shoulder position and a shoulder width of a person included in an input image;

a first region determining unit configured to determine a first region to be searched for a leg of the person based on the shoulder position and the shoulder width detected by the shoulder detecting unit;

a identifying unit configured to sequentially identify each pixel in the first region as a reference pixel;

a likelihood value calculating unit configured to identify two pixel groups in a prescribed shape positioned on the left and right of the reference pixel and calculate a leg likelihood value representing a degree of likelihood of the reference pixel being in a leg center of the person based on the pixel values of the pixels included in the two pixel groups;

a leg determining unit configured to produce a leg integrated value by adding up leg likelihood values for each column of pixels arranged in a vertical direction in the first region and determine that a leg of the person exists if the leg integrated value of any one column included in the first region satisfies a prescribed condition; and a torso width detecting unit configured to detect a torso width of the person based on the distance between the two pixel groups.

29. The human detection device according to claim 28, wherein the leg determining unit determines that a leg of the person exists if a relation between a leg integrated value of each column and a maximum leg integrated value among the leg integrated values of the columns included in the first region satisfies a first relation.

30. The human detection device according to claim 28, wherein the leg determining unit comprises a column selecting unit configured to identify two columns positioned on the left and right of a column having a maximum leg integrated value and select a column having a smaller leg integrated value between the identified two columns, and the leg determining unit determines that a leg of the person exists if a relation between the maximum leg integrated value and the leg integrated value of the column selected by the column selecting unit satisfies a second relation.

31. A non-transitory computer readable recording medium recorded with a human detection program adapted to cause a computer provided in a human detection device that detects a person included in an input image to carry out the steps of:

detecting with a shoulder detecting unit a shoulder position and a shoulder width of the person included in the input image;

determining a vertical size of the person in the input image based on the detected shoulder position and shoulder width;

determining with a vertical size determining unit a vertical size of the person in the input image based on the shoulder position and the shoulder width detected by the shoulder detecting unit wherein the vertical size determining unit comprises a foot detecting unit configured to detect a foot position of the person in the input image based on the shoulder position and the shoulder width detected by the shoulder detecting unit;

setting with a foot region setting unit a searching region for a foot of the person based on the detected shoulder position and shoulder width;

adding with a first adding up unit pixel values of pixels included in the foot searching region for each of pixel lines arranged in the horizontal direction; and determining with a foot position determining unit a position of a first line as the foot position if a relation between an integrated value of the first line produced by the first adding up unit and an integrated value of a pixel line adjacent to the first line satisfies a prescribed condition.

32. A non-transitory computer-readable recording medium recorded with a human detection program adapted to cause a computer provided in a human detection device to carry out the steps of:

sequentially identifying a pixel in a identified region of an input image as a reference pixel;

identifying two pixel groups in a prescribed shape positioned on the left and right of the reference pixel and calculating a shoulder likelihood value representing a degree of likelihood of the reference pixel being in a shoulder center of a person;

determining a position of a specific pixel having a shoulder likelihood value that satisfies a prescribed condition among pixels in the identified region as a shoulder center of the person; and determining a shoulder width of the person based on a distance between the two pixel groups; and determining a position of a first line as a foot position if a relation between an integrated value of the first line produced by a first adding up unit and an integrated value of a pixel line adjacent to the first line satisfies a prescribed condition.

33. A non-transitory computer-readable recording medium recorded with a human detection program adapted to cause a computer provided in a human detection device to carry out the steps of:

detecting with a torso width detecting unit a torso width of the person based on the distance between two pixel groups;

detecting with a foot detecting unit a foot position of the person based on the shoulder position and the shoulder width detected by a shoulder detecting unit detecting a shoulder position and a shoulder width of a person included in an input image;

determining a first region to be searched for a torso of the person based on the detected shoulder position and shoulder width;

sequentially identifying each pixel in the first region as a reference pixel;

identifying two pixel groups in a prescribed shape positioned on the left and right of the reference pixel and calculating a torso likelihood value representing a degree of likelihood of each pixel being in a torso center of the person; and producing a torso integrated value by adding up torso likelihood values for each column of pixels arranged in a vertical direction in the first region and determining that the torso of the person exists if the torso integrated value of any one column included in the first region satisfies a prescribed condition.

34. A non-transitory computer-readable recording medium recorded with a human detection program adapted to cause a computer provided in a human detection device to carry out the steps of:

detecting with a torso width detecting unit a torso width of the person based on the distance between two pixel groups;

detecting with a foot detecting unit a foot position of the person based on the shoulder position and the shoulder width detected by a shoulder detecting unit;

detecting a shoulder position and a shoulder width of a person included in an input image;

determining a first region to be searched for a leg of the person based on the detected shoulder position and shoulder width;

sequentially identifying each pixel in the first region as a reference pixel;

identifying two pixel groups in a prescribed shape positioned on the left and right of the reference pixel and calculating a leg likelihood value representing a degree of likelihood of each pixel being in a leg center of the person; and producing a leg integrated value by adding up leg likelihood values for each column of pixels arranged in a vertical direction in the first region and determining that the leg of the person exists if the leg integrated value of any one column included in the first region satisfies a prescribed condition.

* * * * *